United States Patent
Cheng et al.

(10) Patent No.: US 10,927,815 B2
(45) Date of Patent: Feb. 23, 2021

(54) WIND ENERGY TO COMPRESSED FLUID CONVERSION AND ENERGY SYSTEM

(71) Applicant: NUtech Ventures, Inc., Lincoln, NE (US)

(72) Inventors: Jie Cheng, Lincoln, NE (US); Farrokh F. Choobineh, Lincoln, NE (US)

(73) Assignee: NUtech Ventures, Inc., Lincoln, NE (US)

( * ) Notice: Subject to any disclaimer, the term of this patent is extended or adjusted under 35 U.S.C. 154(b) by 0 days.

(21) Appl. No.: 16/066,163

(22) PCT Filed: Dec. 29, 2016

(86) PCT No.: PCT/US2016/069259
§ 371 (c)(1),
(2) Date: Jun. 26, 2018

(87) PCT Pub. No.: WO2017/117414
PCT Pub. Date: Jul. 6, 2017

(65) Prior Publication Data
US 2019/0017494 A1     Jan. 17, 2019

Related U.S. Application Data

(60) Provisional application No. 62/272,405, filed on Dec. 29, 2015.

(51) Int. Cl.
| | |
|---|---|
| *F03D 9/17* | (2016.01) |
| *F03D 15/00* | (2016.01) |
| *F04B 25/04* | (2006.01) |
| *F04B 27/08* | (2006.01) |
| *F03D 9/11* | (2016.01) |
| *F03D 9/28* | (2016.01) |

(52) U.S. Cl.
CPC .............. *F03D 9/17* (2016.05); *F03D 9/11* (2016.05); *F03D 9/28* (2016.05); *F03D 15/00* (2016.05); *F04B 25/04* (2013.01); *F04B 27/08* (2013.01); *F05B 2260/406* (2013.01); *Y02E 10/72* (2013.01); *Y02E 60/16* (2013.01)

(58) Field of Classification Search
CPC .... F05B 2260/406; Y02E 10/72; Y02E 60/15; F03D 9/11; F03D 9/28; F03D 15/00; F03D 9/17; F04B 25/04; F04B 27/08
USPC ....................................... 290/44, 55
See application file for complete search history.

(56) References Cited

U.S. PATENT DOCUMENTS

| | | |
|---|---|---|
| 2007/0095069 A1 | 5/2007 | Joshi et al. |
| 2011/0070104 A1 | 3/2011 | Terauchi |
| 2011/0169275 A1 | 7/2011 | Garvey |
| 2012/0060685 A1* | 3/2012 | Salter .................. F04B 1/0538 92/128 |

(Continued)

OTHER PUBLICATIONS

Lee, Dal Kyong, International Search Report for Application No. PCT/US2016/069259, dated Apr. 24, 2017.

*Primary Examiner* — Charles Reid, Jr.
(74) *Attorney, Agent, or Firm* — Greer, Burns & Crain, Ltd.; Steven P. Fallon

(57) ABSTRACT

A wind energy to compressed fluid conversion system has a compressor to compress fluid when the wind energy exceeds a capacity limit of the generator. Instead of trimming blades to create mechanical spillage, excess energy is converted and stored, and can furnish power when the generator experiences a capacity vacancy.

13 Claims, 55 Drawing Sheets

(56) References Cited

U.S. PATENT DOCUMENTS

| | | |
|---|---|---|
| 2013/0019591 A1 | 1/2013 | Williams |
| 2013/0251499 A1* | 9/2013 | Rampen ............... F15B 20/007 415/1 |
| 2014/0246792 A1 | 9/2014 | Pavlov |

* cited by examiner

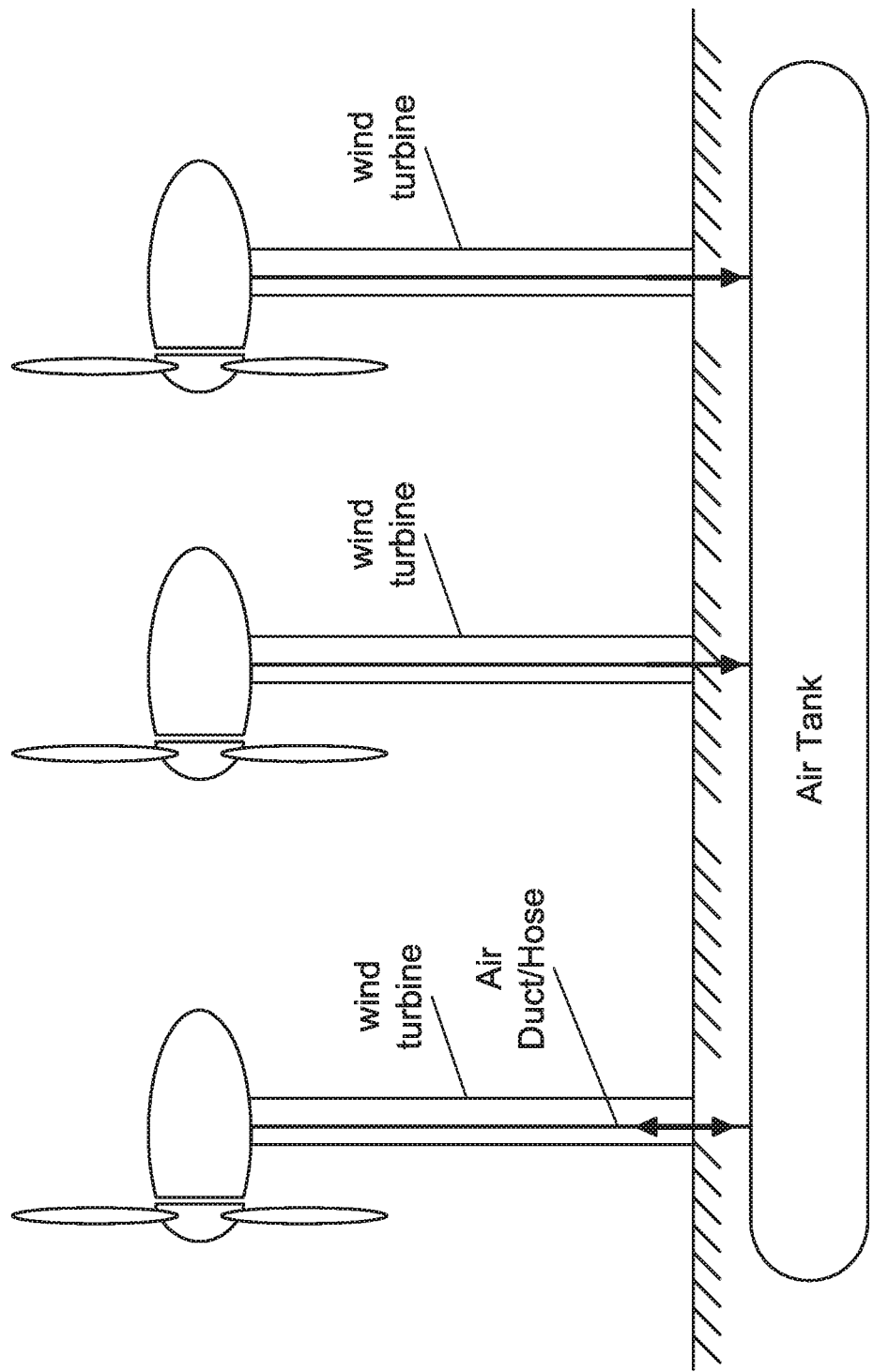

WIND ENERGY TO COMPRESSED FLUID CONVERSION AND ENERGY SYSTEM

BACKGROUND

A wind turbine (also referred to as an aerofoil-powered generator) is a device that converts kinetic energy from the wind into electrical power.

SUMMARY

A system can include a wind turbine and a generator coupled with the wind turbine for converting wind energy to electrical energy. The system can also include a variable displacement machine configured to use the wind energy to compress a fluid such as air (e.g., when the wind energy exceeds a capacity limit of the generator). The variable displacement machine can also be coupled between the generator and the storage tank and configured to use the compressed fluid to furnish power to the generator (e.g., when the generator experiences a capacity vacancy). The system can also include a storage tank for storing fluid compressed by the variable displacement machine. A variable displacement machine that can be used as a compressor or an expander may include pistons that can be shifted (e.g., to adjust the strokes of the pistons). Further, the variable displacement machine can include a plate with a wobble angle that can be adjusted to be positive, neutral, or negative.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

FIG. 51 is a diagrammatic illustration of a wind energy conversion system including multiple wind turbines sharing an underground air tank, where all turbines may participate in air compression but not necessarily all turbines (e.g., one, a few, all) may use the compressed air to supplement power generation in accordance with example embodiments of the present disclosure.

DETAILED DESCRIPTION

Typical wind turbines are designed to capture wind energy and generate electricity while operating within their rated capacity. Wind power exceeding the capacity limit of the electrical generator of a turbine is generally trimmed off as mechanical spillage (wasted wind power). As described herein, systems, apparatus, and techniques are provided that can convert this mechanical spillage to compress fluid for storage in a fluid tank. The compressed fluid (e.g., air) in the tank can be used to supplement the wind energy, e.g., when the wind energy is not sufficient for the full generation capacity of the turbine and/or is not consistent enough to produce electricity with a desired quality. Further, the systems, apparatus, and techniques described herein can capture mechanical spillage and may be used in islanded and/or grid connected micro grid systems, (e.g., including one or more turbines).

In embodiments of the disclosure, a compact system may be provided for the reversible process of both compressing and expanding fluid. A variable displacement machine can provide compression and expansion under different torque, power, and tank pressure conditions. A gearbox may be used to distribute power to a desired shaft. Mechanical spillage can be recycled in addition to electrical spillage. Overall power generation may be increased. Power dispatchability can be increased (e.g., by decreasing output intermittency). Spinning reserves may be increased. Low voltage ride through capacity can be increased. Further, in some embodiments, black start ability for a wind turbine may also be provided.

Figure 1:
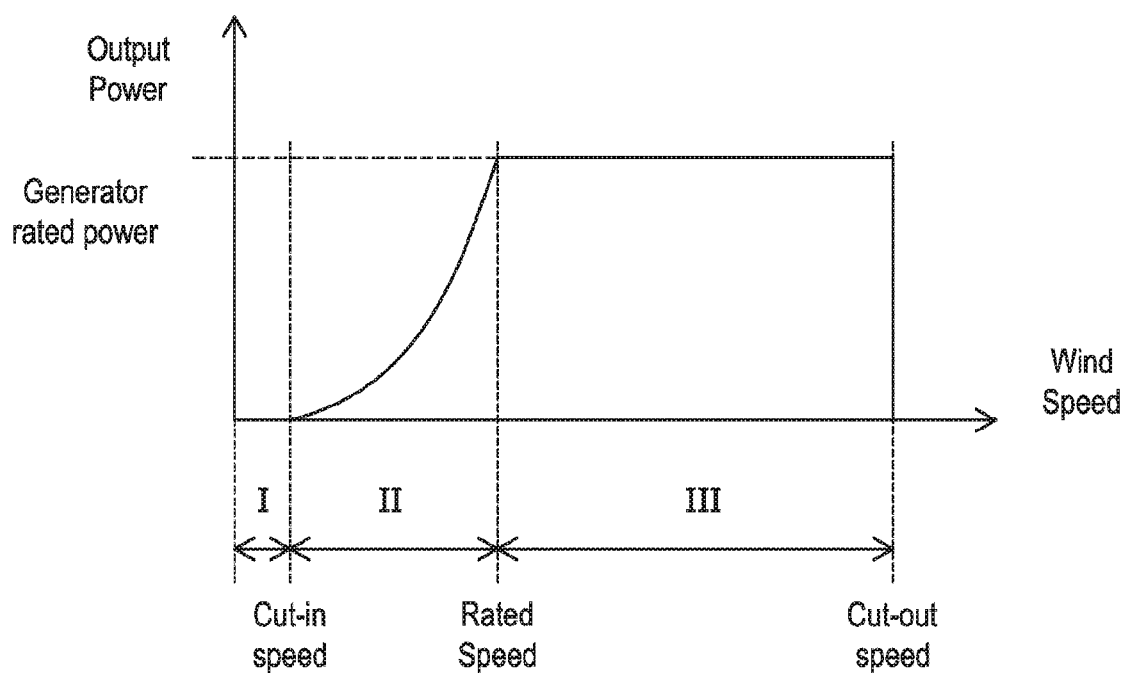
FIG. 1 is a graph illustrating output power versus wind speed for a typical wind turbine.

With reference to FIG. 1, a typical wind turbine (WT) operates based on a power curve, within which the domain can be divided into three regions. In Region I, the power output is zero because of low wind speed. In Region II, output power increases by a cube of the wind speed until generation capacity of the turbine is reached. In Region III, as wind speed reaches and surpasses the rated speed, the WT maintains constant output power. For example, excessive energy in the wind is trimmed away by blade pitching. Finally, when wind speed exceeds cut-out speed, the output returns to zero (e.g., when the wind speed is out of the safe operating range).

Figure 2:
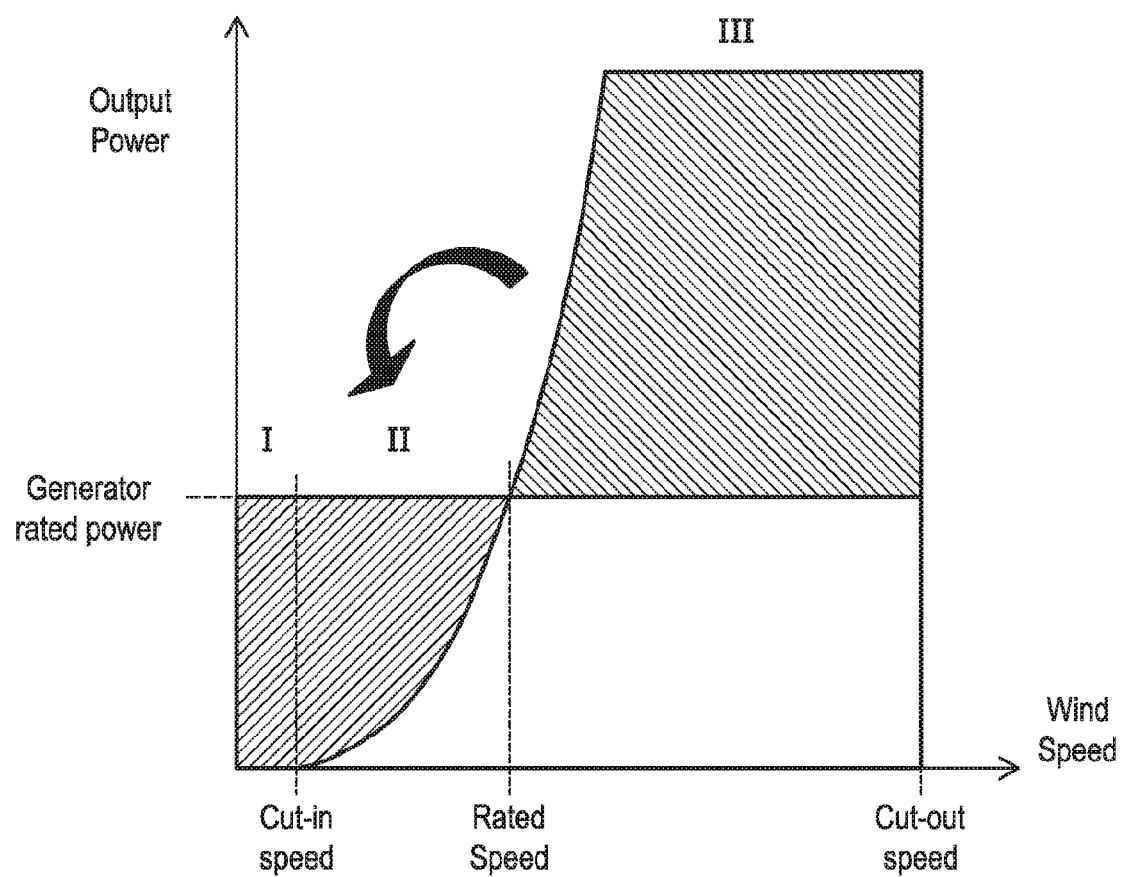
FIG. 2 is a graph illustrating output power versus wind speed for a wind turbine in accordance with example embodiments of the present disclosure, where mechanical spillage and electrical capacity vacancy are shown.

However, until the wind reaches rated speed at the end of Region II, a WT is unable to utilize its full electric generation capacity. This unused capacity can be referred to as capacity vacancy and is depicted in the shaded area in Regions I and II in FIG. 2. Thus, a capacity vacancy ratio can be defined as the unused portion of capacity over the full capacity. While in Region III, a great amount of wind energy is trimmed away because of the power limitation of the turbine generator, causing mechanical spillage. Mechanical spillage can be defined as the difference between potential power that blades can extract from the wind and the rated power of the generator, as shown as the shaded area in Region III in FIG. 2. It should be noted that in the case of a grid-connected infinite bus system, although no electric spillage may be present, mechanical spillage still exists.

Figure 3A:
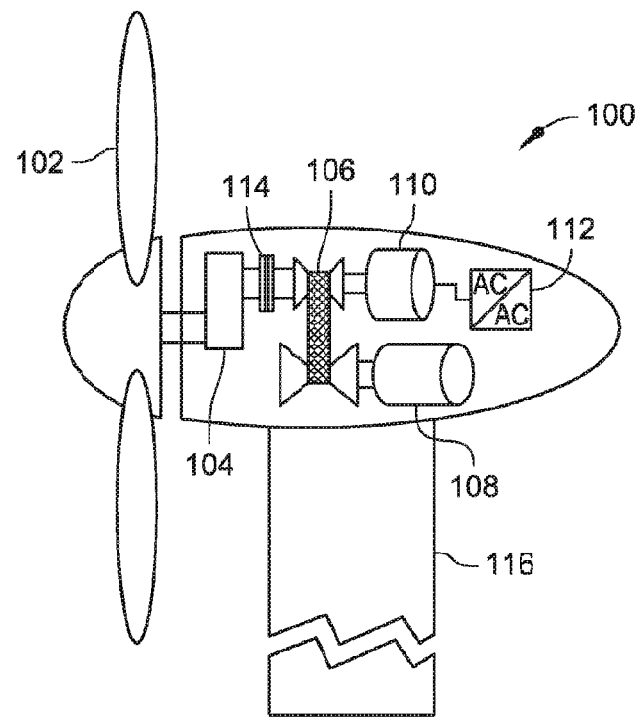
FIG. 3A is a diagrammatic illustration of a wind energy conversion system in accordance with example embodiments of the present disclosure, where the wind energy conversion system can employ a high-speed variable displacement machine.
Figure 3B:
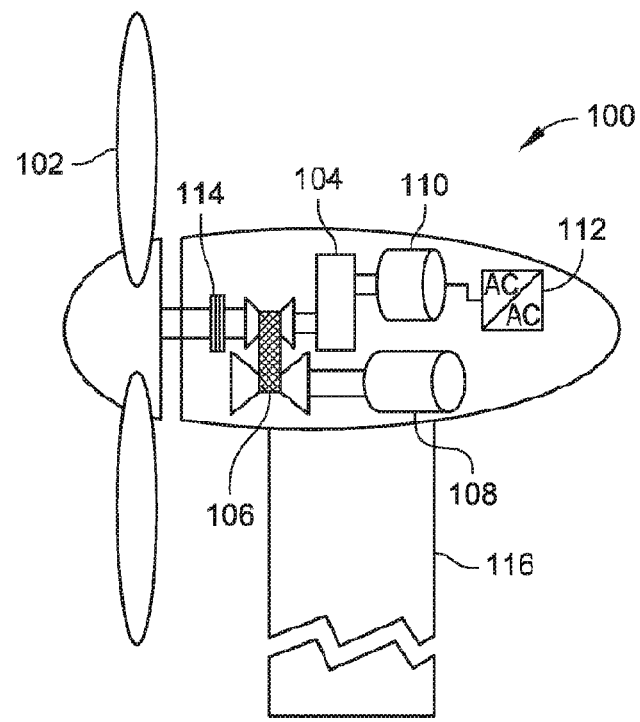
FIG. 3B is another diagrammatic illustration of a wind energy conversion system in accordance with example embodiments of the present disclosure, where the wind energy conversion system can employ a low-speed variable displacement machine.

The systems, apparatus, and techniques described herein provide energy conversion systems that can divert mechanical spillage into compressed fluid storage and regenerate electricity from the storage system, increasing overall wind power generation. With reference to FIGS. 3A and 3B, wind energy conversion systems are described. In example embodiments, a wind energy conversion system 100 can include blades 102, a gearbox 104 with a continuously variable transmission (CVT) 106, a variable displacement machine (VDM) 108, a generator 110, a fluid tank (not shown), and a converter 112 (e.g., an AC/AC converter). The system 100 can also include a clutch 114. In embodiments of the disclosure, one or more components of a system 100 can be mounted to, for example, a tower 116. In preferred embodiments of the disclosure, the system 100 uses a compressed fluid-assisted VDM 108 coupled with a gearbox 104 through the CVT 106 and the fluid tank. The grid can be an infinite single bus system; and the wind turbine can be connected to the grid through a point of common coupling (PCC), forming a community-scale microgrid. In some embodiments, the system can serve the house load, while connected to the grid through the PCC.

Figure 4:
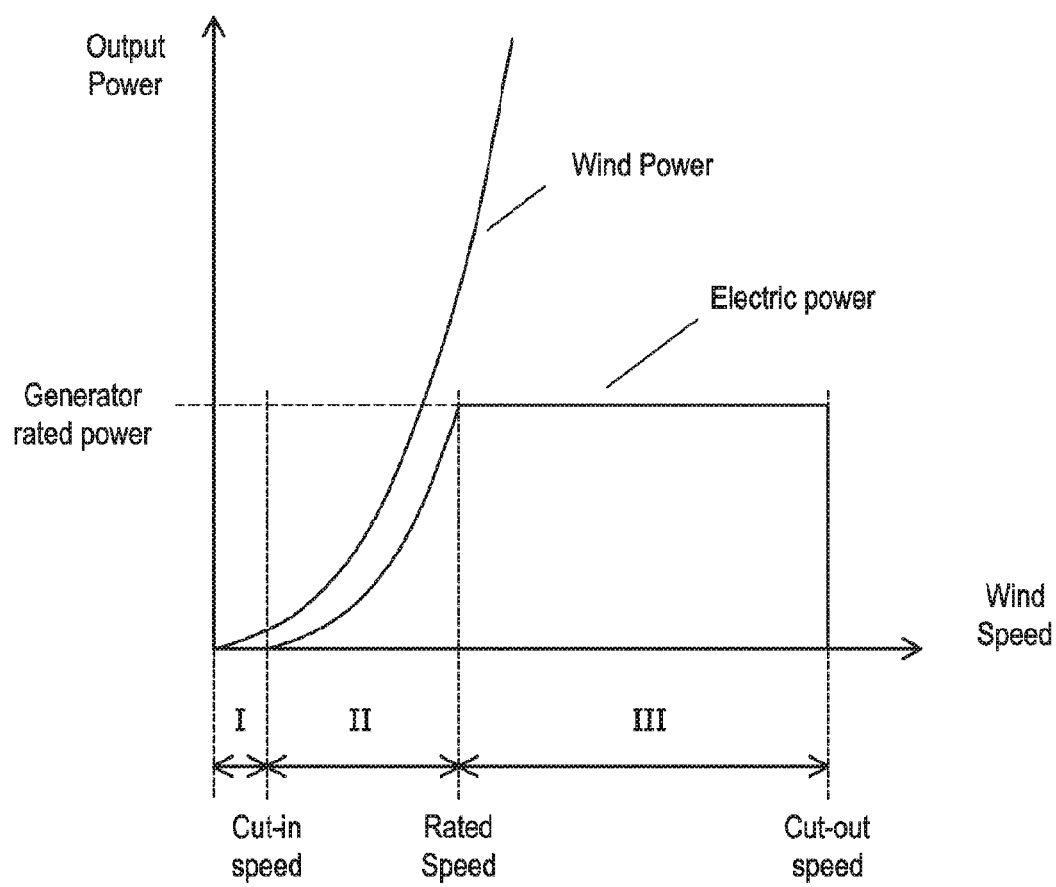
FIG. 4 is a graph illustrating output power versus wind speed for a wind turbine, where wind power and generator power are shown as a function of wind speed.

Power that the wind turbine can extract from the wind can be described as follows:

$$P_B = \tfrac{1}{2} \rho A V_W^3 C_p(\beta, \lambda)$$

where $\rho$ is the air density, $A=\pi R2$ is the swept area, $V_W$ is the wind speed, and $C_p$ is the power coefficient of the turbine. The power coefficient $C_p$ is a function of the blade pitch angle $\beta$ and tip speed ratio $\lambda$. The tip speed ratio is defined as blade tip linear speed over wind speed. When a favorable tip speed ratio is maintained, the power in the wind is proportional to the cube of the wind speed, shown as the curve in section II in FIG. 4. However, because of electrical capacity limitations and mechanical loss, electrical power only occupies a small portion of total wind energy, shown as the "Wind Power" curve in FIG. 4.

Figure 5:
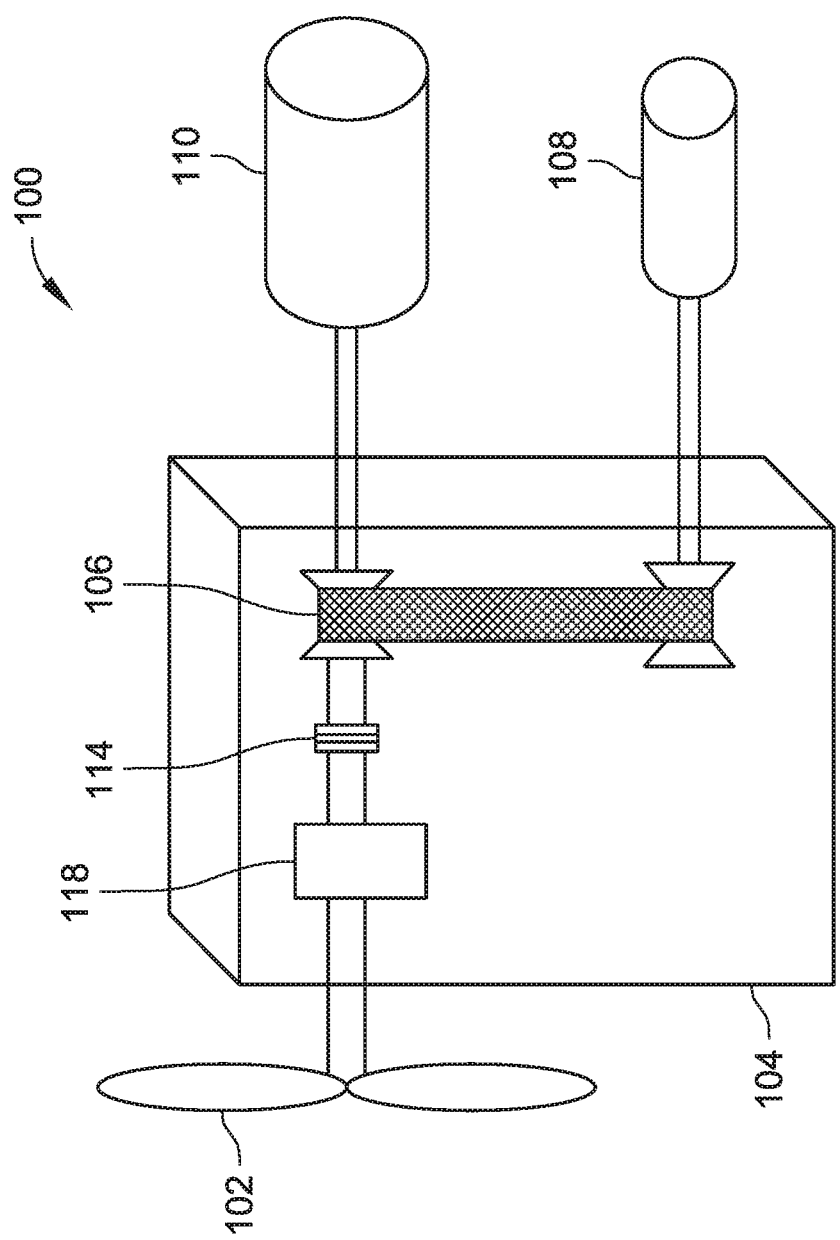
FIG. 5 is a diagrammatic illustration of a gearbox and associated connections for a wind energy conversion system, such as the wind energy conversion system shown in FIG. 3, in accordance with example embodiments of the present disclosure.

Some wind turbine systems are equipped with an increasing gear between the wind turbine and the generator to increase the rotation speed to a favorable operating speed of the generator. As described herein, a CVT 106 is combined with the high-speed shaft of an increasing gear 118 to enable flexible power distribution among the generator 110 and VDM 108, as shown in FIG. 5. A clutch 114 can be placed between the increasing gear 118 and the CVT 106 (e.g., for disengagement). In some embodiments a wind energy conversion system 100 can use an increasing gear 118 to ensure that the rotation speed of a generator 110 is within operational specifications. A clutch 114 can be used to disengage the blades 102 while the wind speed is below cut-in speed and the VDM 108 is directly driving the generator 110. A CVT 106 can enable a continuously adjustable transmission ratio during operation. In this manner, the CVT 106 can operate as a pair of meshed gears, but with an infinite and continuous gear ratio. Further, with the use of the CVT 106, the VDM speed and the blade speed can be decoupled under various power delivery patterns.

In embodiments of the disclosure, the CVT 106 can be a transmission system to deliver mechanical power with a variable transmission ratio. Transmission ratio may be defined as the gear ratio between the input and output gears. In some embodiments, the concept can be extended to describe the driven/driving ratio in various transmission systems. The CVT 106 allows the transmission ratio of the system 100 to be continuously adjustable during operation, which enables the ratio of torque and speed to be adjusted to reach desired operational points. Some examples of CVTs include, but are not necessarily limited to: a variable-diameter pulley (VDP), an Extroid CVT, an infinitely variable transmission (IVT), and so forth.

Figure 6:
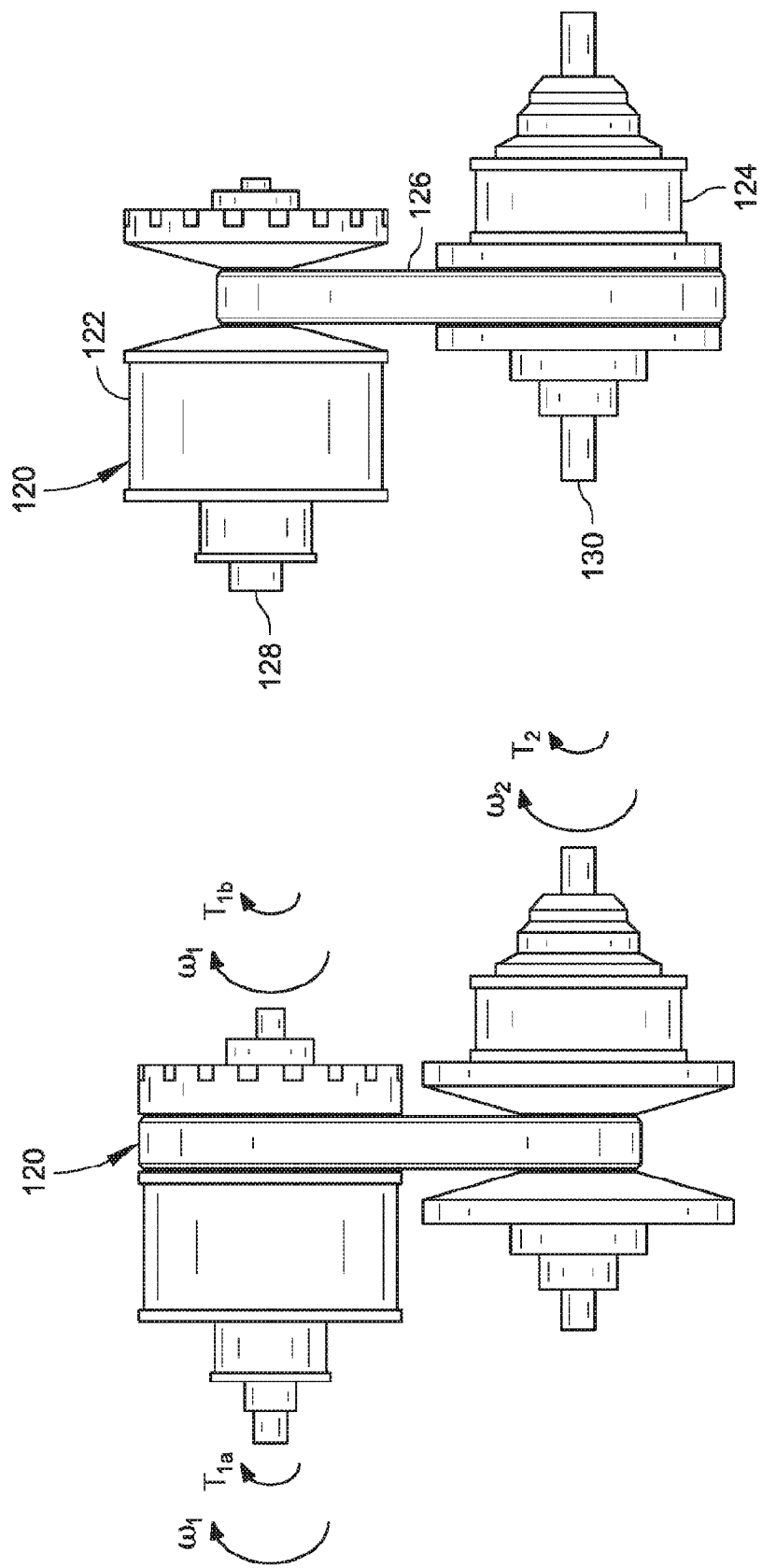
FIG. 6A is a diagrammatic illustration of a variable-diameter pulley continuously variable transmission, where the variable-diameter pulley continuously variable transmission is shown in an increasing gear state in accordance with example embodiments of the present disclosure.
FIG. 6B is a diagrammatic illustration of a variable-diameter pulley continuously variable transmission, where the variable-diameter pulley continuously variable transmission is shown in a reduction gear state in accordance with example embodiments of the present disclosure.

In some embodiments, a variable-diameter pulley (VDP) 120 can be used as a CVT. As shown in FIGS. 6A and 6B, a VDP 120 can include a drive pulley 122, a driven pulley 124, and a transmission chain/belt 126. The upper shaft can be defined as the primary shaft 128, which is connected to the prime mover on the left and the primary load on the right. The lower shaft can be defined as the secondary shaft 130, which is connected to the secondary load on the right. The two pulleys 122 and 124 can be connected through a chain and operated in the same manner as a drive gear meshed with a driven gear.

A pulley can be formed of a pair of opposing cones, enabling the distance between the two cones to be adjusted to vary the effective diameter. As the effective diameters of the primary and secondary shafts are continuously changing, the transmission ratio on the chain is changed accordingly. As shown in FIGS. 6A and 6B, moving the drive pulley halves apart results in a smaller effective diameter of the primary shaft, while moving the driven pulley halves closer provides the secondary shaft with a larger effective diameter. These operations can result in a reduction gear state (e.g., as shown in FIG. 6B) and a reduction transmission ratio or an increasing gear state (e.g., as shown in FIG. 6A) and an increasing gear ratio.

The positive direction reference can be arbitrarily set as the clockwise rotational direction viewed from the right-hand side. The power balance of the gearbox can be described as follows:

$$T_{1a}\Omega_1 + T_{1b}\Omega_1 + T_2\Omega_2 = 0$$

and the speed relation of the gearbox can be described as follows:

$$\Omega_1 R_1 = \Omega_2 R_2$$

$R_{CVT}$ can be used to represents the transmission ratio of the CVT, defined by primary speed over secondary speed as follows:

$$r^{TR} = \frac{\Omega_1}{\Omega_2}, \; r^{TR} \in (B_L, B_U)$$

where ($T_{1a}$, $T_{1b}$, and $T_2$) represent the torques of the prime mover, primary load, and secondary load; and ($\Omega_1, \Omega_1$) represent the rotation speed of the primary and secondary shafts, respectively. The effective diameters of the primary and secondary shafts are represented by ($R_1, R_2$), respectively. Additionally, ($B_L$, $B_U$) represent lower and upper bounds of the transmission ratio of the CVT, respectively. In some embodiments, the CVT can be used to adjust the ratio between rotation speed and torque while maintaining at least substantially the same mechanical power.

Figure 7:
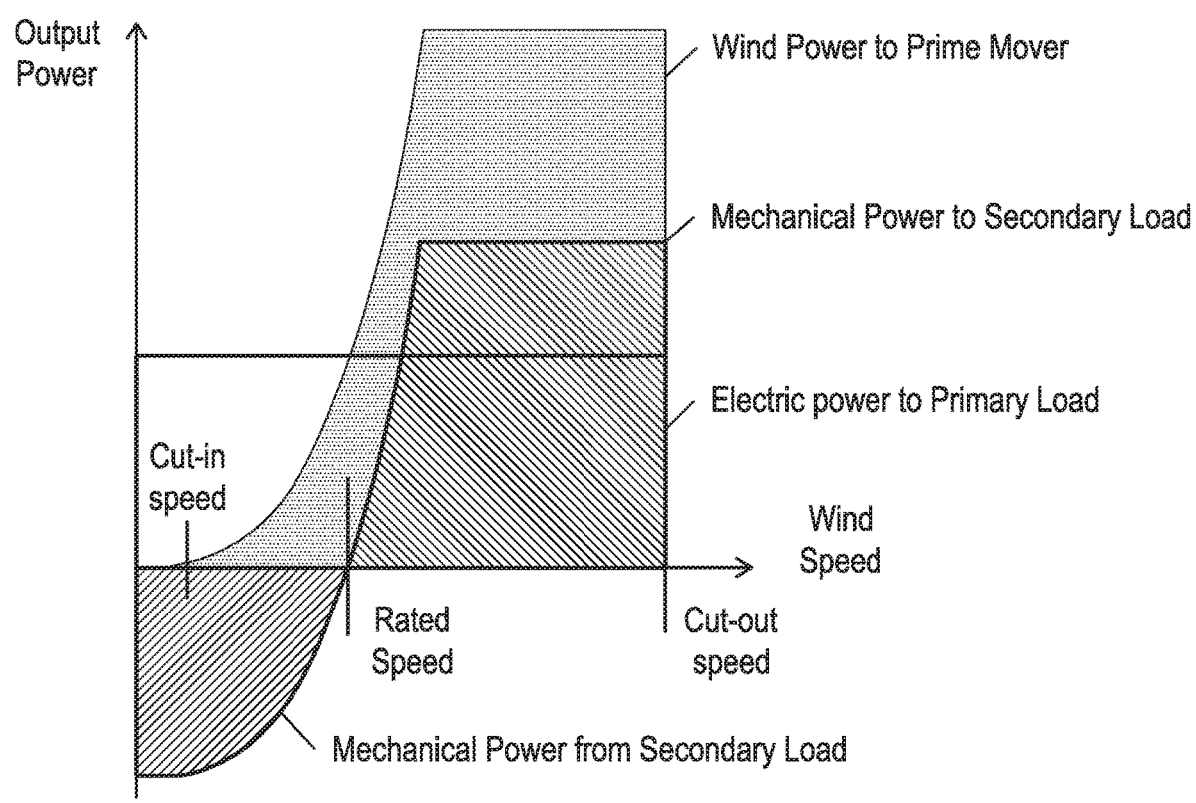
FIG. 7 is a graph illustrating output power versus wind speed, where a continuously variable transmission power curve versus wind speed is shown.

As described herein, the prime mover refers to the turbine blades; and the primary and secondary loads refer to the generator and the VDM load, respectively. The power distribution curve over wind speed is shown in FIG. 7, where the "Wind Power to Prime Mover" area represents wind power from the blades, the "Electric Power to Primary Load" rectangle represents the power to the generator, and the "Mechanical Power to Secondary Load" and "Mechanical Power from Secondary Load" shaded areas represent the mechanical power delivered to the VDM 108. It should be noted that in the context of the present disclosure, the terminology "absorbing minus power" is used to refer to supplying positive power.

The power balance on the gearbox can be described as follows:

$$P_t^B + P_t^{Vp} = P_t^{Gi} + P_t^{Vc}$$

where terms on the left side of the equation are contributive power, including the power from the blades 102 and from the VDM 108 in expander mode; and terms on the right side of the equation represent consumptive power, including the power to the generator and to the VDM 108 in compressor mode. In steady state analysis, the generative or input power and the consumptive or output power may be matched. The VDM 108 can also be subject to additional either-or constrains, as shown in the following equation (e.g., when it does not operate in both compressor and expander modes at the same time.)

$$P_t^{Vp} \cdot P_t^{Vc} = 0$$

The variable displacement machine 108 can be an axial multipiston device to compress or expand fluid, e.g., using the structures shown in FIGS. 8A through 8C and FIGS. 8D and 8E. It can be a reversible machine that may operate in either compression mode or expansion mode (e.g., depending upon the rotation direction and cylinder sequence). The compressor mode is used as an example to demonstrate its operation, and the working fluid specified can be air.

Figure 8A:
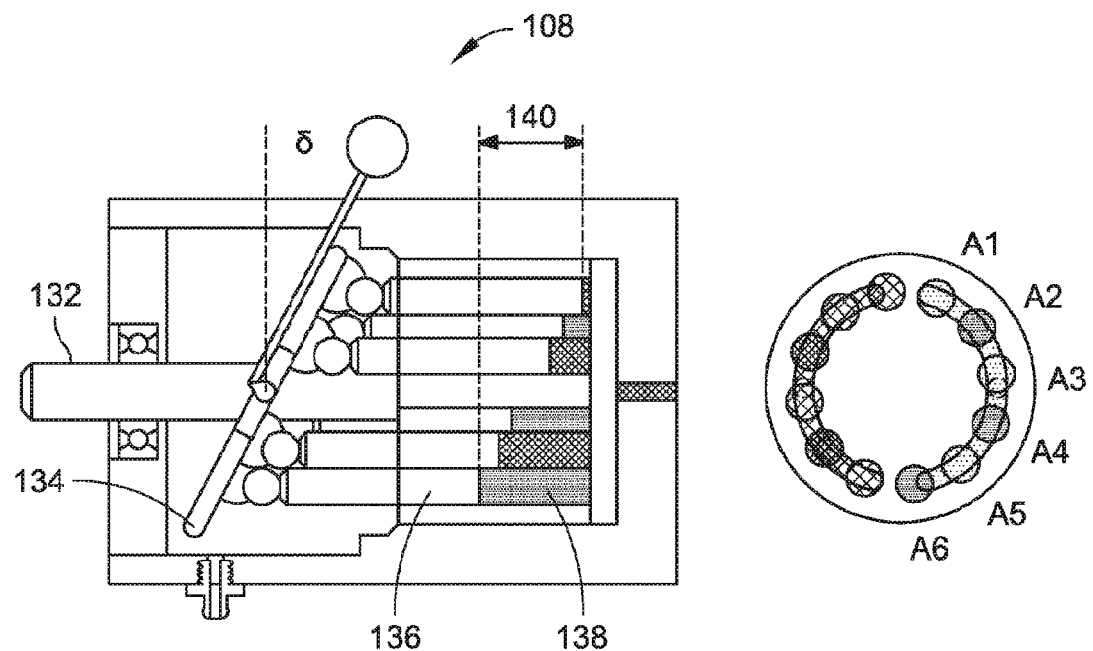
FIG. 8A is a diagrammatic illustration of wobble angle (or swash plate angle) adjustment of a variable displacement machine and associated cross-section states in accordance with example embodiments of the present disclosure, where a positive wobble angle/swash plate angle is shown.
Figure 8B:
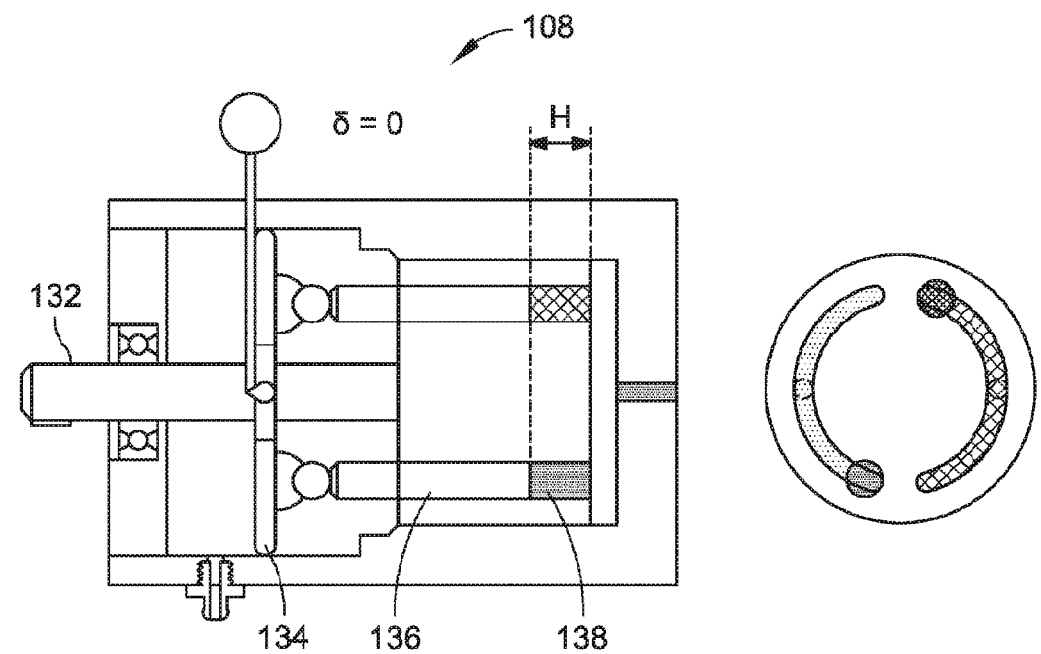
FIG. 8B is a diagrammatic illustration of wobble angle (or swash plate angle) adjustment of a variable displacement machine and associated cross-section states in accordance with example embodiments of the present disclosure, where a neutral wobble angle/swash plate angle is shown.
Figure 8C:
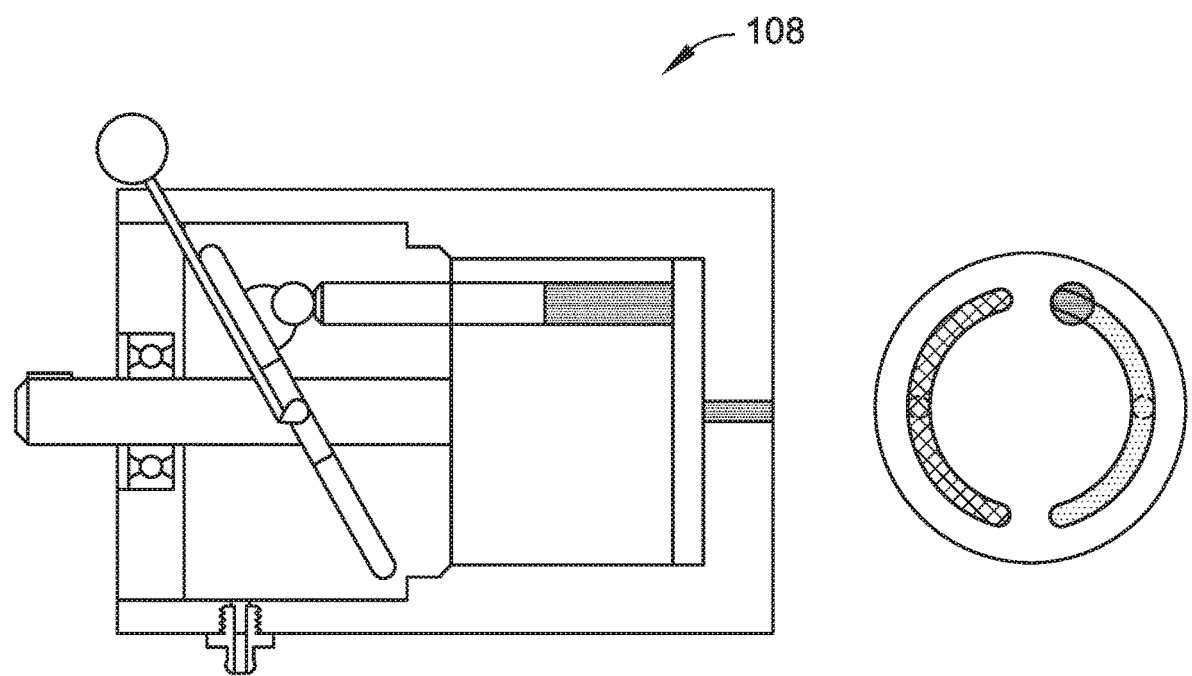
FIG. 8C is a diagrammatic illustration of wobble angle (or swash plate angle) adjustment of a variable displacement machine and associated cross-section states in accordance with example embodiments of the present disclosure, where a negative wobble angle/swash plate angle is shown.
Figure 8D:
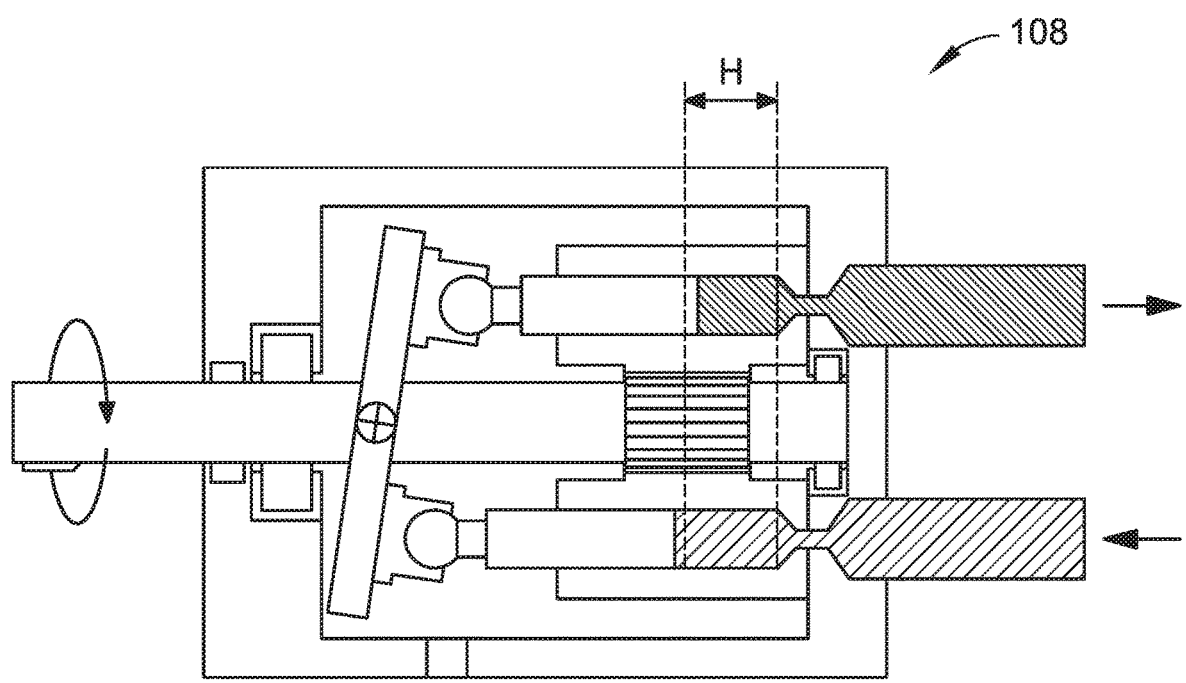
FIG. 8D is a diagrammatic illustration of neutral piston displacement adjustment of a variable displacement machine and associated cross-section states in accordance with example embodiments of the present disclosure, where a larger neutral piston displacement is shown.
Figure 8E:
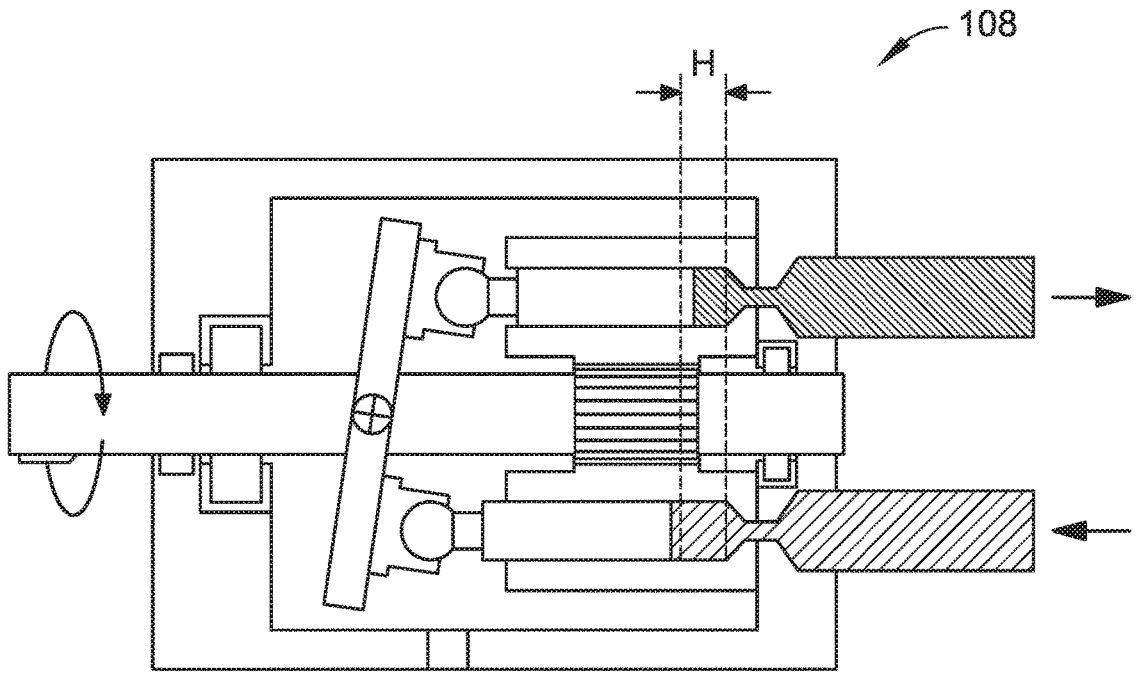
FIG. 8E is a diagrammatic illustration of neutral piston displacement adjustment of a variable displacement machine and associated cross-section states in accordance with example embodiments of the present disclosure, where a smaller neutral piston displacement is shown.

As described herein, a VDM 108 can include a driveshaft 132, a wobble plate 134, multiple pistons-and-cylinders, and a housing. The wobble plate 134 can be mounted on the driveshaft 132, and multiple pistons 136 can be mounted on the wobble plate 134 around and parallel to the driveshaft 132. In embodiments of the disclosure, the VDM 108 can also include an air chamber 138. By adjusting the wobble angle δ, the VDM 108 is able to adjust the stroke 140 of the cylinders (e.g., as shown in FIGS. 8A through 8C). The neutral piston displacement (NPD) is represented by H, measuring the distance between the piston head and cylinder bottom, while the wobble plate 134 is in a neutral position, or δ=0 (e.g., as shown in FIG. 8B). The area of the cylinder bottom is represented by S. It can be assumed that by sliding the wobble plate 134 along the driveshaft 132, the NPD is able to adjust its distance accordingly (e.g., as shown in FIGS. 8D and 8E).

First, the behavior of the air in a single cylinder is analyzed. The initial volume $V_1$ and final volume $V_2$ can be calculated as follows:

$$V_1 = (H + R^D \sin \delta) \cdot S$$

$$V_2 = (H - R^D \sin \delta) \cdot S$$

where S represents the area of the cylinder bottom, and R represents the radius of the wobble plate 134. The compression ratio can be defined as shown in the following equation, as the ratio of initial volume over the final volume.

$$\gamma^{Vc} = \frac{V_1}{V_2} = \frac{H + R^D \sin \delta}{H - R^D \sin \delta}$$

Constraints on wobble angle and the NPD can be described as follows:

$$\delta \in \left( -\frac{\pi}{2}, \frac{\pi}{2} \right)$$

$$H > R^D \sin \delta$$

A numerical example of the compression process may be demonstrated as follows. The six cylinders in FIG. 9 correspond to the six points, A1 through A6, on the right half of the cross-section plot of the VDM housing in FIG. 8A. As the piston begins to push the air in the chamber at state A1, the volume becomes smaller and smaller, leading to a gradual pressure increase, until the chamber pressure equals the tank pressure at state A6. Then, this amount of air is exhausted to the tank. While the pistons are driven by the wobble plate 134, each cylinder experiences the state changes from A1 to A6 to compress the air.

Figure 9:
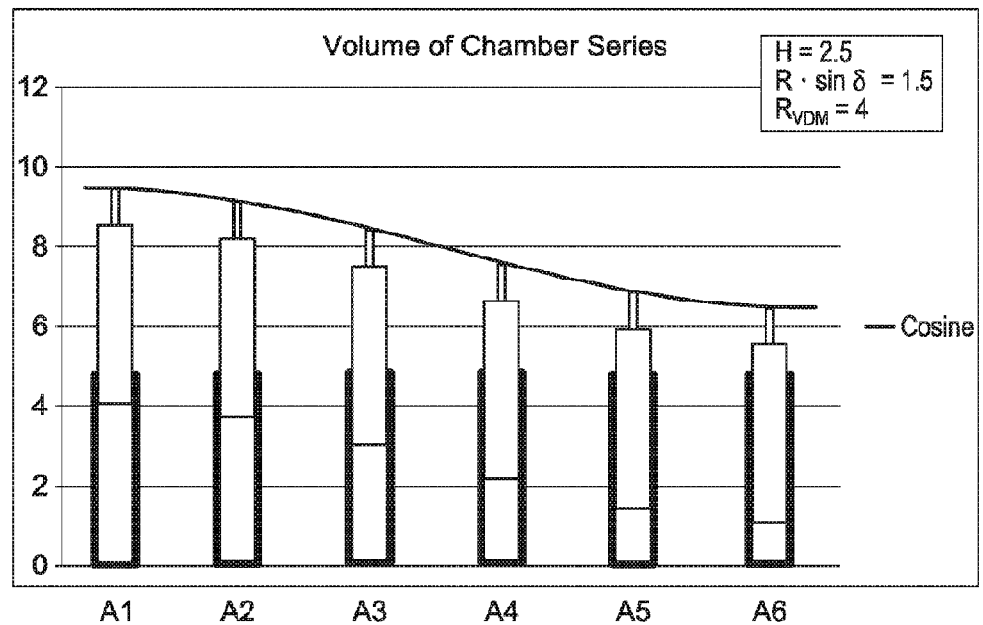
FIG. 9 is a graph illustrating variable displacement machine chamber series conditions during compression at a first wobble angle.
Figure 10:
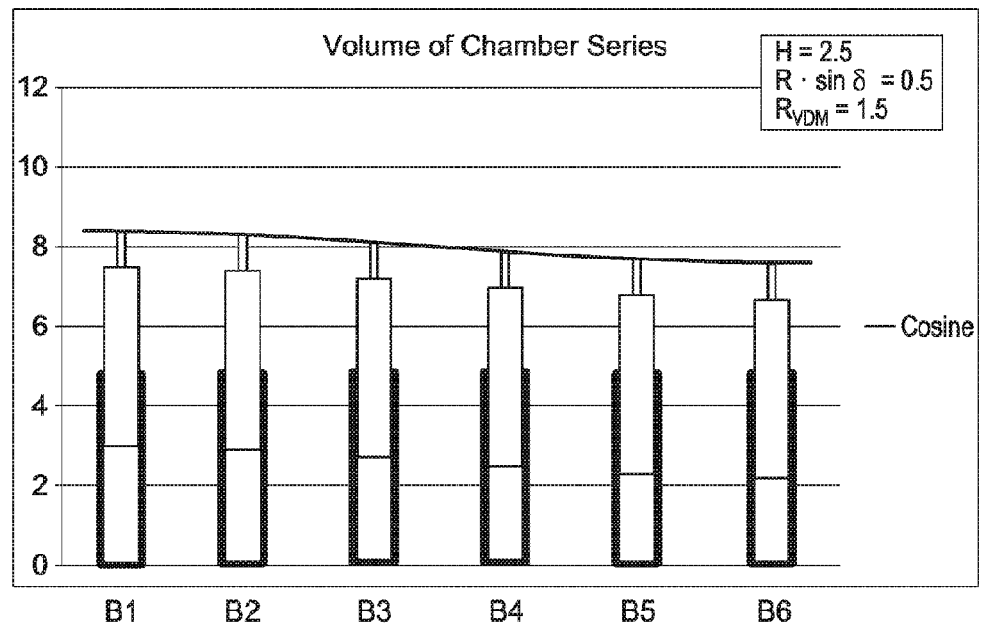
FIG. 10 is a graph illustrating variable displacement machine chamber series conditions during compression at a second wobble angle.
Figure 11:
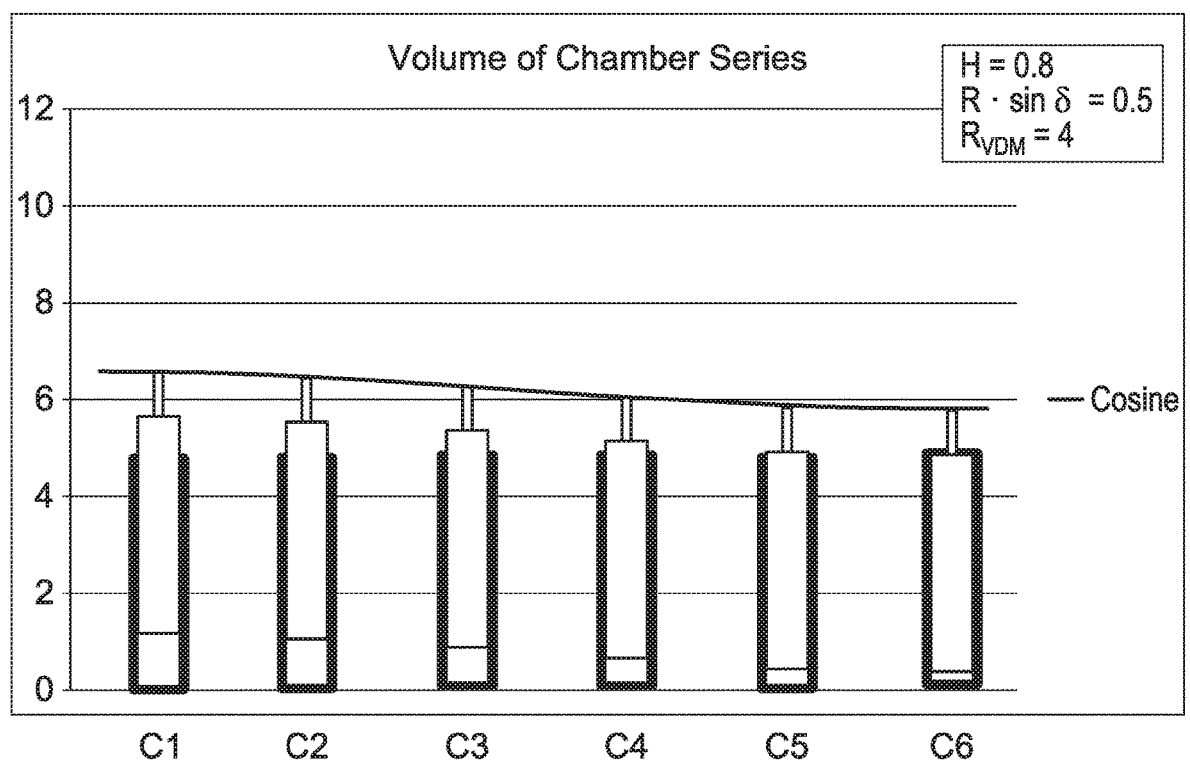
FIG. 11 is a graph illustrating variable displacement machine chamber series conditions during compression at the first wobble angle, with a decreased neutral piston displacement.

If the wobble angle is varied while keeping the same NPD, the compression ratio changes correspondingly. Thus, the wobble angle can be varied to adjust the compression ratio. With reference to FIGS. 9 and 10, a reduction in the wobble angle can change the compression ratio from about four (4) (e.g., as shown in FIG. 9) to about one and one-half (1.5) (e.g., as shown in FIG. 10). It should be noted that this range is provided by way of example and is not meant to limit the present disclosure. Thus, in other embodiments, the compression ratio can be changed from about fifty (50) to about one (1) or within another range. However, when the wobble angle is maintained at a substantially constant angle, varying the NPD may also adjust the compression ratio to a desired value. As shown in FIG. 11, decreasing the NPD from two and one-half (2.5) per units (p.u.) to eight-tenths (0.8) p.u. may restore the compression ratio back to four (4) (e.g., compared to FIG. 10). Thus, as described herein, the wobble angle can be used to adjust the stroke of the piston 136, while the NPD can be used to restore and/or readjust the compression ratio.

Chamber compression dynamic characteristics may be derived from the ideal gas law and adiabatic process formulas as follows:

$$\frac{p_1 V_1}{T_1} = \frac{p_2 V_2}{T_2} = nR$$

$$p_1 V_1^\gamma = p_2 V_2^\gamma$$

where $p_1$, $V_1$, and $T_1$; and $p_2$, $V_2$, and $T_2$ are the pressure, volume, and temperature of gas in its initial and final states, respectively; and γ is the adiabatic index for the gas.

The isothermal process describes a process in which the state of the ideal gas moves along the isothermal curve without any temperature changes. It can be used as a basic reference to calculate the amount of energy that the compressed air contains as it does not incur any heat loss. Thus, the net compressed energy calculation can be based on the work that pushes the gas slightly from the initial point to the destination point along the isothermal curve. To model both the stored energy and heat loss, this process may be decomposed into two steps: the adiabatic process and the cooling process.

Figure 12:
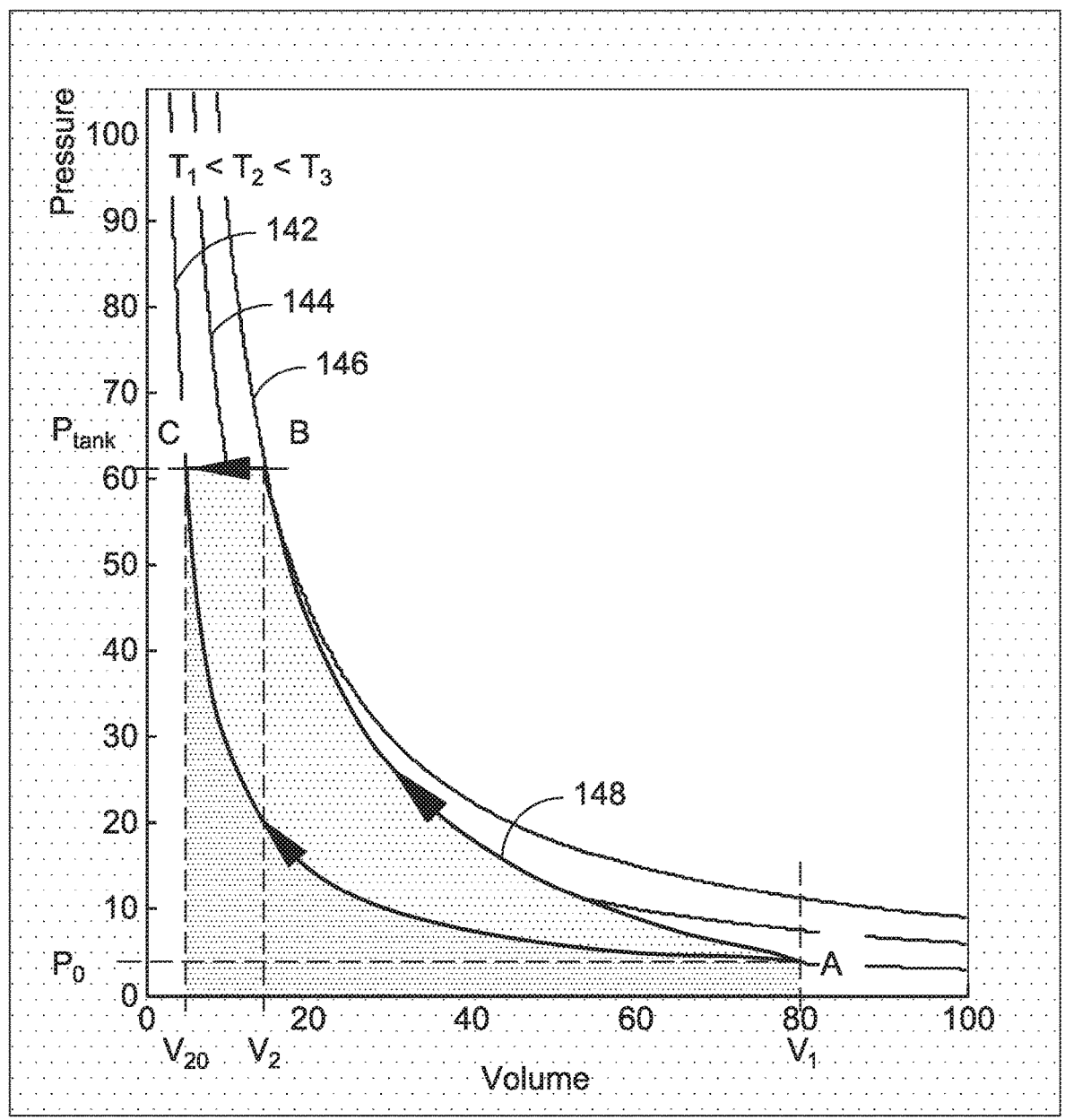
FIG. 12 is a graph illustrating pressure versus volume for an isothermal compression equivalent process of an adiabatic process plus an isobaric process.

A numeric example of the compression process in the chamber is presented in FIG. 12. The three curves 142, 144, and 146 represent isothermal curves for the same amount of gas under different temperatures. At the first stage, assuming the compression is instant and heat is not able to dissipate at the moment, the process approximates the adiabatic compression on the curve 148 from A to B. The volume compression from V1 to V2 causes the temperature to rise from three hundred Kelvin (300K) to four hundred Kelvin (400K), resulting in a significant air pressure increase from $p_0$ to $p^T$. At the second stage, the heat in the gas gradually dissipates to the atmosphere, and the volume shrinks. The state of the compressed air drops from B to C along the isobaric curve. Combining the two stages, the net stored energy can be equivalent to the energy through the isothermal process from A to C. The input power to the VDM is represented by the dotted area covered by ABC between V1 and V20. Compared with the final energy to the tank in the dotted area AC between V1 and V20, the amount of energy between the curve 148 and the curve 142 in area ABC may be wasted in the form of heat dissipation.

The adiabatic process from A to B, the isobaric process from B to C, and the isothermal process from A to C may be calculated as follows:

$$W_{AB} = \frac{p_0 V_1^\gamma}{\gamma - 1}(V_2^{1-\gamma} - V_1^{1-\gamma})$$

$$W_{BC} = p^T(V_2 - V_{20})$$

$$W_{AC} = p_0 V_1 \mathrm{Ln}\left(\frac{V_1}{V_{20}}\right)$$

where $p^T$ is air pressure in the tank, and $p_0$ represents atmospheric pressure. The previous calculation reveals an effect of the internal heat generated by compression, as the work of $W_{BC}$ and part of the work of $W_{AB}$. Heat recycling technology is a way to diminish this waste. Thus, heat recycling technologies can be used to improve efficiency, including mist spray. For example, mist spray can be introduced into the chamber to absorb heat, as well as to reduce the temperature of the compressed air. The effect of this process can be equivalent to reducing the adiabatic index $\gamma$ to a low level $\gamma'$. In this manner, the adiabatic process AB can be moved towards the isothermal process AC, and a quasi-isothermal process may be approximated, e.g., like the ideal isothermal process subject to an efficiency loss.

Figure 13:
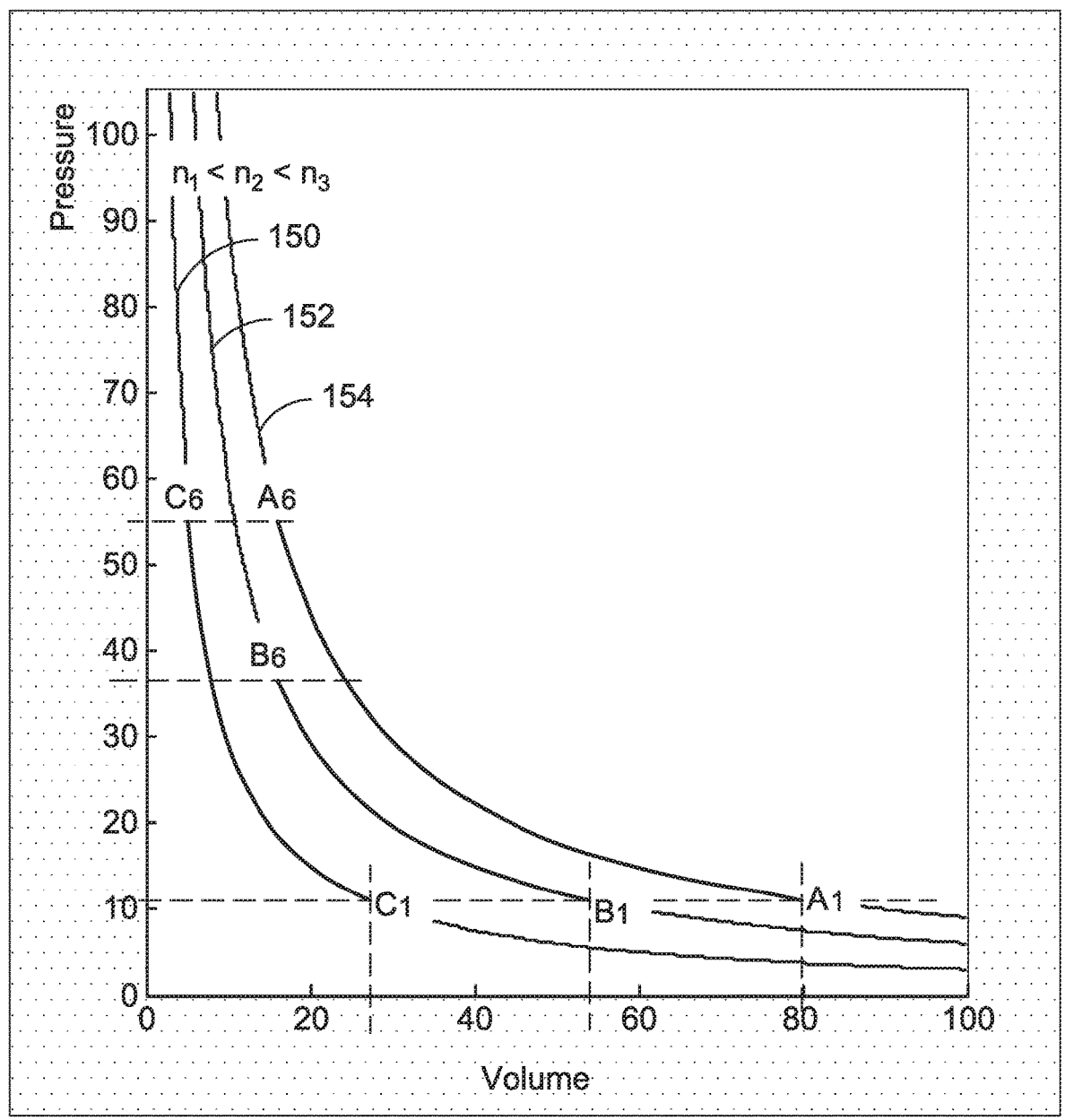
FIG. 13 is a graph illustrating pressure versus volume for isothermal compression curves for different amounts of gas in moles.

FIG. 13 shows the compression processes of different amounts of air, e.g., as illustrated in FIGS. 9, 10, and 11, mapped onto the parallel isothermal curves. Different from the coordinates in FIG. 12, the three curves 150, 152, and 154 in FIG. 13 represent different amounts of gas in moles as $n_1 < n_2 < n_3$. Curve A1-A6 represents the energy storage process in FIG. 9. The processes in FIGS. 10 and 11 are represented as curves B1-B6 and C1-C6, respectively. The comparison between A1-A6 and B1-B6 shows reducing the wobble angle may decrease the final pressure of compression. The comparison between A1-A6 and C1-C6 demonstrates that a shorter stroke can also provide at least substantially the same final pressure as a larger stroke does (e.g., at the same compression ratio).

The relationship between compression ratio and 'wobble angle-NPD' pair can be described by the following equation. Because the compression process ensures that the atmospheric air is compressed to tank pressure, it may place another constraint on the compression ratio. Thus, the compression rate may be determined by the tank pressure condition.

$$\gamma^{V_c} = \frac{p^T}{p^o}$$

In embodiments of the disclosure, the compression ratio can be maintained at least substantially constant by fixing the ratio between the sine of wobble angle and the NPD. Thus, changing the NPD according to the adjustment of wobble angle can maintain at least substantially the same compression ratio.

$$\frac{R^D \sin\delta}{H} = \frac{\gamma^{V_c} - 1}{\gamma^{V_c} + 1}$$

Figure 54:
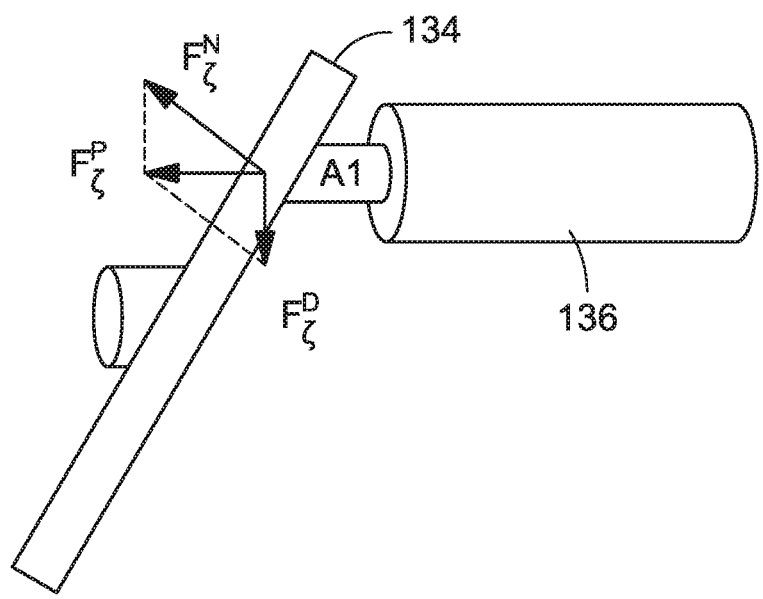
FIG. 54 is a side view illustrating a wobble plate force analysis in accordance with example embodiments of the present disclosure.
Figure 55:
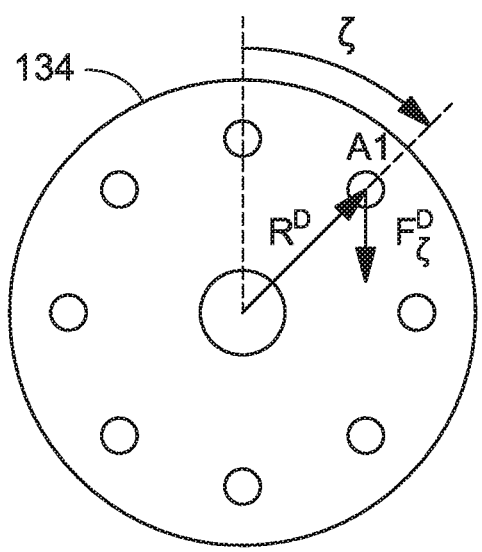
FIG. 55 is a front view illustrating a wobble plate force analysis in accordance with example embodiments of the present disclosure.

With reference to FIG. 54, a side view of a wobble plate force analysis is presented, where the piston force at position $\zeta$ on the wobble plate is represented by $F_\zeta^P$, and this force is decomposed to the orthogonal component $F_\zeta^N$, which is perpendicular to the wobble plate; and tangential force component $F_\zeta^D$, which is perpendicular to the shaft of wobble plate. A front view of wobble plate torque analysis is shown in FIG. 55, where the polar angular position of piston A1 is represented by $\zeta$ and the effective radius of the wobble plate 134 is represented by $R^D$, measuring the distance between the wobble shaft and the piston shaft.

The single piston force on the wobble plate is derived as follows. The volume of chamber at position $\zeta$ is represented by $$V_\zeta = H + R^D \sin\delta \cos\zeta$$

The relative compression ratio at position $\zeta$ is given as follows:

$$\gamma_\zeta^{V_c} = \frac{H + R^D \sin\delta}{H + R^D \sin\delta \cos\zeta}$$

The pressure at this point is the product of relative compression ratio and initial pressure as follows:

$$p_\zeta = \gamma_\zeta^{V_c} p^o = \frac{H + R^D \sin\delta}{H + R^D \sin\delta \cos\zeta} p^o$$

And the piston force at this point is the pressure ratio multiplying piston surface area as follows:

$$F_\zeta^P = p_\zeta S = \frac{H + R^D \sin\delta}{H + R^D \sin\delta \cos\zeta} p^o S$$

The tangential component is calculated by as follows:

$$F_\zeta^D = F_\zeta^P \tan\delta = \frac{H + R^D \sin\delta}{H + R^D \sin\delta \cos\zeta} p^o S \tan\delta$$

The driving torque is expressed as follows:

$$T_\zeta = F_\zeta^D R_\zeta = \frac{H + R^D \sin\delta}{H + R^D \sin\delta \cos\zeta} p^o S R^P \tan\delta \sin\zeta$$

Since the torque is derived at a single position, the average and/or expected torque on the wobble plate is calculated by the integration of the torque at position $\zeta$ throughout the half wobble plate from 0 to $\pi$, as follows:

$$T^D = \frac{1}{\pi} \int_{\zeta=0}^{\pi} F_\zeta^D R_\zeta d\zeta$$

Since the integration will eliminate the variable $\zeta$, the torque on the wobble plate is a function of 'wobble angle-NPS' pair (H, $\delta$). Thus, the wobble plate torque can be represented as follows:

$$T^D = f_{H,\delta}^D$$

On the other side, in order to achieve a steady state, this torque is equal to the torque that is delivered to the secondary shaft of the CVT from the blade as shown in the following equation. Therefore, this equation indicates that the (H, δ) pair serves as the control variables to adjust wobble torque under different tank pressure to match the driving torque on secondary shaft of CVT.

$$T_2 = T^D = f_{H,\delta}^D$$

Recalling the definition from above, the compression ratio is also the function of 'wobble angle-NPS' pair, which could be simply expressed as follows. Jointly solving the previous equation and the following equation gives the reference of wobble angle and NPS under given wind speed condition and tank pressure status.

$$\gamma^{Vc} = f_{H,\delta}^\gamma$$

Although the wobble angle may affect the compression rate, the NPD can compensate for this effect and restore excursion of the compression rate. In this manner, the wobble angle can be used as an independent variable to maintain the torque balance on the secondary shaft of CVT.

It should be noted that if the wobble angle is reduced to a negative value, while keeping the same rotation direction, the previous analysis may still be applicable for the expansion process. A difference may appear when $\gamma^{Vc} > 1$ while compressing and $0 < \gamma^{Vp} < 1$ while expanding.

As described herein, an air tank is a storage component that works jointly with the VDM. Each tank may have a threshold of pressure beyond which excessive energy is released through a spill-valve. Thus, for a given volume and safety pressure, and a specified temperature, the maximum energy in a tank may be fixed, and can be referred to as the "storage capacity." In this sense, the compressed air storage may be analogous to battery storage, which can expand its capacity by parallelizing component units to constitute bulk storage. In some embodiments, an air tank may be used to store fluid (e.g., liquid, gas) at a pressure of up to about two hundred (200) Bar (e.g., at about one hundred and forty (140) Bar). Further, a minimum pressure may be maintained within an air tank (e.g., to avoid collapsing of the tank). As described herein, an air tank may be constructed from various materials, including, but not necessarily limited to: a plastic material (e.g., for underground applications), a metal material such as steel (e.g., for above ground applications), and so forth. It should be noted that for underground applications, earth surrounding an air tank may be used to support the container walls, possibly allowing a less rigid material to be used. Further, reduced and/or moderated underground temperatures may provide desirable fluid storage conditions.

The storage capacity of an air tank may be derived from the isothermal process of ideal gas and can be calculated as follows:

$$E_L^T = p_L^T V^T \ln \frac{p_L^T}{p_0}$$

where $p_L^T$ and $V^T$ are the pressure limit and volume of the tank, respectively; and $p_0$ refers to atmospheric pressure. This calculation shows that if atmospheric air (twenty degrees Celsius (20° C.), one (1) Bar) is fed into a one cubic meter (1.0 m³) tank until fourteen megapascals (14 MPa) (one hundred and forty (140) Bar) is reached through isothermal compression, the potential energy stored is approximately equal to ten kilowatt hours (10 kWh).

The energy balance in the tank can be expressed by the following equation. The energy at the period t+1 includes three parts, which are the remaining energy from the previous period, subject to leakage, plus additional generation, or minus subtractive consumption of potential energy during h respectively. It is noted that above constraints may also apply when the VDM 108 does not operate in both compression and expansion modes at the same time.

$$E_{t+1}^T = \eta^T E_t^T + \eta^{Vc} P_t^{Vc} h - P_t^{Vp} h / \eta^{Vp}$$

In some embodiments, to maintain the operation ability, there may be a minimum tank pressure requirement, corresponding to the following constraint, where the remaining energy in the tank is greater than a certain portion of its rated capacity, e.g., between five percent (5%) and twenty percent (20%).

$$E_t^T \geq 15\% \, E_L^T$$

Figure 14:
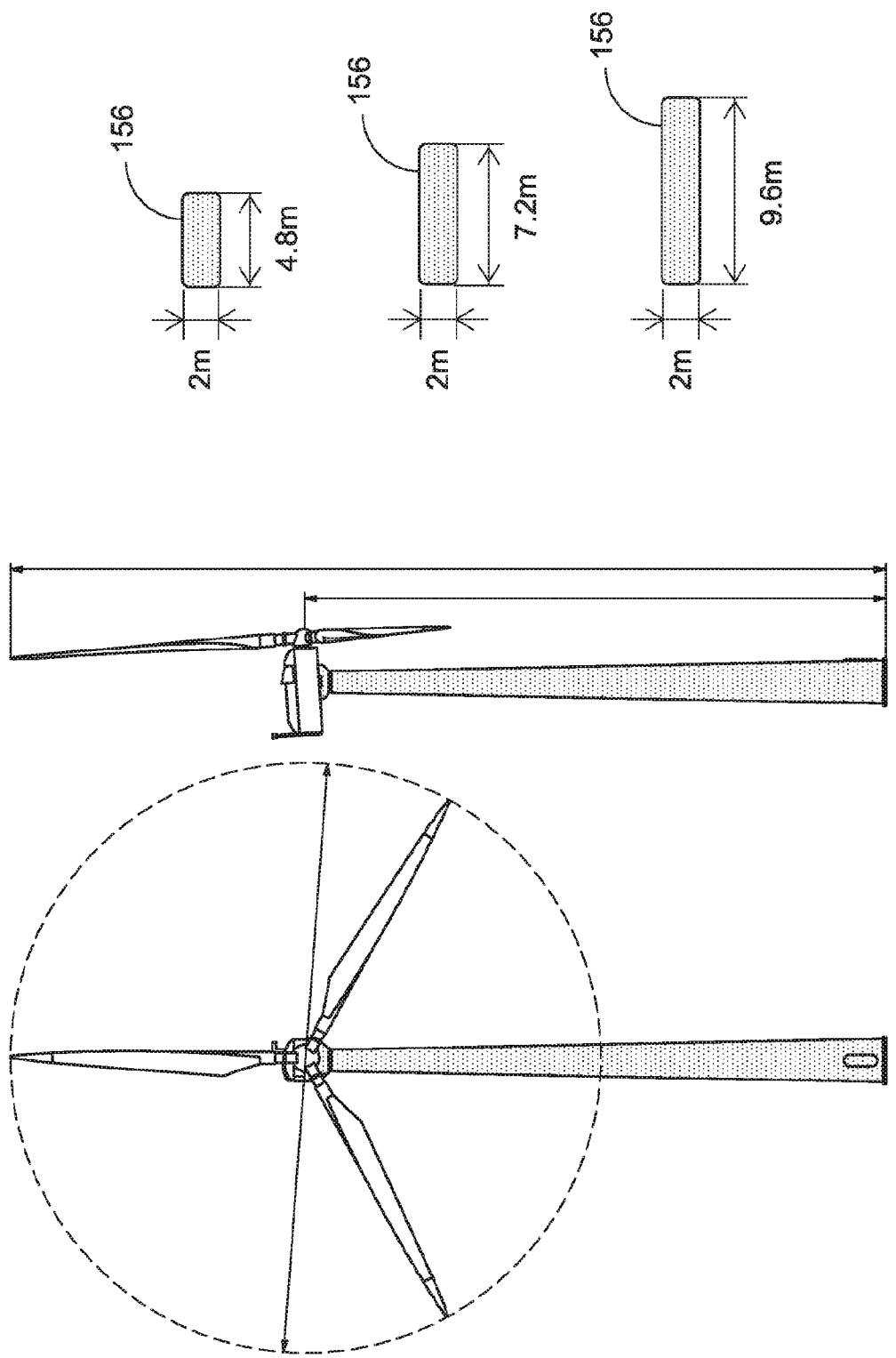
FIG. 14 is a diagrammatic illustration of a wind turbine with differently sized backup tanks versus backup time for each tank size in accordance with example embodiments of the present disclosure.

With reference to FIG. 14, air tanks 156 and a two hundred and fifty kilowatt (250 kW) wind turbine are shown at different backup levels. The sizes of storage tanks for full capacity generation are listed on the right of FIG. 14, corresponding to one (1.0) hour, one and one-half (1.5) hour, and two (2.0) hours backup of full capacity generation (e.g., at two hundred and fifty kilowatt hours (250 kWh), three hundred and seventy-five kilowatt hours (375 kWh), and five hundred kilowatt hours (500 kWh), respectively). With comparison to the size of the wind tower, in some embodiments a storage tank may be installed and/or concealed inside of the tower.

Figure 15:
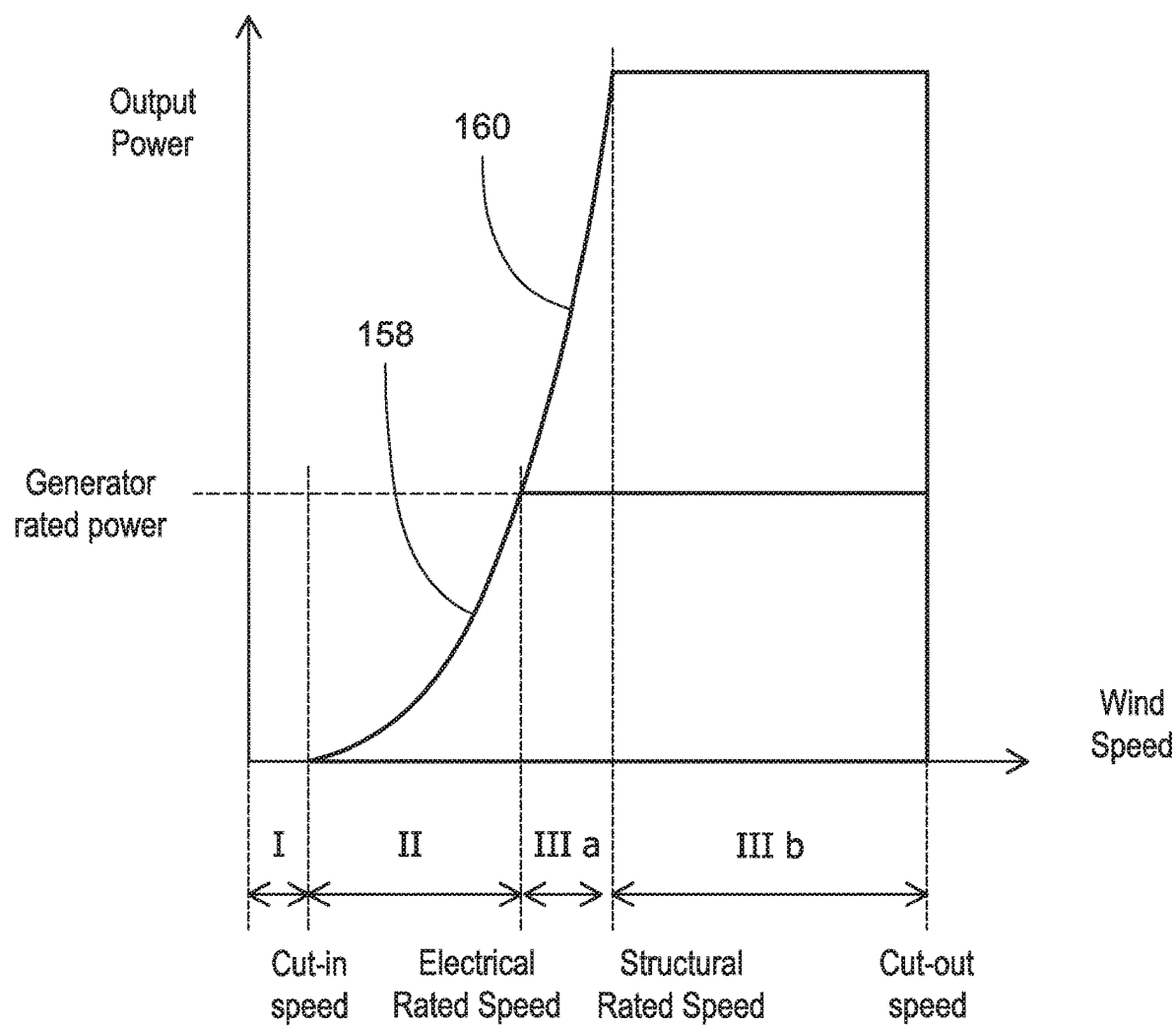
FIG. 15 is a graph illustrating wind power versus wind speed for blade control of a wind energy conversion system, such as the wind energy conversion system shown in FIG. 3, in accordance with example embodiments of the present disclosure.

With reference to FIG. 15, power curves for an example wind energy conversion system are shown. The curve 158 represents the power curve of a typical wind turbine (e.g., as shown in FIG. 1). The curve 160 represents the extended power that can be used by the VDM. Together, these two curves form the power curve of the example system.

As shown, the operational range may be segmented into four regions by four wind speed points, namely, cut-in speed, electrical-rated speed, structural-rated speed, and cut-out speed. Among them, electrical-rated speed is the point where the system reaches its rated electric power output, and structural-rated speed is the point where the system reaches its maximum structural power (due to structural capability of a WT). The space between electrical-rated power and structural-rated power represents the mechanical-rated power for the RVM.

Compared with a typical wind turbine power curve, differences are found in Region III, which can be divided into two regions in the example system. Operations in Regions IIIa and IIIb can be described as follows. In Region IIIa, the wind speed is between the electrical-rated speed and the structural-rated speed, where the electric power reaches its upper limit but mechanical power does not. The wind blades can still maintain a desirable tip-speed-ratio to extract maximum power from the wind. In this configuration, blade pitching can be deactivated. In Region IIIb, the wind speed is between the structural-rated speed and the cut-out speed, where both electric power and mechanical power reach their upper limits. In this region, the wind blades can decrease energy extraction efficiency (e.g., to maintain structural integrity). Thus, blade pitching control can be activated to maintain substantially constant intake power while the wind speed is increasing.

It should be noted that in Region I, the wind blades may not provide any input power to the system (beyond friction losses). Thus, in order to maintain generation capacity, the blades can be disengaged from the CVT 106. In this manner, the generator 110 and the VDM 108 with an air tank 156 can form an independent system 100 to generate electricity. This mode may be used when the system 100 experiences, for example, a black start.

Figure 16:
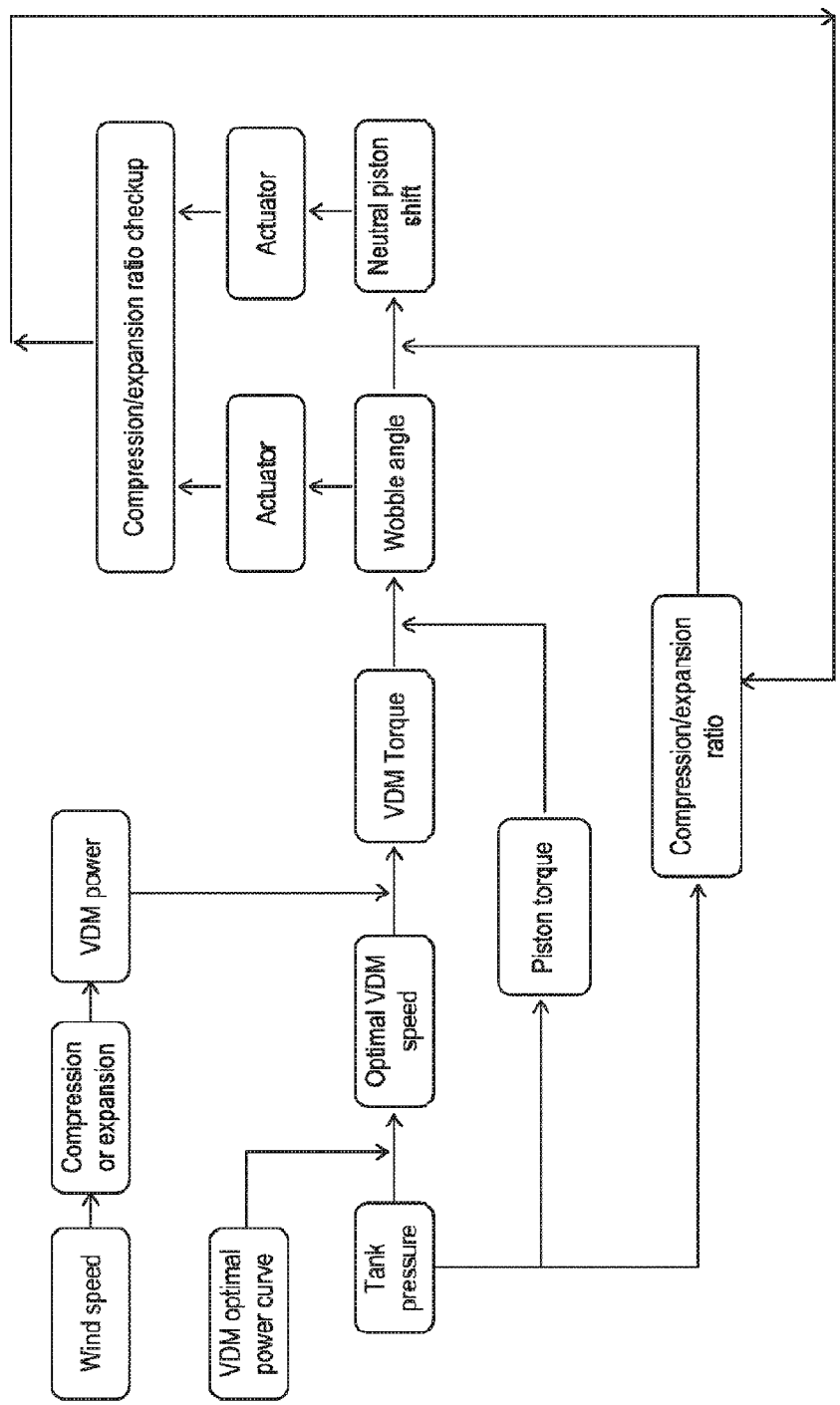
FIG. 16 is a flowchart illustrating a control scheme for a variable displacement machine for use with a wind energy conversion system, such as the wind energy conversion systems shown in FIGS. 3A and 3B, in accordance with example embodiments of the present disclosure.

In embodiments of the disclosure, the VDM 108 is configured to use extended power extraction by the blades 102 and support power generation while the wind is low. With reference to FIG. 16, the VDM 108 operational state may correspond to the current wind speed. For example, wind speed can be used to determine the VDM power reference and working mode, and/or positive or negative power levels. Given the tank pressure and the VDM operational curve, a desired speed reference can be defined. Then, the torque reference can be derived from the given VDM power and speed reference. The piston torque can be calculated from the tank pressure. Then, the piston torque and VDM torque can be matched by adjusting the wobble angle. As described, the NPD can be adjusted accordingly (e.g., to maintain a constant compression ratio). The reference commands of the wobble angle and NPD can be sent to actuators, respectively, and the compression rate can be checked again until equilibrium (e.g., steady state) is reached.

Figure 17:
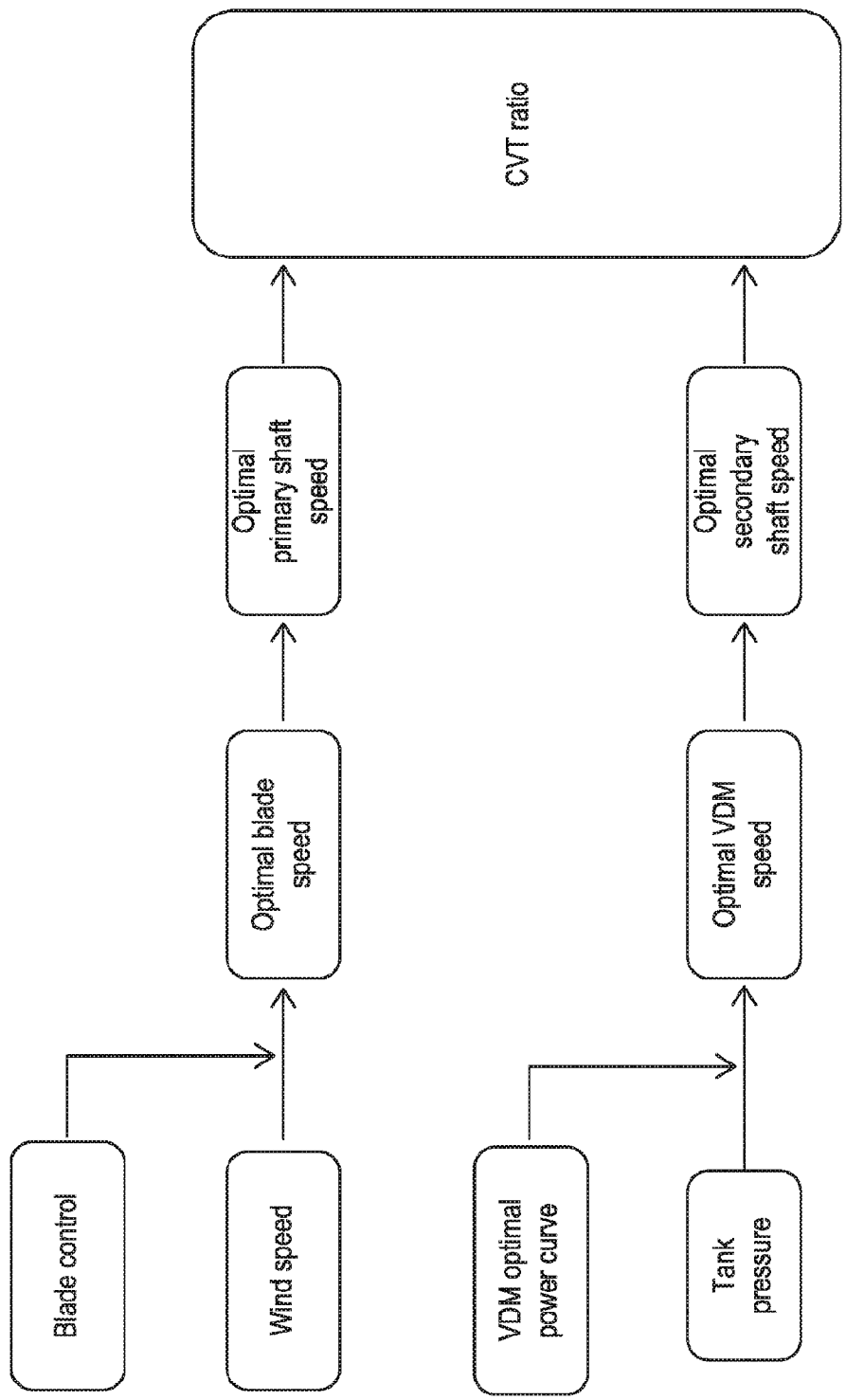
FIG. 17 is a flowchart illustrating a control scheme for a continuously variable transmission for use with a wind energy conversion system, such as the wind energy conversion systems shown in FIGS. 3A and 3B, in accordance with example embodiments of the present disclosure.

With reference to FIG. 17, a CVT control scheme is described. Based on a real-time wind condition, the blade control can provide the reference for desired blade speed, and the desired primary shaft speed can be calculated by multiplying the fixed ratio of the increasing gear. As described, a desired VDM speed reference can be generated from the VDM power curve for a given tank pressure. Since the secondary shaft speed can be equal to the VDM speed, the CVT ratio can be calculated as the desired primary shaft speed over the desired secondary shaft speed.

Figure 18:
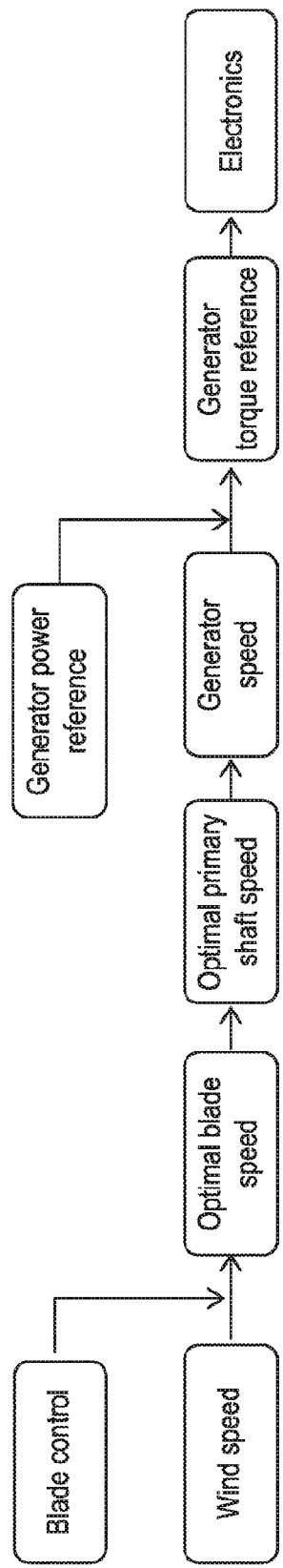
FIG. 18 is a flowchart illustrating a control scheme for a generator for use with a wind energy conversion system, such as the wind energy conversion systems shown in FIGS. 3A and 3B, in accordance with example embodiments of the present disclosure.

Referring now to FIG. 18, a generator control scheme is described. Because the generator shaft can be attached to the primary shaft of the CVT, the generator speed reference can correspond to the current wind speed. Given the power reference, the generator torque can be calculated as the power reference divided by the speed reference. The torque reference can be realized using, for example, alternating current to the converter 112, implemented with alternating current (AC/AC) electronics.

Figure 19:
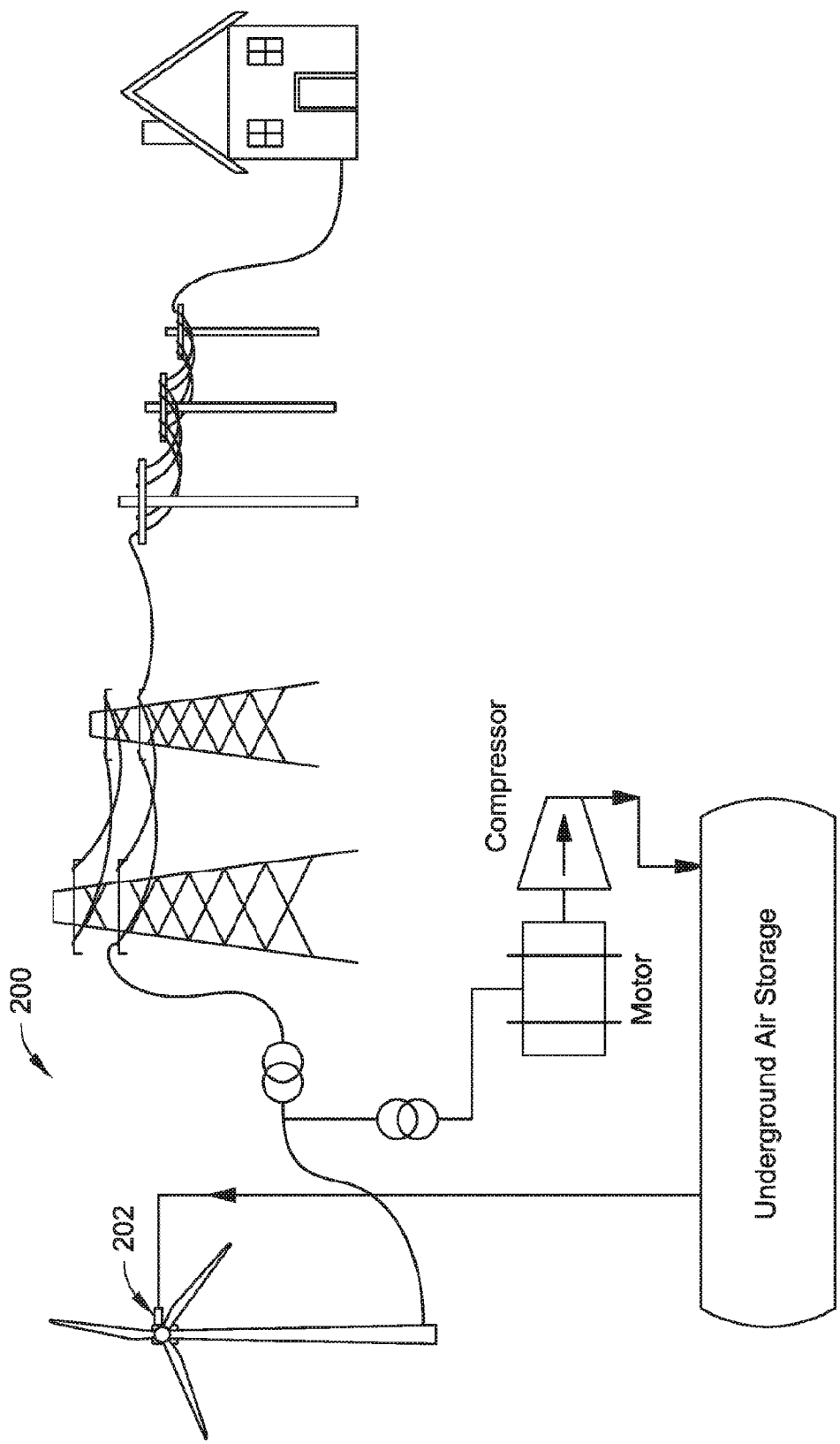
FIG. 19 is a diagrammatic illustration of a wind energy conversion system, where the wind energy conversion system uses compressed air to directly drive the shaft of a wind turbine in accordance with example embodiments of the present disclosure.
Figure 20:
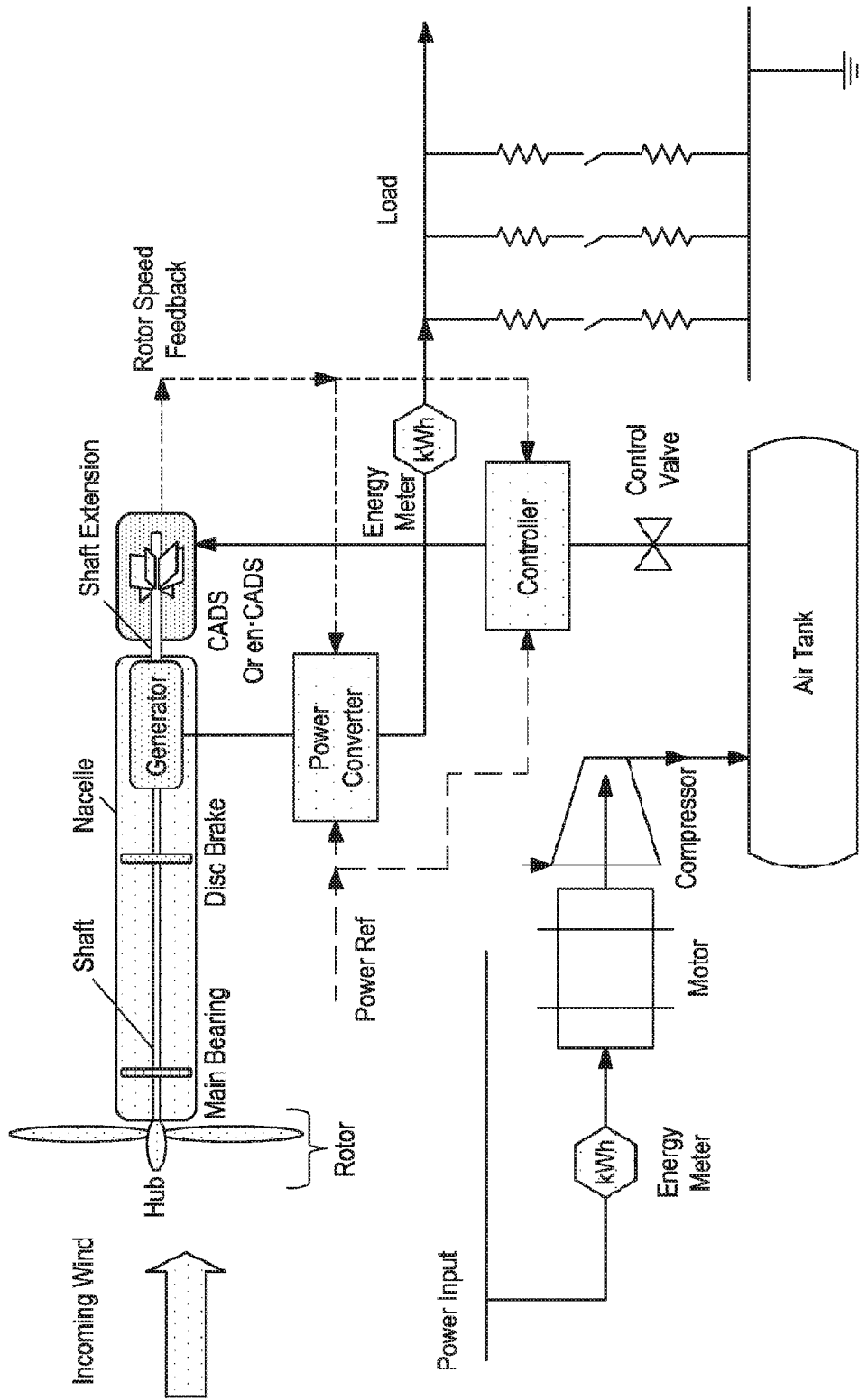
FIG. 20 is a diagrammatic illustration of a wind energy conversion system, such as the wind energy conversion system illustrated in FIG. 19, in accordance with example embodiments of the present disclosure.
Figure 21:
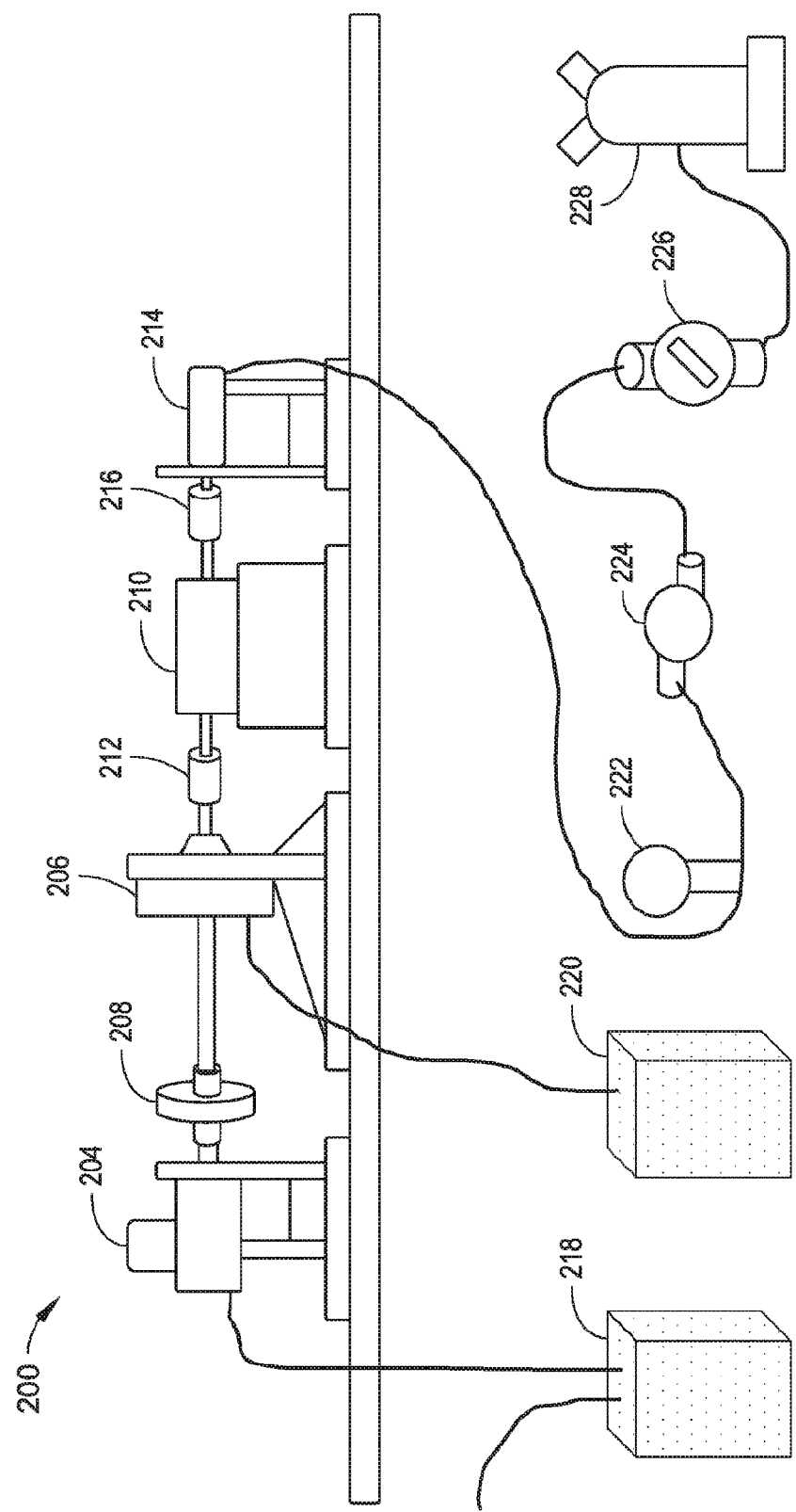
FIG. 21 is a diagrammatic illustration of a wind energy conversion system, such as the wind energy conversion system illustrated in FIG. 19, in accordance with example embodiments of the present disclosure.
Figure 22:
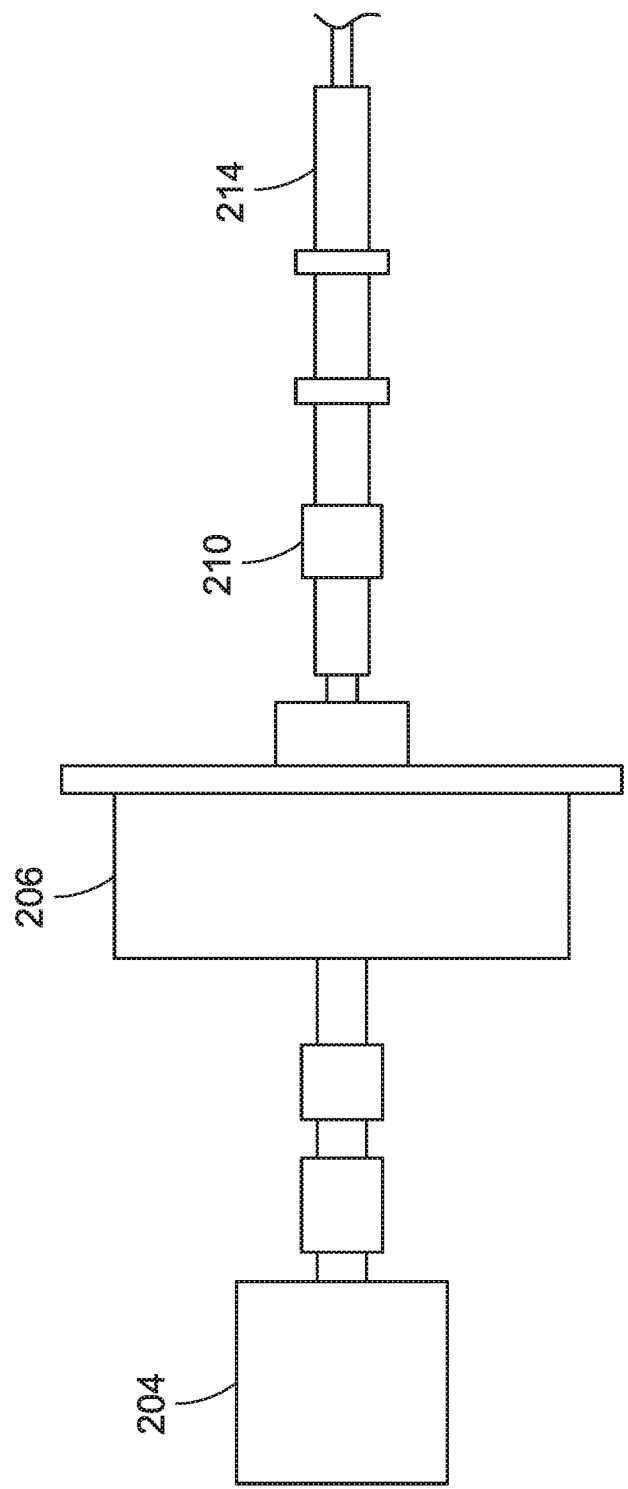
FIG. 22 is a diagrammatic illustration of a wind energy conversion system, such as the wind energy conversion system illustrated in FIG. 19, in accordance with example embodiments of the present disclosure.

With reference to FIGS. 19 through 22, a wind energy conversion system can use compressed air to directly drive the shaft of a wind turbine. For example, as shown in FIG. 19, a wind energy conversion system 200 can include a compressed air driven system (CADS) 202. As shown in FIGS. 21 and 22, the system 200 can include an electric motor 204 (e.g., with a reduction gearbox), an electric generator 206, a clutch coupling 208 between the electric motor 204 and the electric generator 206, a torque transducer 210 (e.g., with an encoder), a coupling 212 between the electric generator 206 and the torque transducer 210, an air motor 214, a coupling 216 between the torque transducer 210 and the air motor 214, an AC/AC converter electric motor speed regulator 218, a dynamic AC load simulator 220 (e.g., for system testing), a barometer 222, a flow meter 224, a proportional valve 226, and an air compressor and air tank 228.

Figure 23:
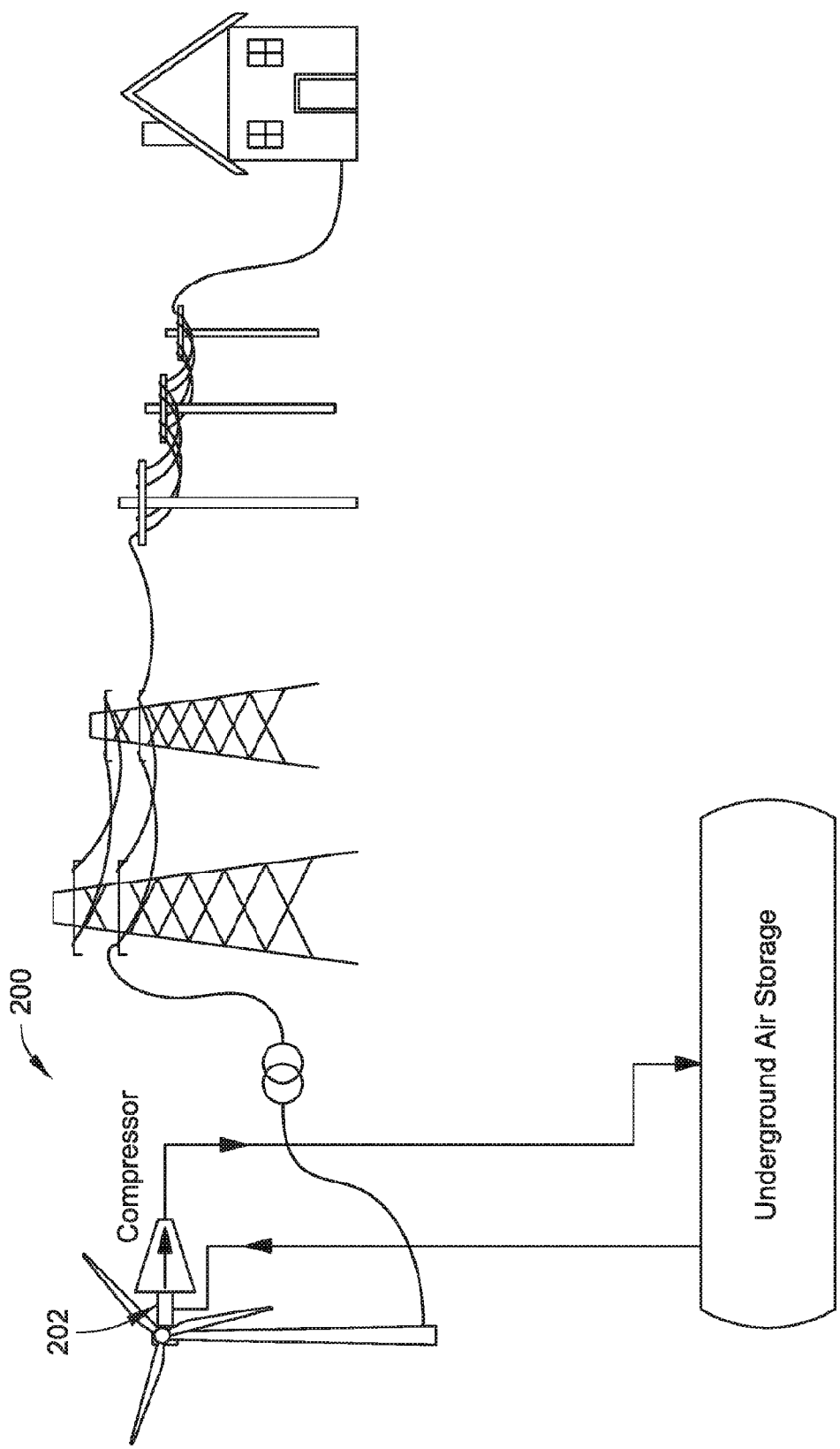
FIG. 23 is a diagrammatic illustration of a wind energy conversion system, where the wind energy conversion system uses a compressor connected to a shaft of the wind turbine to balance extra wind power while compressing air in accordance with example embodiments of the present disclosure.
Figure 24:
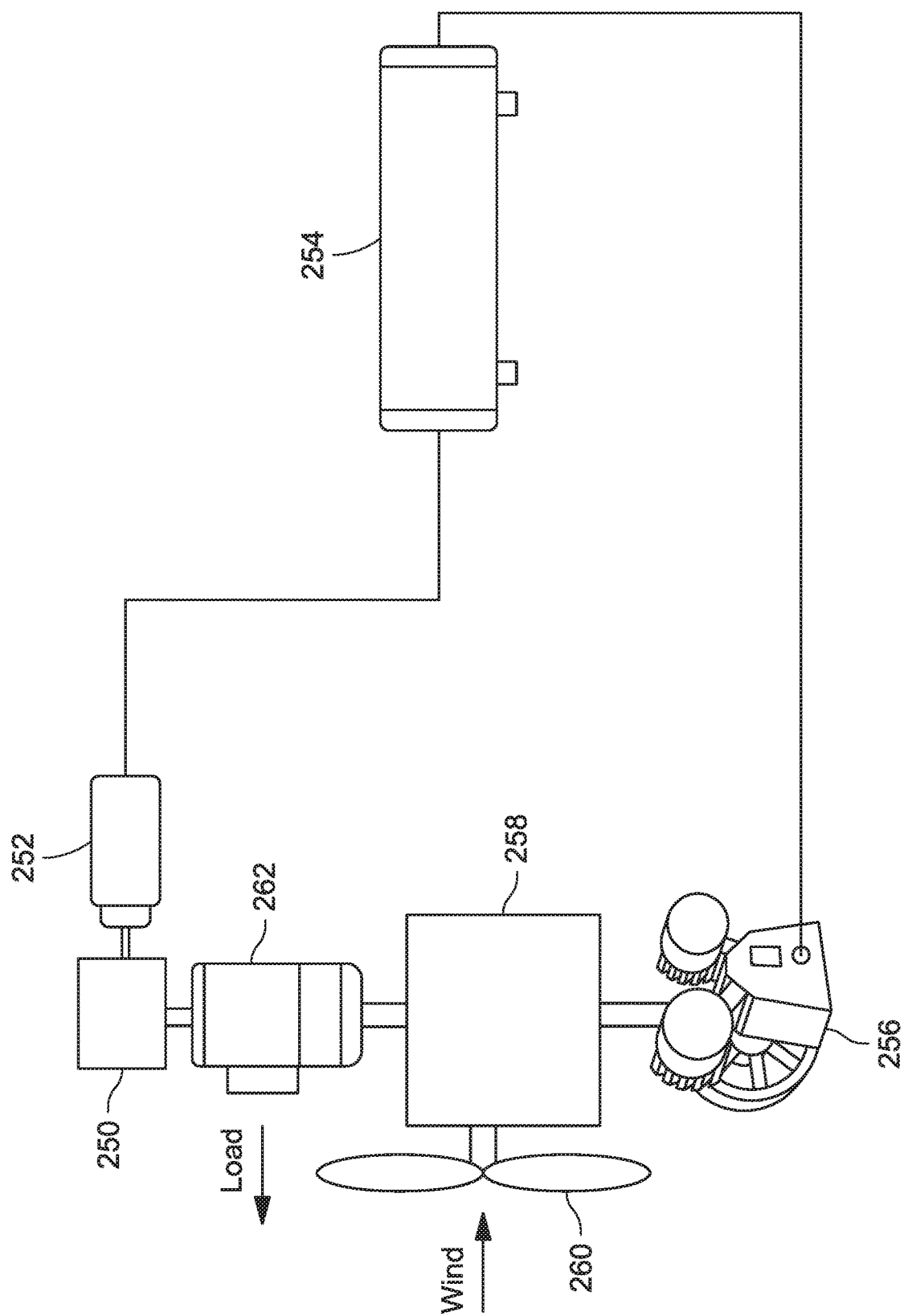
FIG. 24 is a diagrammatic illustration of a wind energy conversion system, such as the wind energy conversion system illustrated in FIG. 23, in accordance with example embodiments of the present disclosure.

Referring now to FIGS. 23 and 24, a wind energy conversion system 200 can use a compressor connected to a shaft of a wind turbine to balance extra wind power while compressing air. For example, as shown in FIG. 24, the system 200 can include a planetary gearbox 250, an air motor 252, an air tank 254, an air compressor 256, a differential gearbox 258, a turbine blade 260, and a power generator 262.

Figure 26:
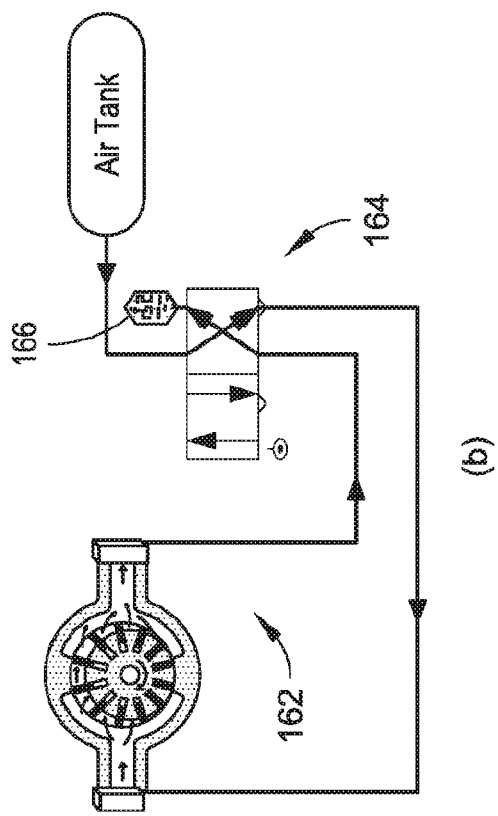
FIG. 26 is a diagrammatic illustration of a rotary vane machine, which can be used with a wind energy conversion system, where the rotary vane machine is shown in an expansion mode in accordance with example embodiments of the present disclosure.
Figure 25:
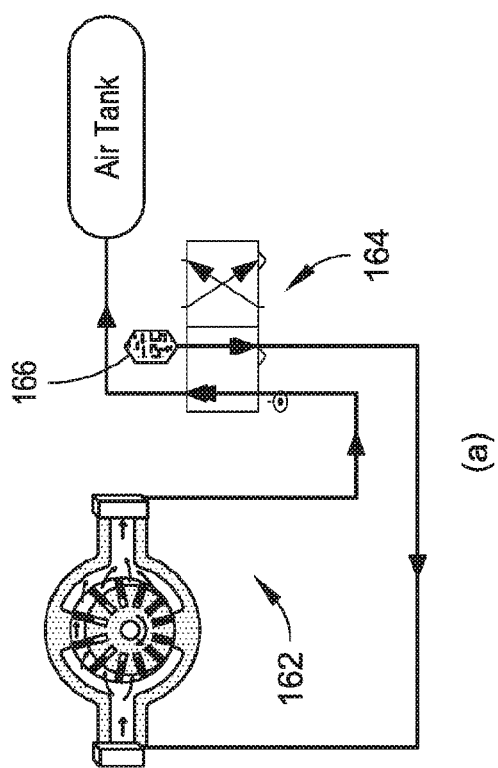
FIG. 25 is a diagrammatic illustration of a rotary vane machine (RVM), which can be used with a wind energy conversion system, where the rotary vane machine is shown in a compression mode in accordance with example embodiments of the present disclosure.

With reference to FIGS. 25 and 26, in some embodiments a wind energy conversion system can use one or more rotary vane machines 162. For example, a rotary vane machine 162 can have an off-center shaft and spring-engaged vanes that jointly create a series of uneven chambers in its housing. In some embodiments, the rotary vane machine 162 can include a control valve 164 and/or a filter/dryer 166. Depending on its port connection, an RVM 162 can be a reversible machine that can work as a compressor or an expander/motor.

Figure 27:
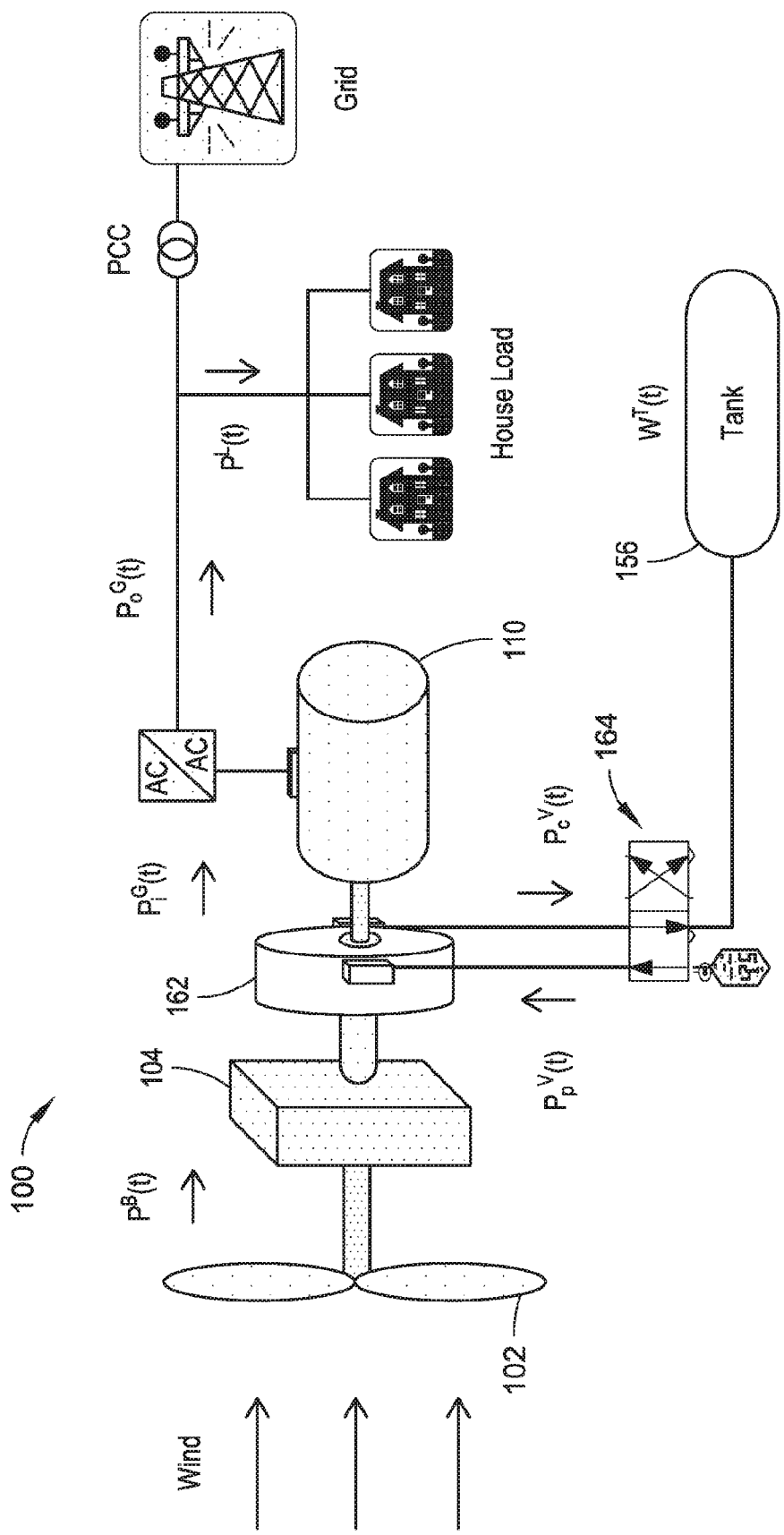
FIG. 27 is a diagrammatic illustration of a wind energy conversion system in accordance with example embodiments of the present disclosure.

Referring now to FIG. 27, in some embodiments, a wind energy conversion system 100 is configured so that the gearbox 104, which is preferably a speed-up gearbox in FIG. 3A is realized instead as a planetary gearbox. When the gearbox 104 is a planetary gearbox. RVM 162 can be coupled to the hollow shaft of the gearbox 104 to regulate the power delivery. The inlet and outlet can be connected to a storage tank (e.g., air tank 156) through a control valve 164.

Figure 28:
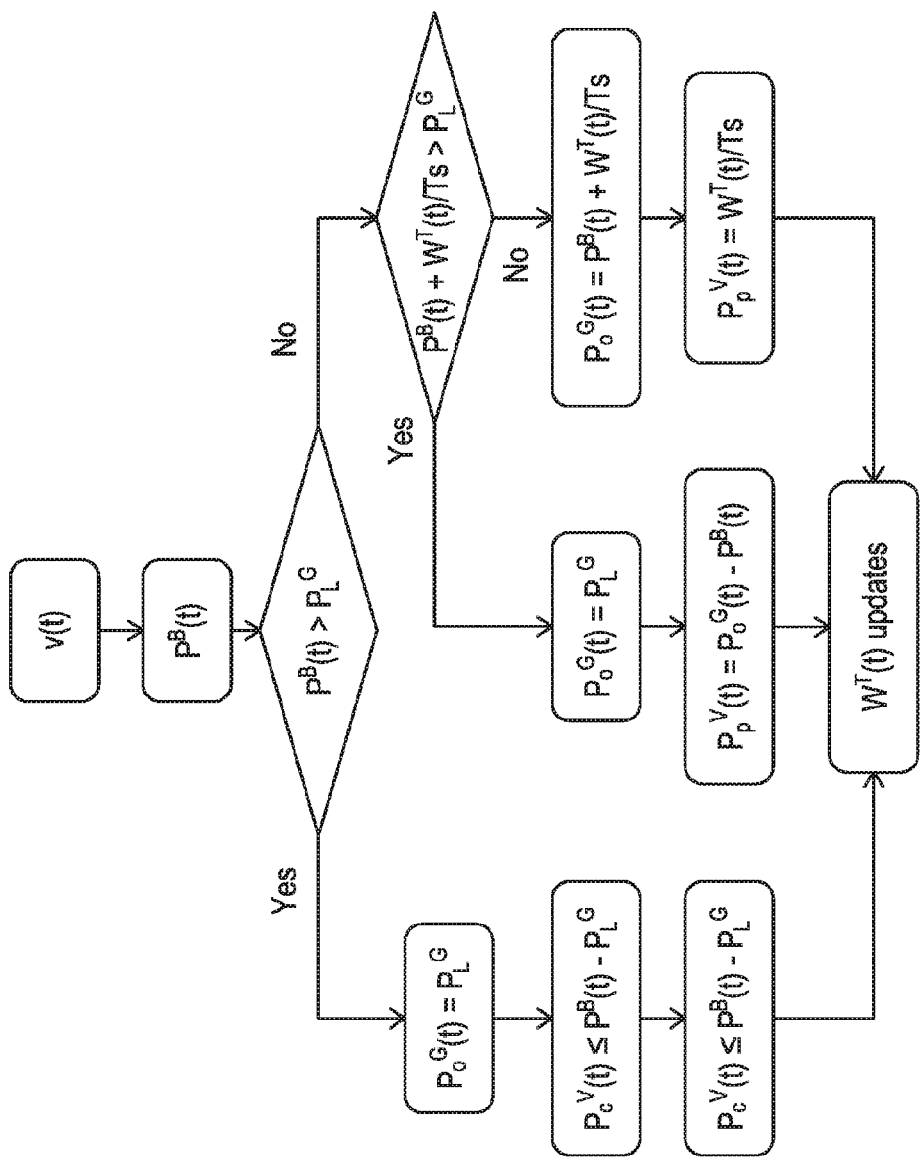
FIG. 28 is a flowchart illustrating a control scheme for a wind energy conversion system, such as the wind energy conversion system shown in FIG. 27, in accordance with example embodiments of the present disclosure.
Figure 29:
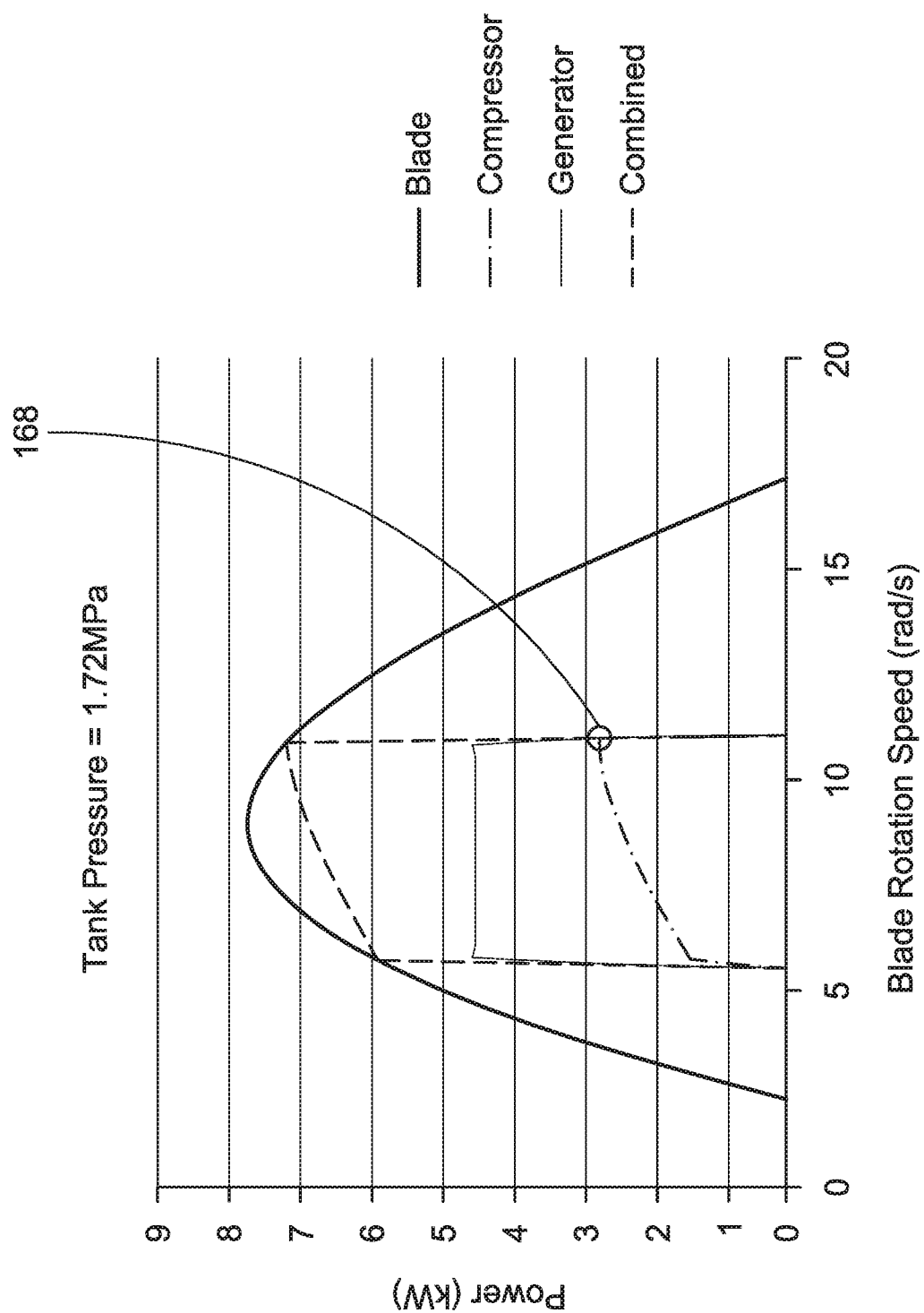
FIG. 29 is a graph illustrating power versus blade rotation speed for a wind energy conversion system where a rotary vane machine is operated as a compressor at a fixed wind speed and a first tank pressure in accordance with example embodiments of the present disclosure.
Figure 30:
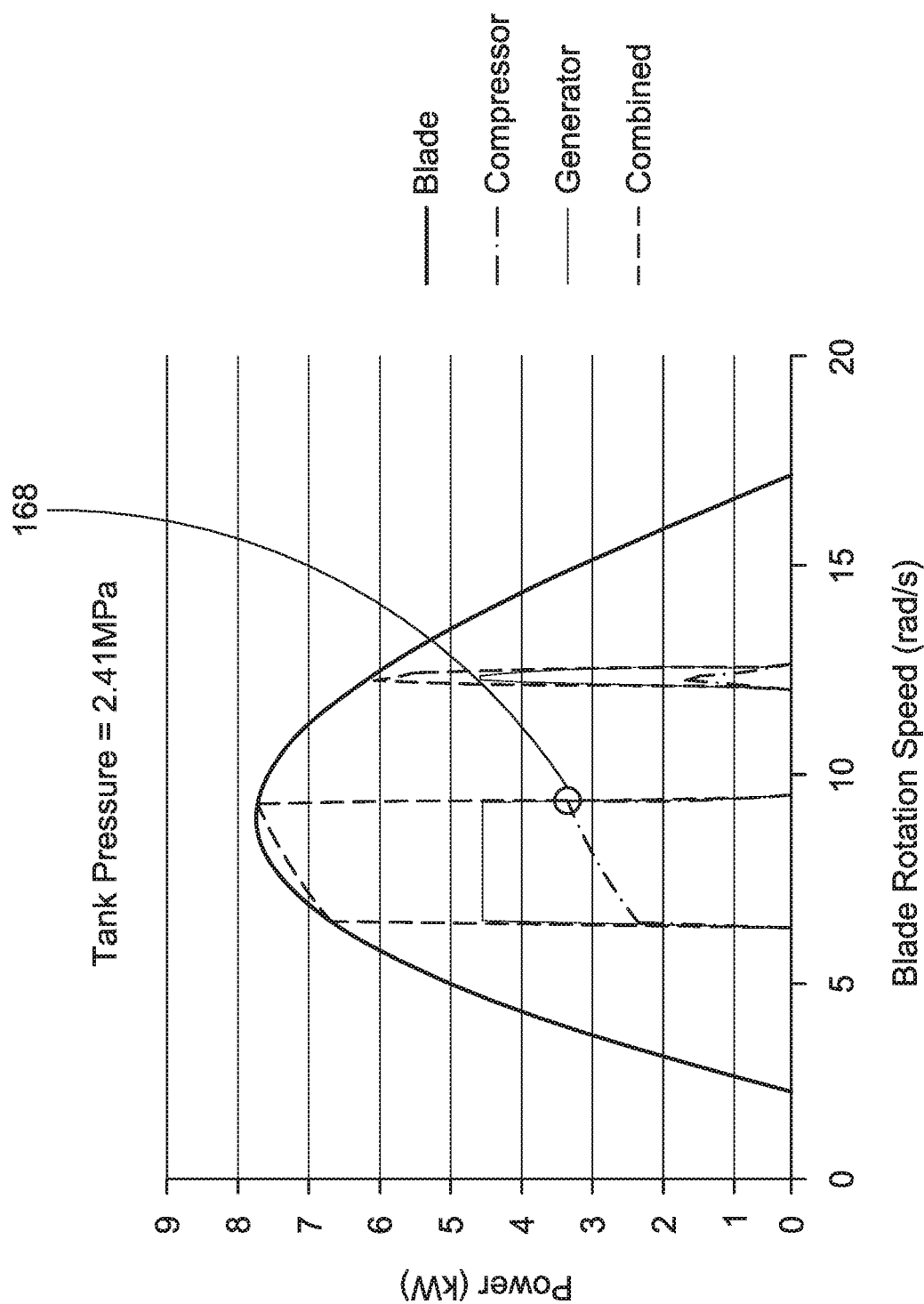
FIG. 30 is a graph illustrating power versus blade rotation speed for a wind energy conversion system where a rotary vane machine is operated as a compressor at a fixed wind speed and a second tank pressure in accordance with example embodiments of the present disclosure.
Figure 31:
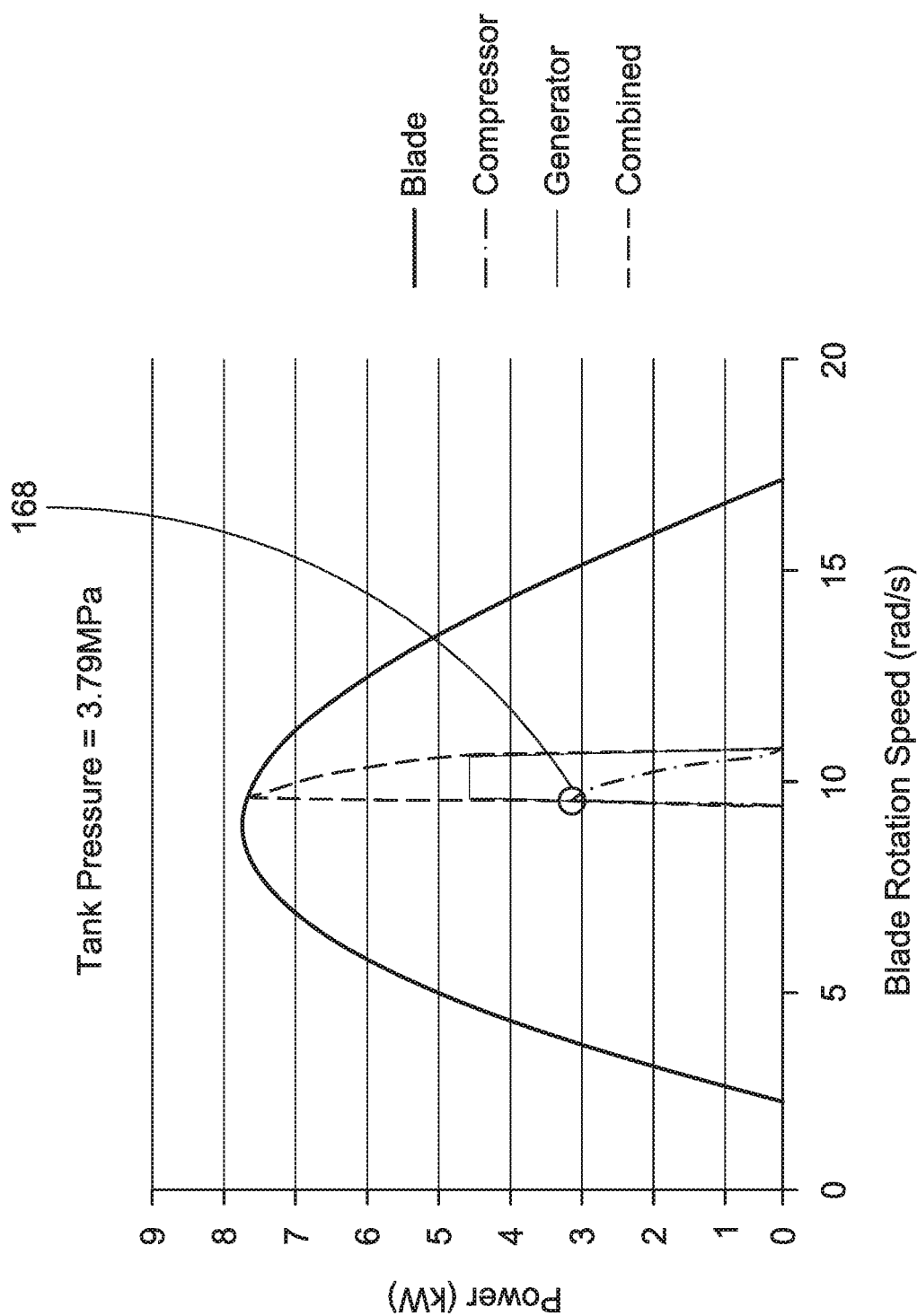
FIG. 31 is a graph illustrating power versus blade rotation speed for a wind energy conversion system where a rotary vane machine is operated as a compressor at a fixed wind speed and a third tank pressure in accordance with example embodiments of the present disclosure.

With reference to FIG. 28, a control scheme for a wind energy conversion system is described. Referring to FIGS. 29 through 31, in some embodiments a wind energy conversion system 100 is operated under fixed wind speed. In this example, an operational point can be selected at the maximum power point of the RVM as a compressor, while maintaining constant full capacity electrical generation, as shown by the dot 168 in the figures.

Figure 32:
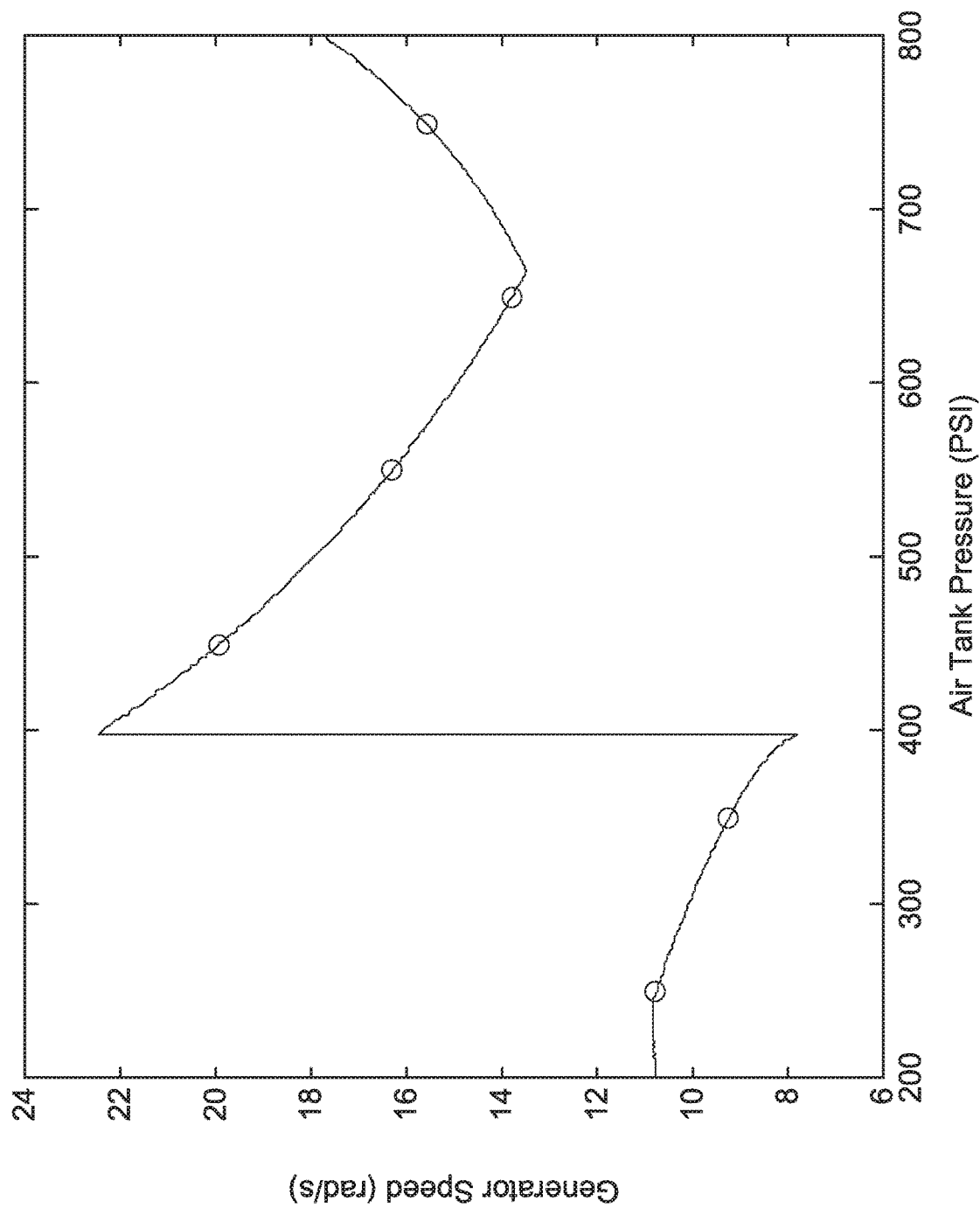
FIG. 32 is a graph illustrating generator speed versus air tank pressure for a wind energy conversion system where a rotary vane machine is operated as a compressor in accordance with example embodiments of the present disclosure.
Figure 33:
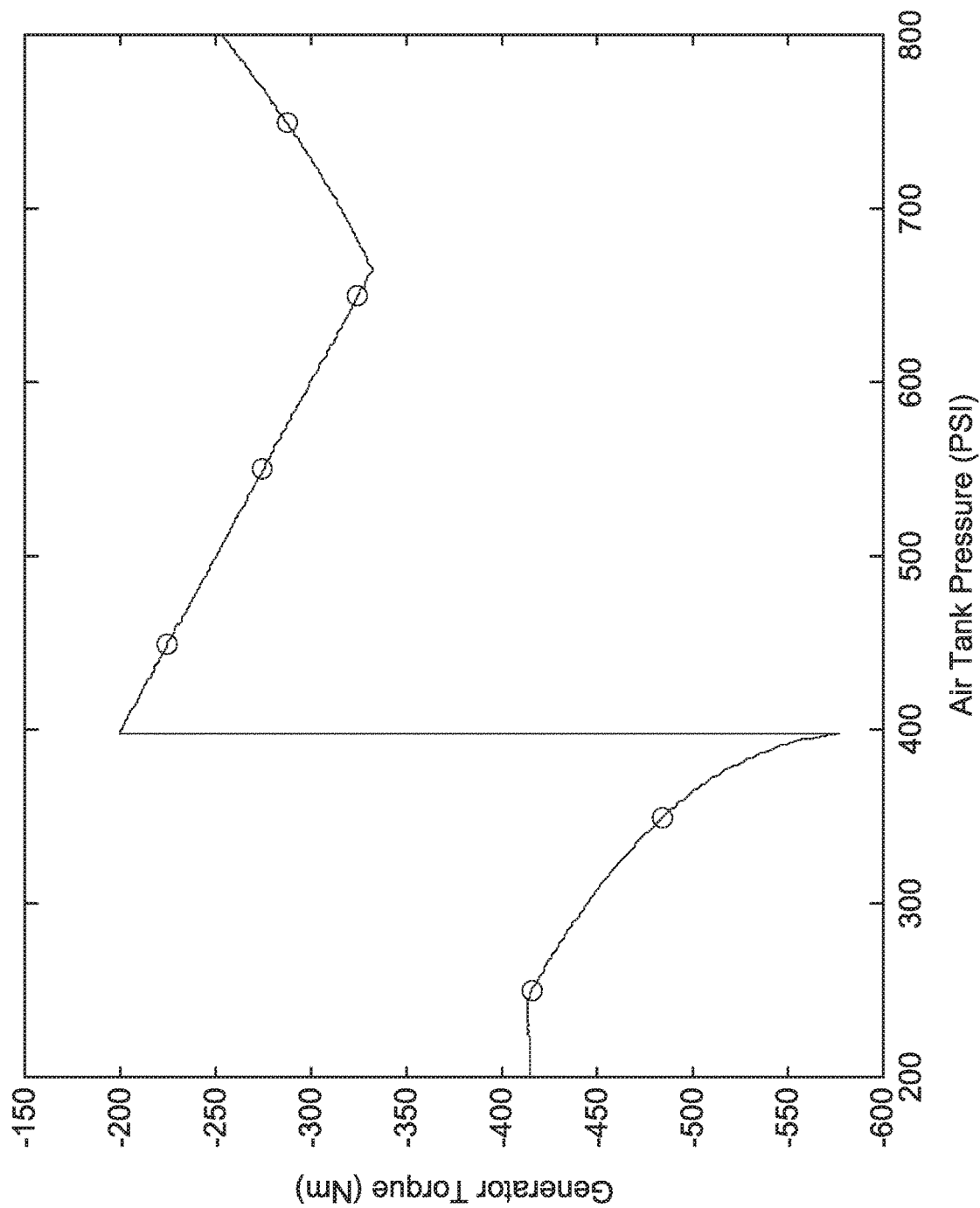
FIG. 33 is a graph illustrating generator torque versus air tank pressure for a wind energy conversion system where a rotary vane machine is operated as a compressor in accordance with example embodiments of the present disclosure.
Figure 34:
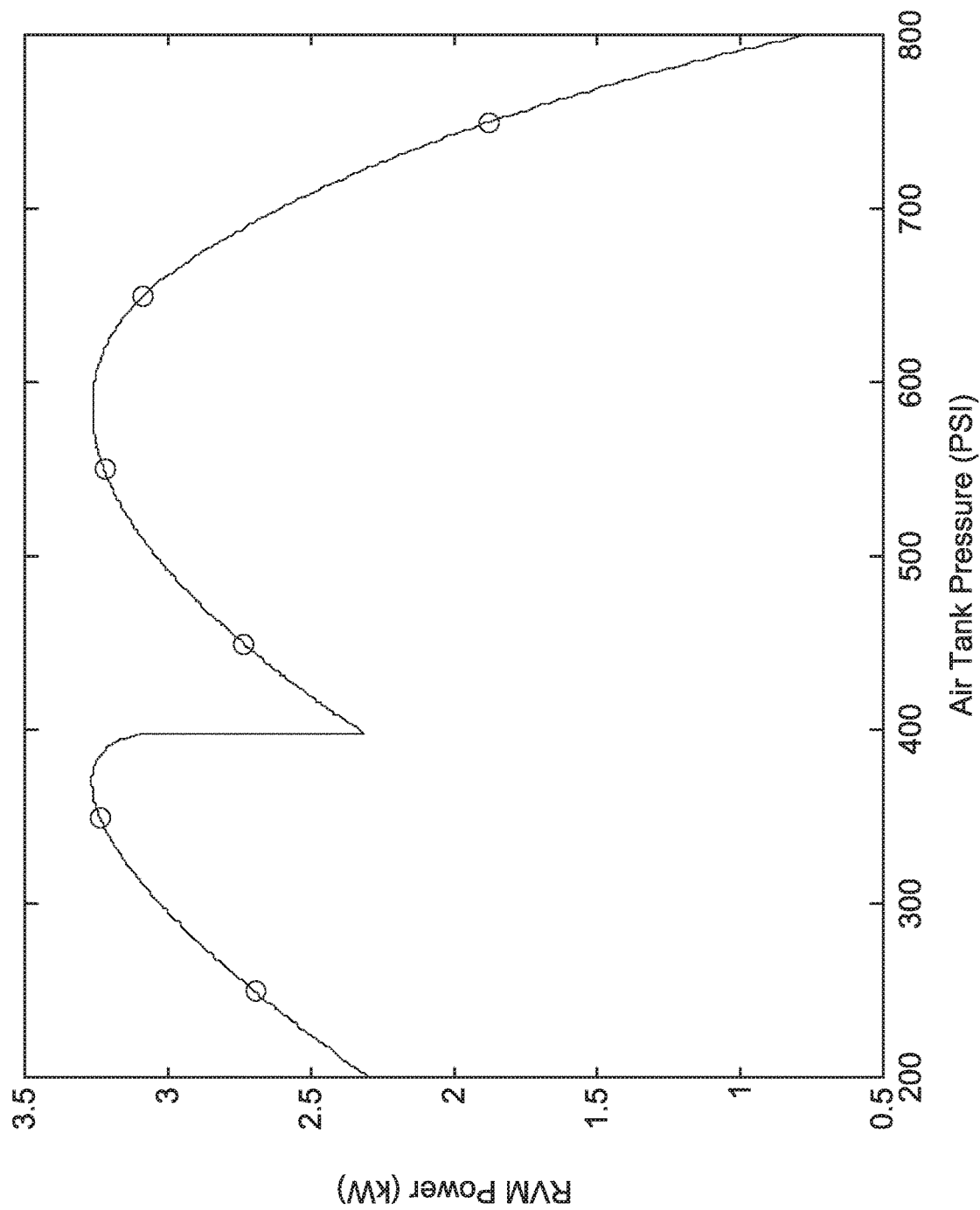
FIG. 34 is a graph illustrating rotary vane machine power versus air tank pressure for a wind energy conversion system where a rotary vane machine is operated as a compressor in accordance with example embodiments of the present disclosure.
Figure 35:
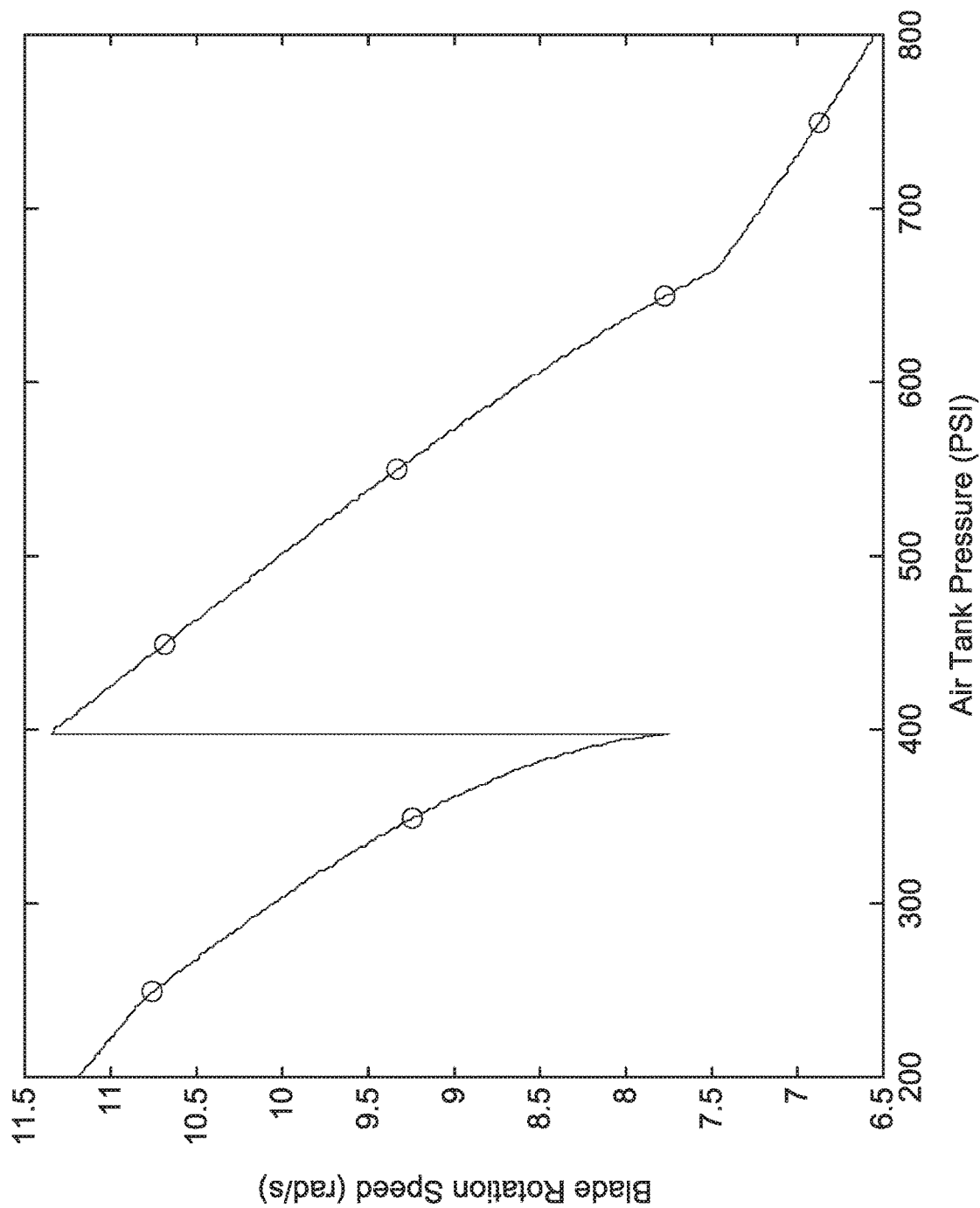
FIG. 35 is a graph illustrating blade rotation speed versus air tank pressure for a wind energy conversion system where a rotary vane machine is operated as a compressor in accordance with example embodiments of the present disclosure.

FIG. 32 illustrates generator speed in radians per second (rad/s) versus air tank pressure in pounds per square inch (PSI) for a wind energy conversion system, where a rotary vane machine is operated as a compressor. FIG. 33 illustrates generator torque in newton meters (Nm) versus air tank pressure in PSI for the wind energy conversion system. FIG. 34 illustrates rotary vane machine power in kilowatts (kW) versus air tank pressure in PSI for the wind energy conversion system. FIG. 35 illustrates blade rotation speed in rad/s versus air tank pressure in PSI for the wind energy conversion system.

Figure 36:
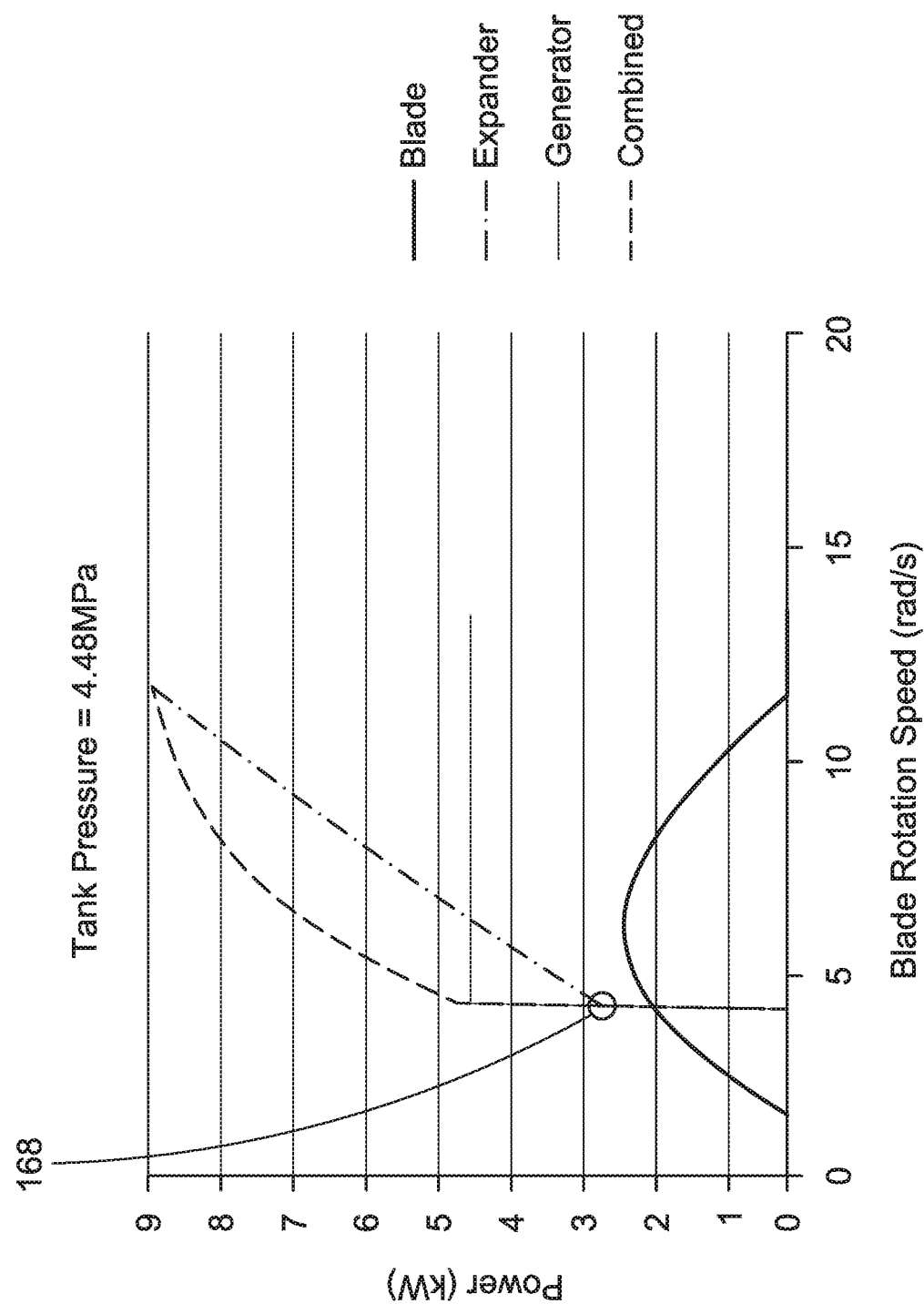
FIG. 36 is a graph illustrating power versus blade rotation speed where a rotary vane machine is operated as an expander at a fixed wind speed and a first tank pressure in accordance with example embodiments of the present disclosure.
Figure 37:
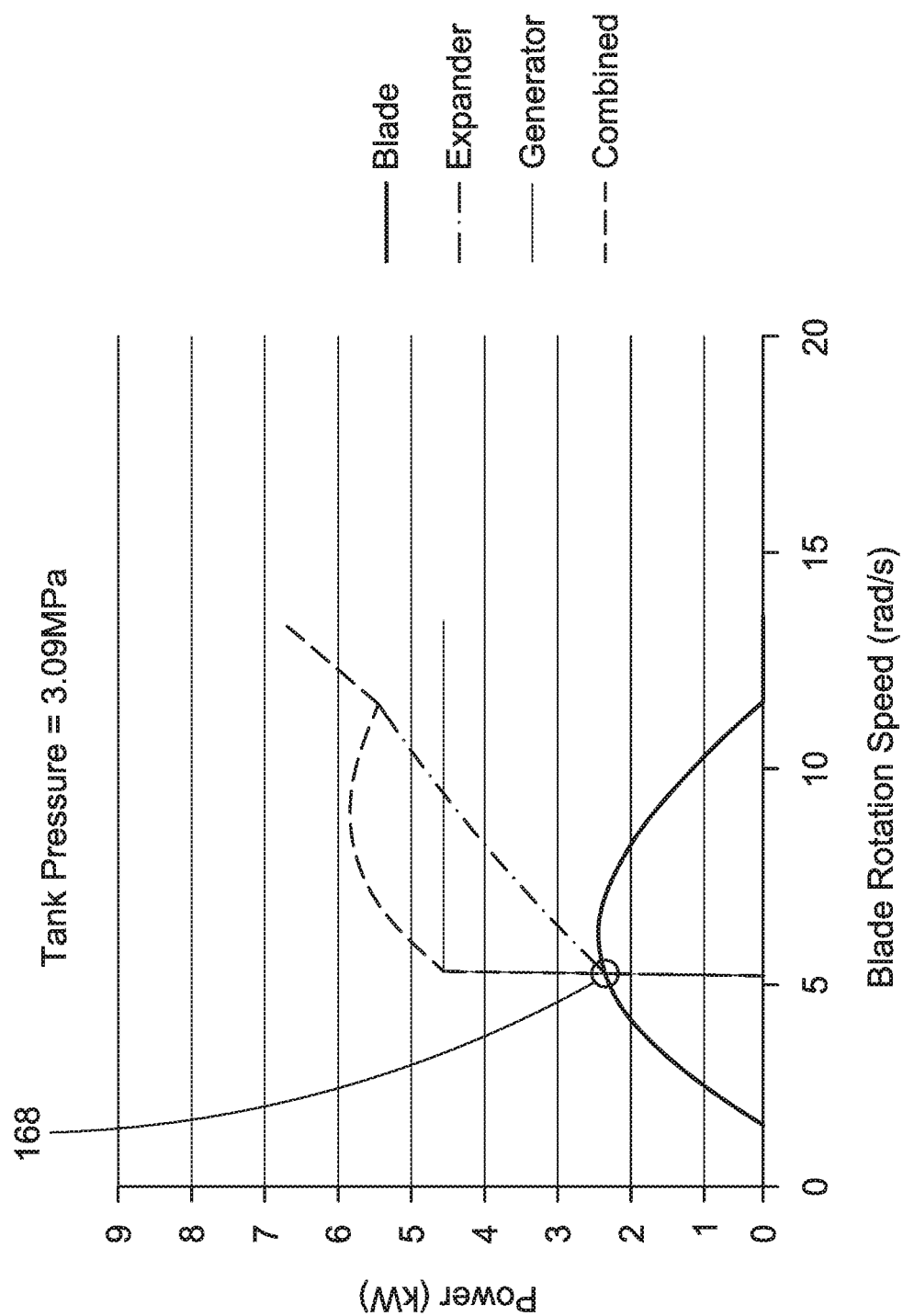
FIG. 37 is a graph illustrating power versus blade rotation speed for a wind energy conversion system where a rotary vane machine is operated as an expander at a fixed wind speed and a second tank pressure in accordance with example embodiments of the present disclosure.
Figure 38:
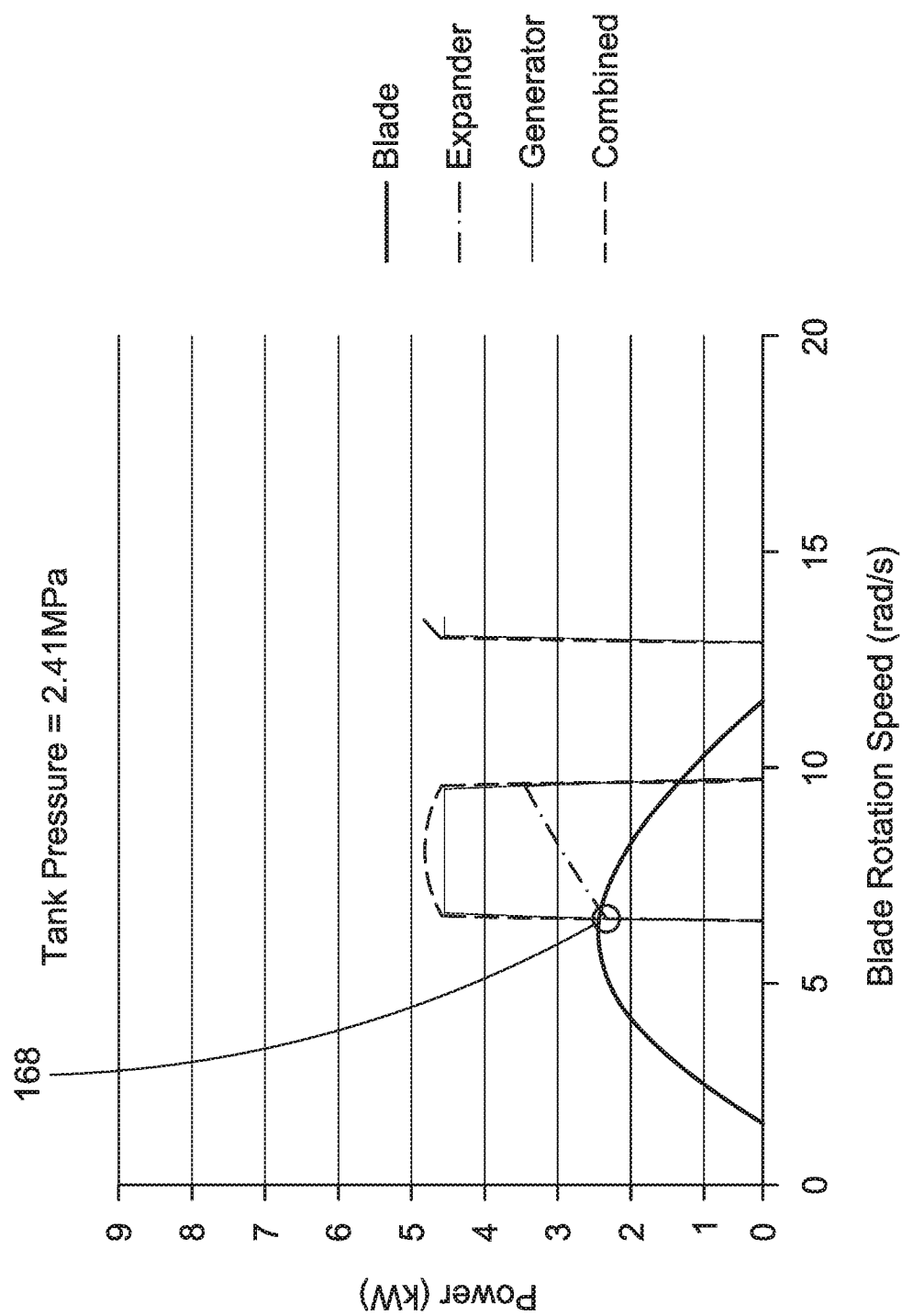
FIG. 38 is a graph illustrating power versus blade rotation speed for a wind energy conversion system where a rotary vane machine is operated as an expander at a fixed wind speed and a third tank pressure in accordance with example embodiments of the present disclosure.

Referring to FIGS. 36 through 38, in some embodiments a wind energy conversion system is operated under fixed wind speed. In this example, an operational point can be selected at the minimum power point of the RVM 162 as an expander, while maintaining constant full capacity electrical generation, as shown by the dot 168 in the figures.

Figure 39:
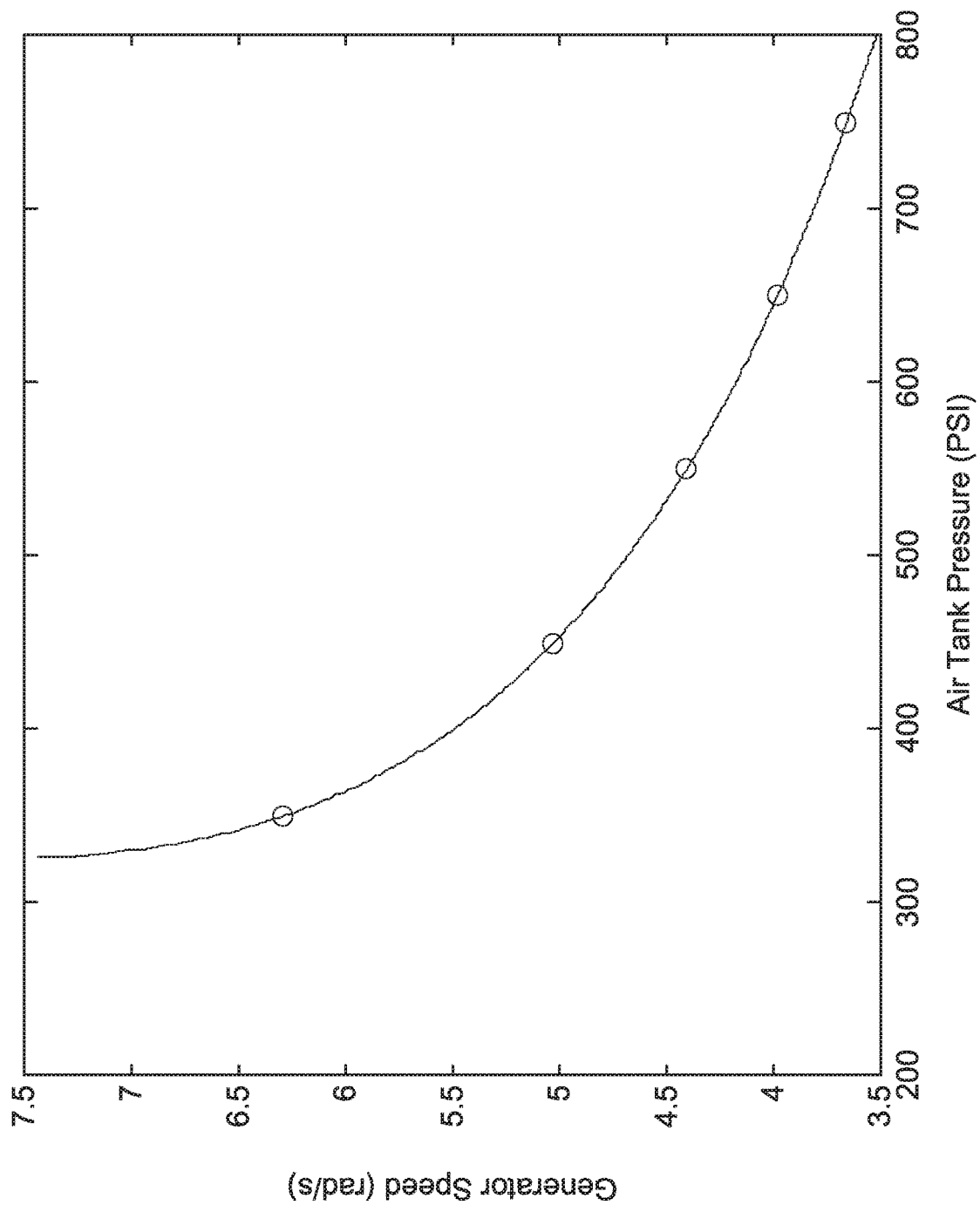
FIG. 39 is a graph illustrating generator speed versus air tank pressure for a wind energy conversion system where a rotary vane machine is operated as an expander in accordance with example embodiments of the present disclosure.
Figure 40:
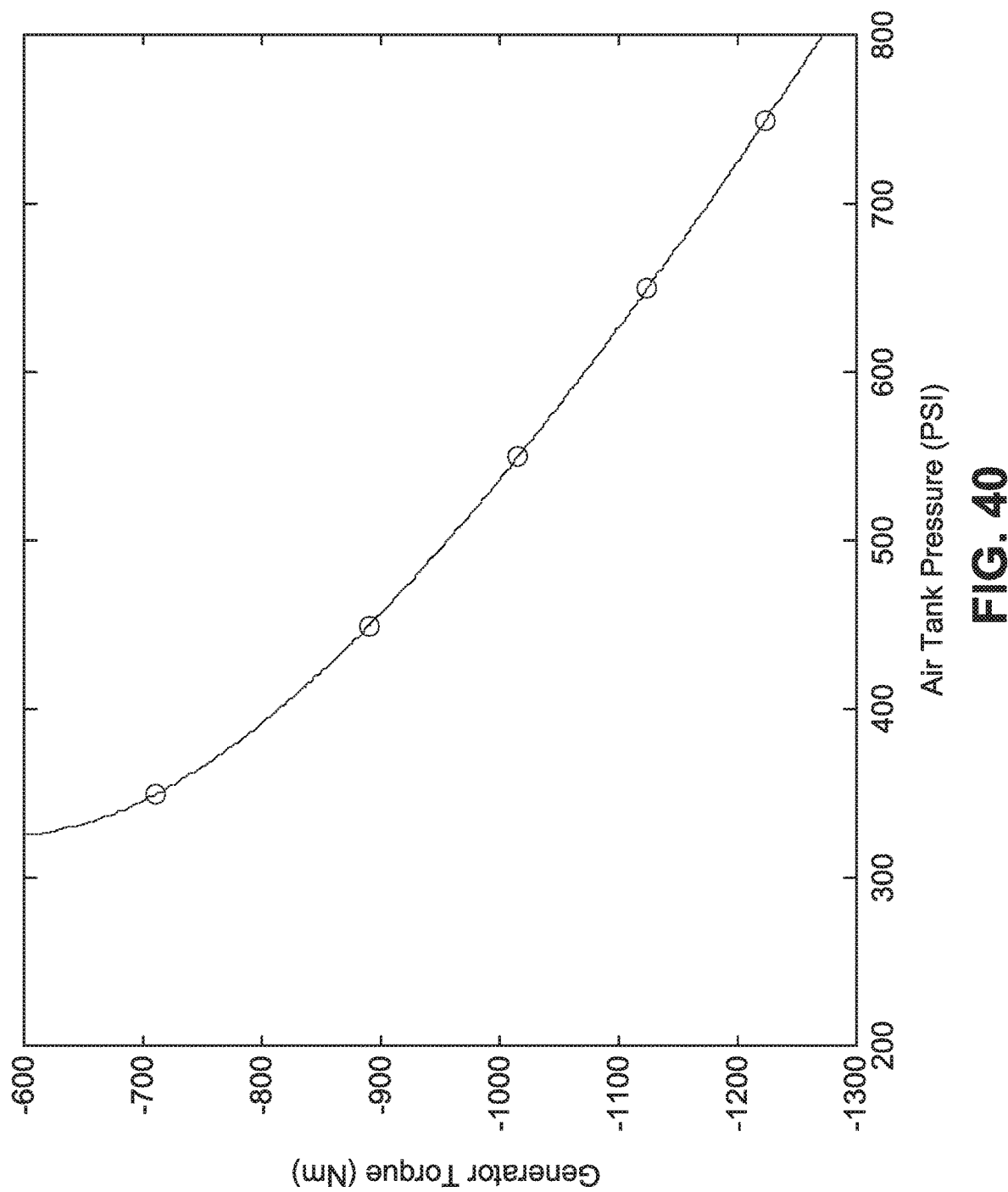
FIG. 40 is a graph illustrating generator torque versus air tank pressure for a wind energy conversion system where a rotary vane machine is operated as an expander in accordance with example embodiments of the present disclosure.
Figure 41:
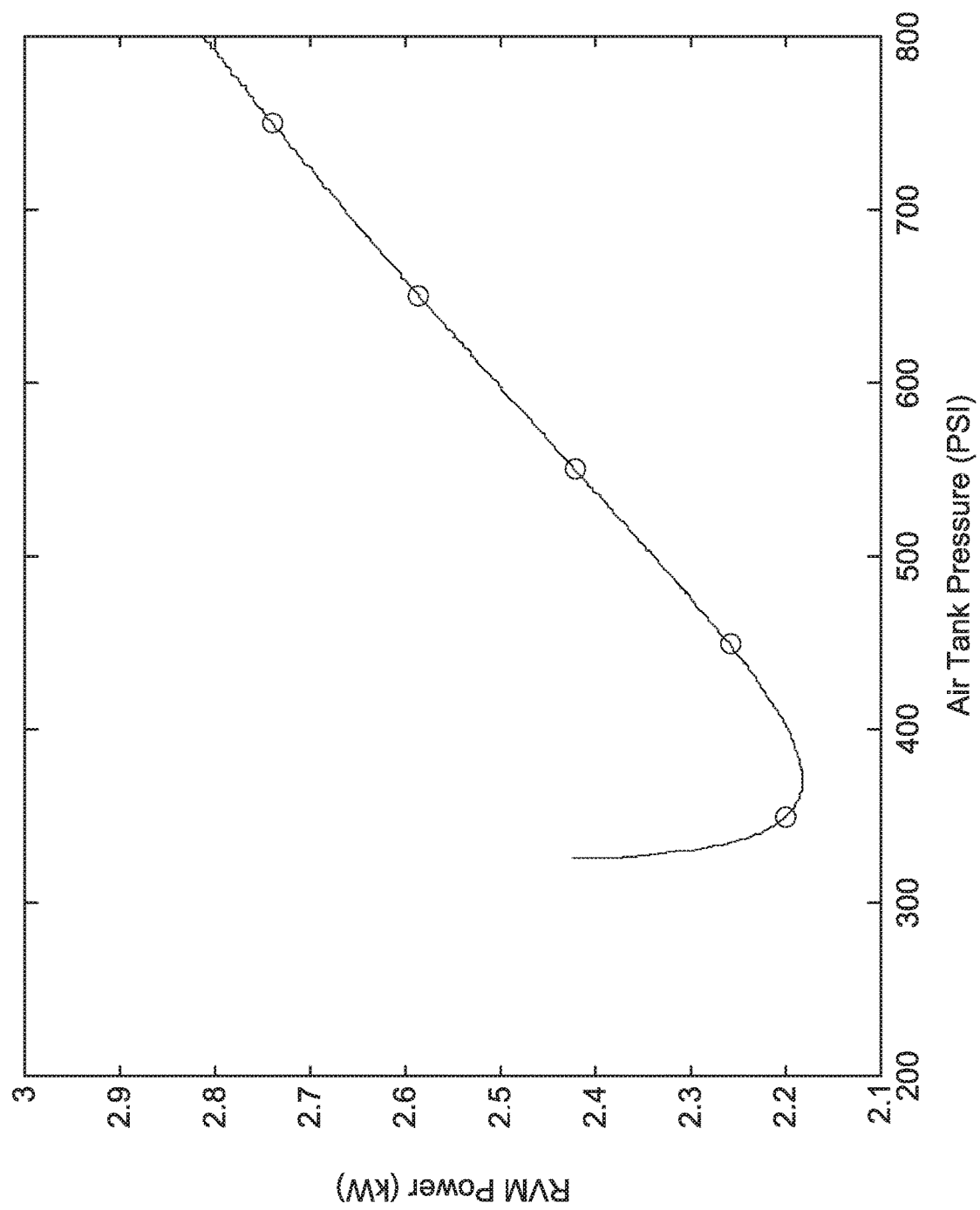
FIG. 41 is a graph illustrating rotary vane machine power versus air tank pressure for a wind energy conversion system where a rotary vane machine is operated as an expander in accordance with example embodiments of the present disclosure.
Figure 42:
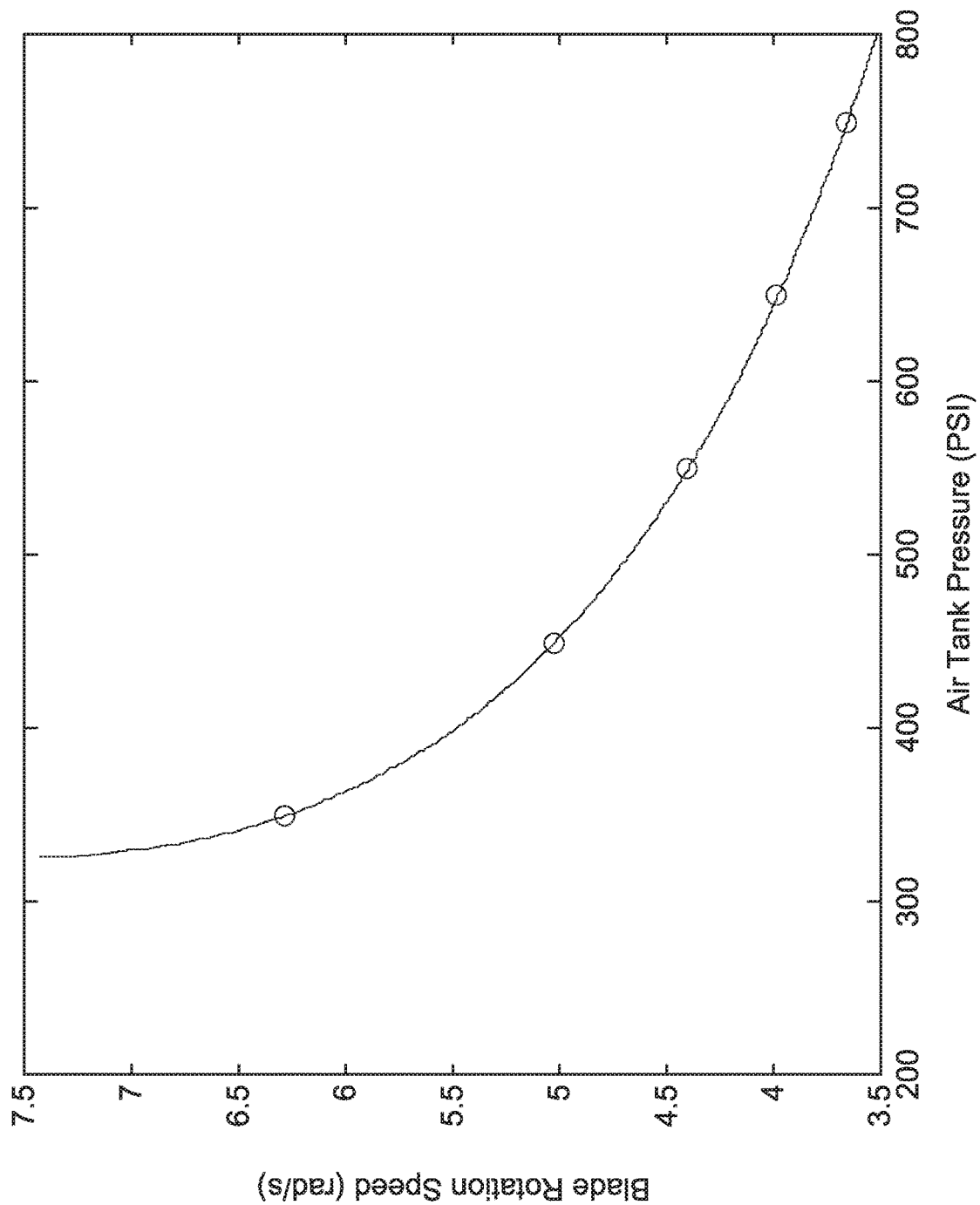
FIG. 42 is a graph illustrating blade rotation speed versus air tank pressure for a wind energy conversion system where a rotary vane machine is operated as an expander in accordance with example embodiments of the present disclosure.

FIG. 39 illustrates generator speed in rad/s versus air tank pressure in PSI for a wind energy conversion system, where a rotary vane machine is operated as an expander. FIG. 40 illustrates generator torque in newton meters (Nm) versus air tank pressure in PSI for the wind energy conversion system. FIG. 41 illustrates rotary vane machine power in kW versus air tank pressure in PSI for the wind energy conversion system. FIG. 42 illustrates blade rotation speed in rad/s versus air tank pressure in PSI for the wind energy conversion system.

Figure 43:
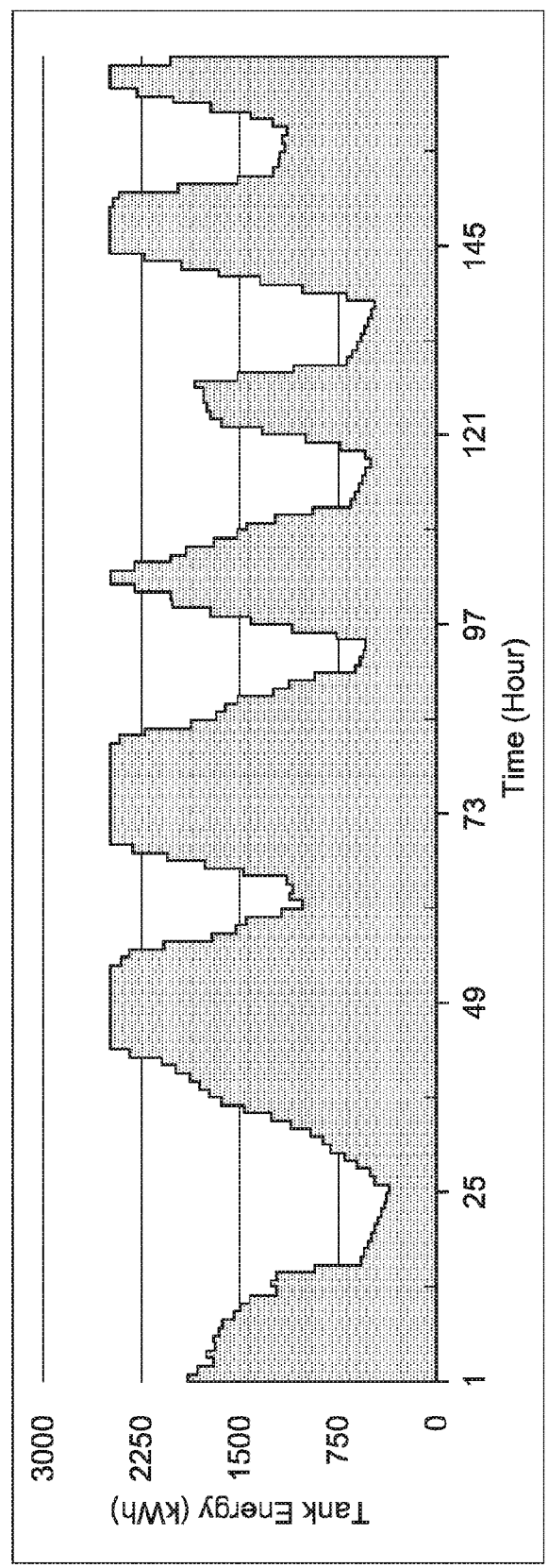
FIG. 43 is a graph illustrating tank storage energy versus time for a wind energy conversion system in accordance with example embodiments of the present disclosure.
Figure 44:
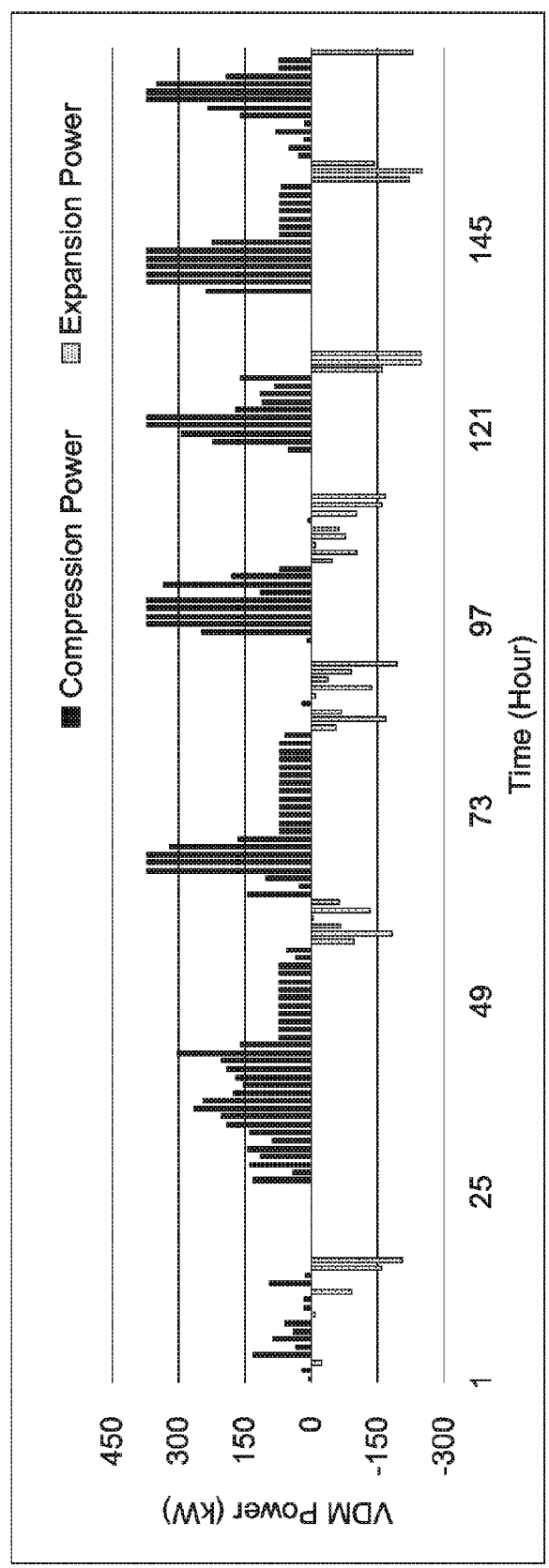
FIG. 44 is a graph illustrating variable displacement machine power versus time for a wind energy conversion system in accordance with example embodiments of the present disclosure.
Figure 45:
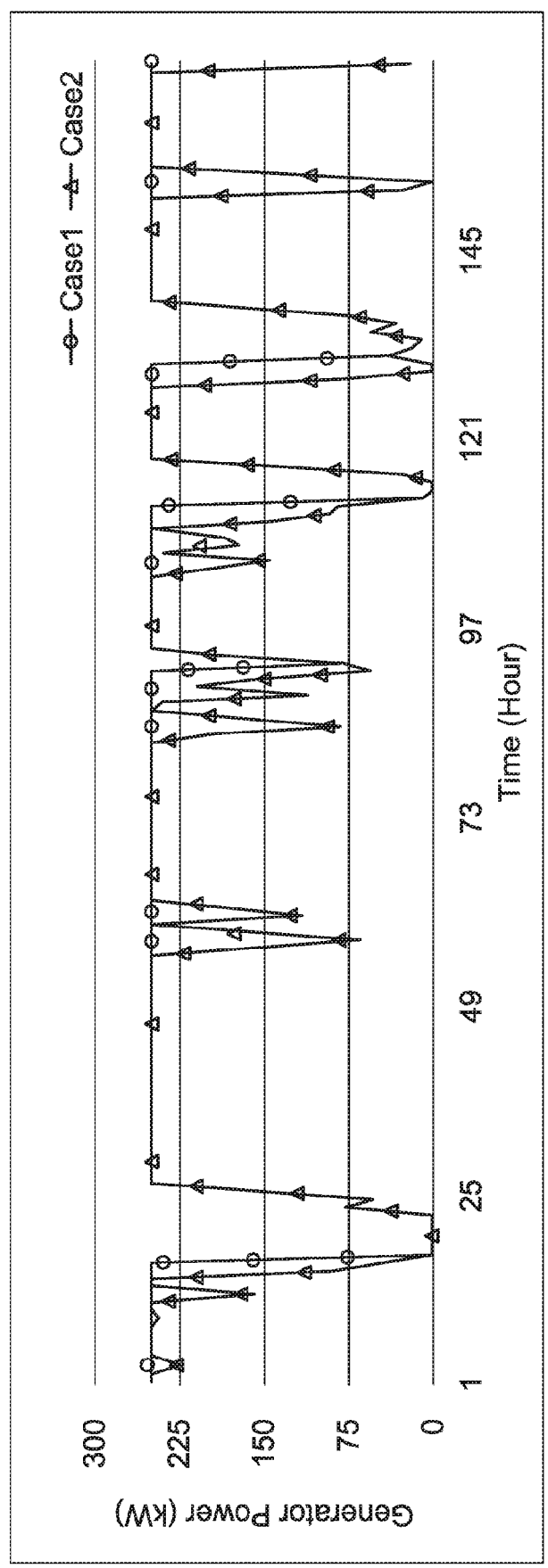
FIG. 45 is a graph illustrating generator power versus time for a community with a wind energy conversion system in accordance with an example embodiment of the present disclosure (Case 1) and a community with a single wind turbine (Case 2).

FIG. 43 illustrates tank storage energy in kilowatt hours (kWh) versus time in hours for a wind energy conversion system. FIG. 44 illustrates variable displacement machine power in kWh versus time in hours for a wind energy conversion system. FIG. 45 illustrates generator power in kW versus time in hours for a community with a wind energy conversion system in accordance with the present disclosure (Case 1) and a community with a single wind turbine (Case 2).

Figure 46:
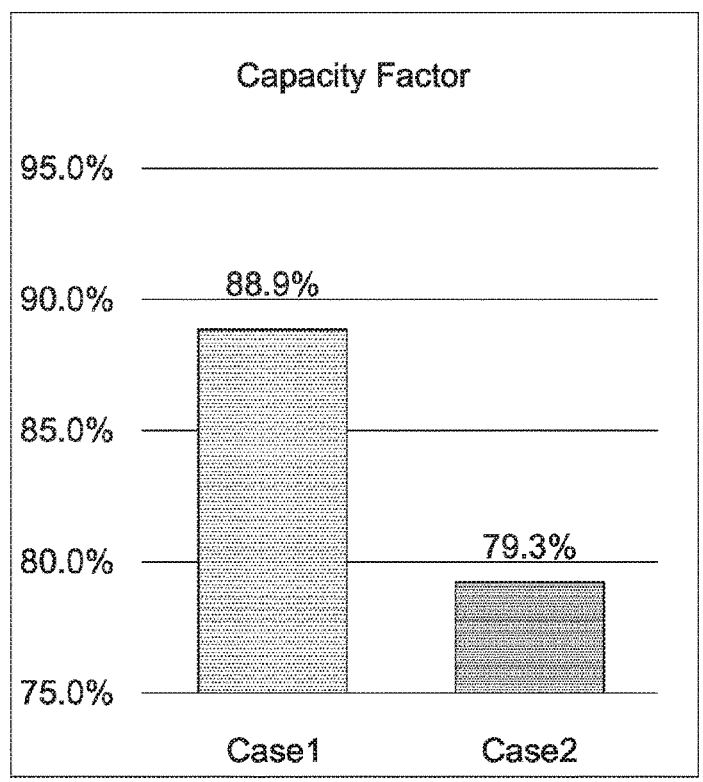
FIG. 46 is a graph illustrating a comparison of capacity factor for a community with a wind energy conversion system in accordance with an example embodiment of the present disclosure (Case 1) and a community with a single wind turbine (Case 2).
Figure 47A:
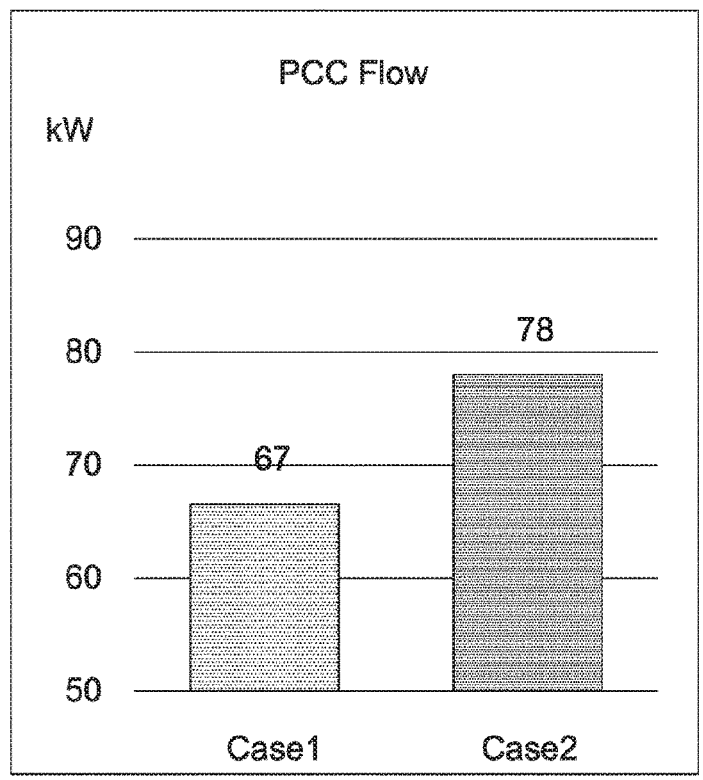
FIG. 47A is a graph illustrating a comparison of power flow through point of common coupling for a community with a wind energy conversion system in accordance with an example embodiment of the present disclosure (Case 1) and a community with a single wind turbine (Case 2).
Figure 47B:
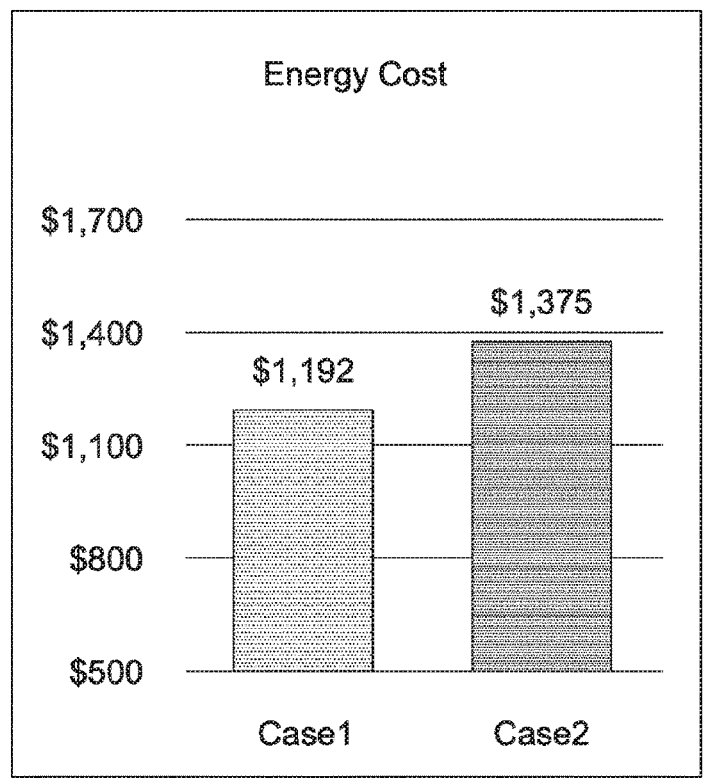
FIG. 47B is a graph illustrating a comparison of energy cost for a community with a wind energy conversion system in accordance with an example embodiment of the present disclosure (Case 1) and a community with a single wind turbine (Case 2).
Figure 47C:
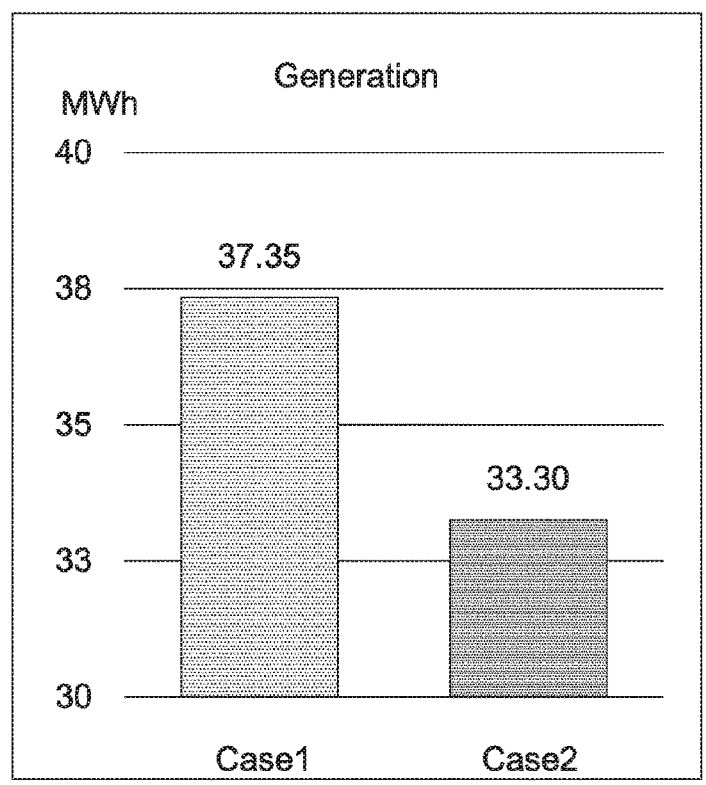
FIG. 47C is a graph illustrating a comparison of power generation for a community with a wind energy conversion system in accordance with an example embodiment of the present disclosure (Case 1) and a community with a single wind turbine (Case 2).

FIG. 46 illustrates a comparison of capacity factor for a community with a wind energy conversion system in accordance with the present disclosure (Case 1) and a community with a single wind turbine (Case 2). FIG. 47A illustrates a comparison of power flow in kW through point of common coupling for a community with a wind energy conversion system in accordance with the present disclosure (Case 1) and a community with a single wind turbine (Case 2). FIG. 47B illustrates a comparison of energy cost in U.S. dollars for a community with a wind energy conversion system in accordance with the present disclosure (Case 1) and a community with a single wind turbine (Case 2). FIG. 47C illustrates a comparison of power generation in megawatt hours (MWh) for a community with a wind energy conversion system in accordance with the present disclosure (Case 1) and a community with a single wind turbine (Case 2).

Figure 48:
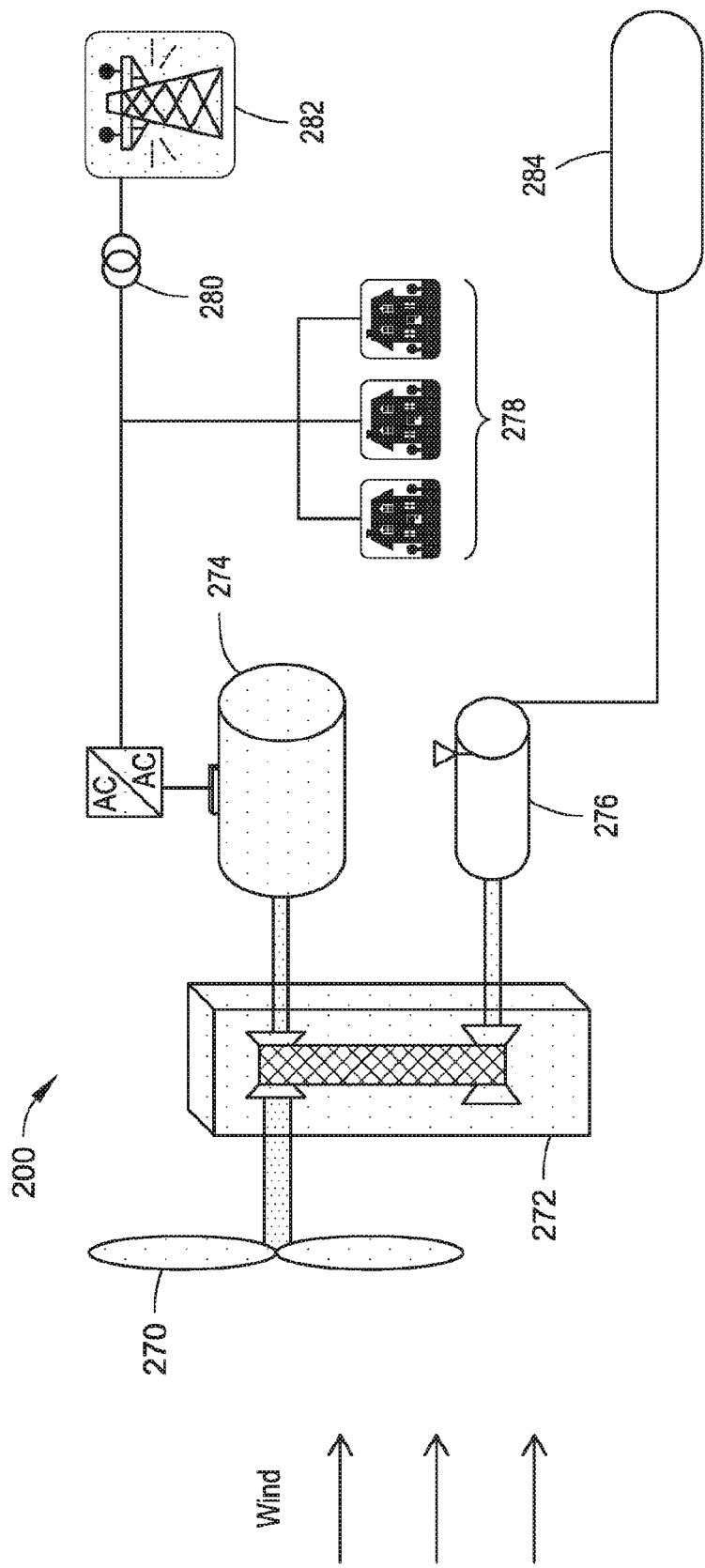
FIG. 48 is a diagrammatic illustration of a microgrid application with a community house load of a wind energy conversion system in accordance with example embodiments of the present disclosure.

Referring now to FIG. 48, a microgrid application with a community house load of a wind energy conversion system 200 is described. The wind energy conversion system can include a blade 270, a gearbox 272, a generator 274, a VDM 276, a house load 278, a PCC 280, a grid 282, and a tank 284.

Figure 50:
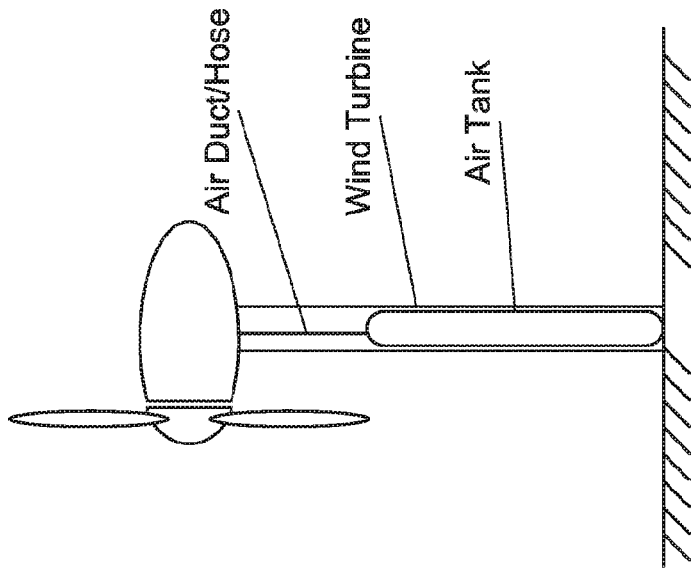
FIG. 50 is a diagrammatic illustration of a wind energy conversion system including a single wind turbine and an in-tower air tank in accordance with example embodiments of the present disclosure.
Figure 49:
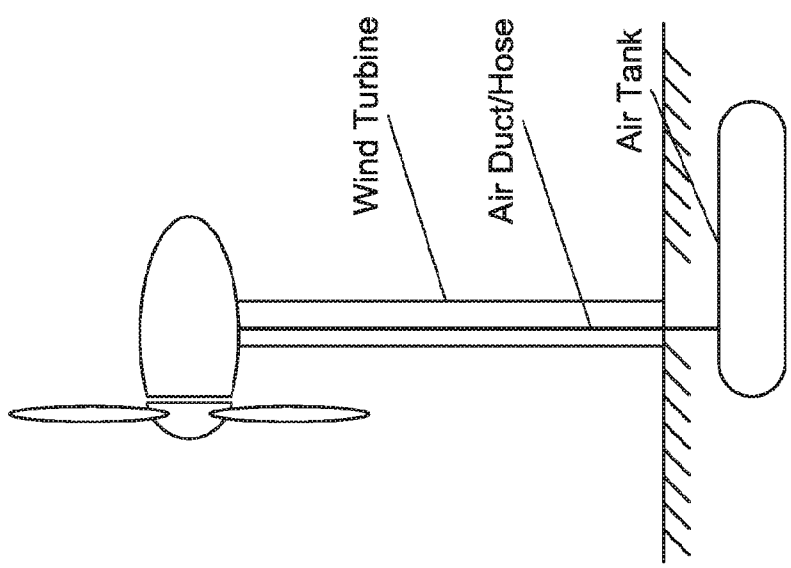
FIG. 49 is a diagrammatic illustration of a wind energy conversion system including a single wind turbine and an underground air tank in accordance with example embodiments of the present disclosure.
Figure 52:
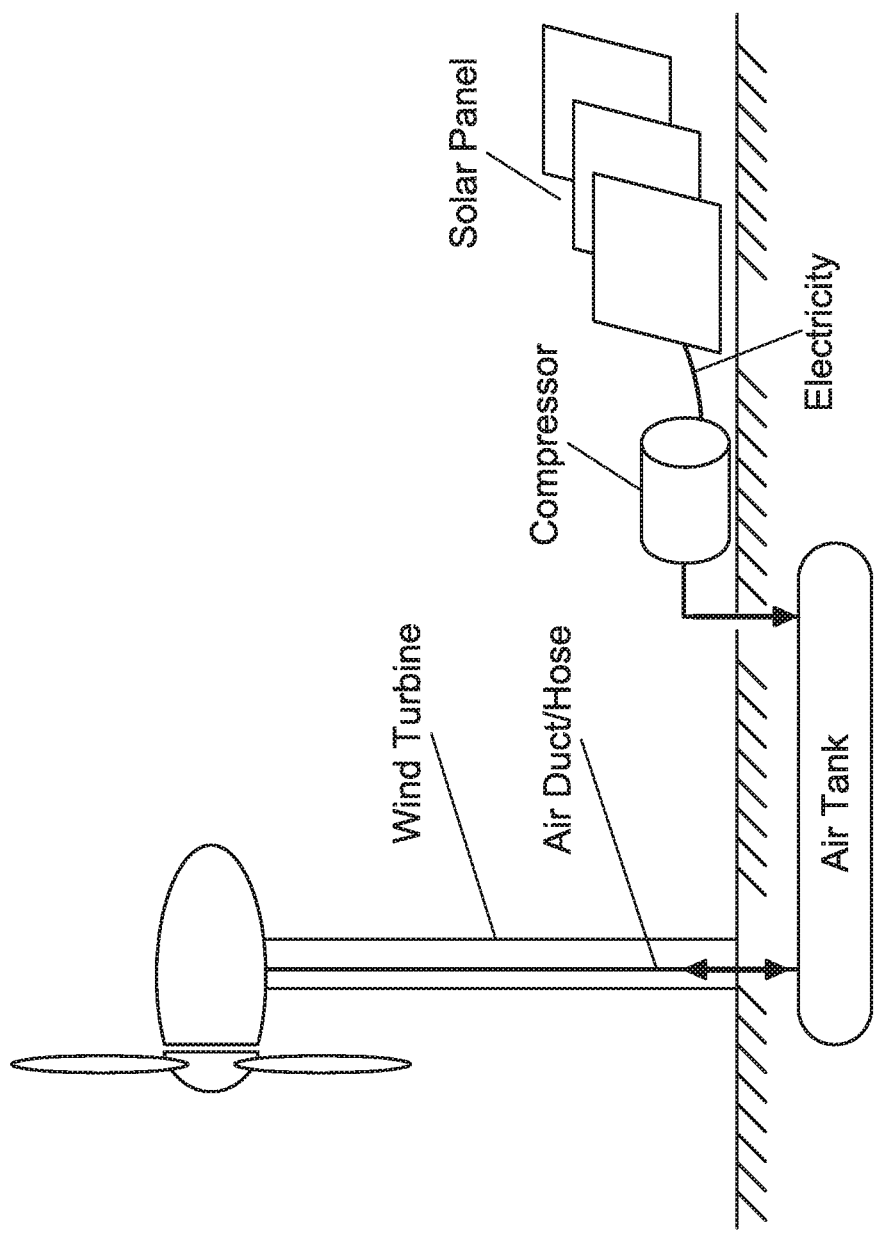
FIG. 52 is a diagrammatic illustration of a wind energy conversion system including other renewable energy systems, e.g., a solar panel.
Figure 53:
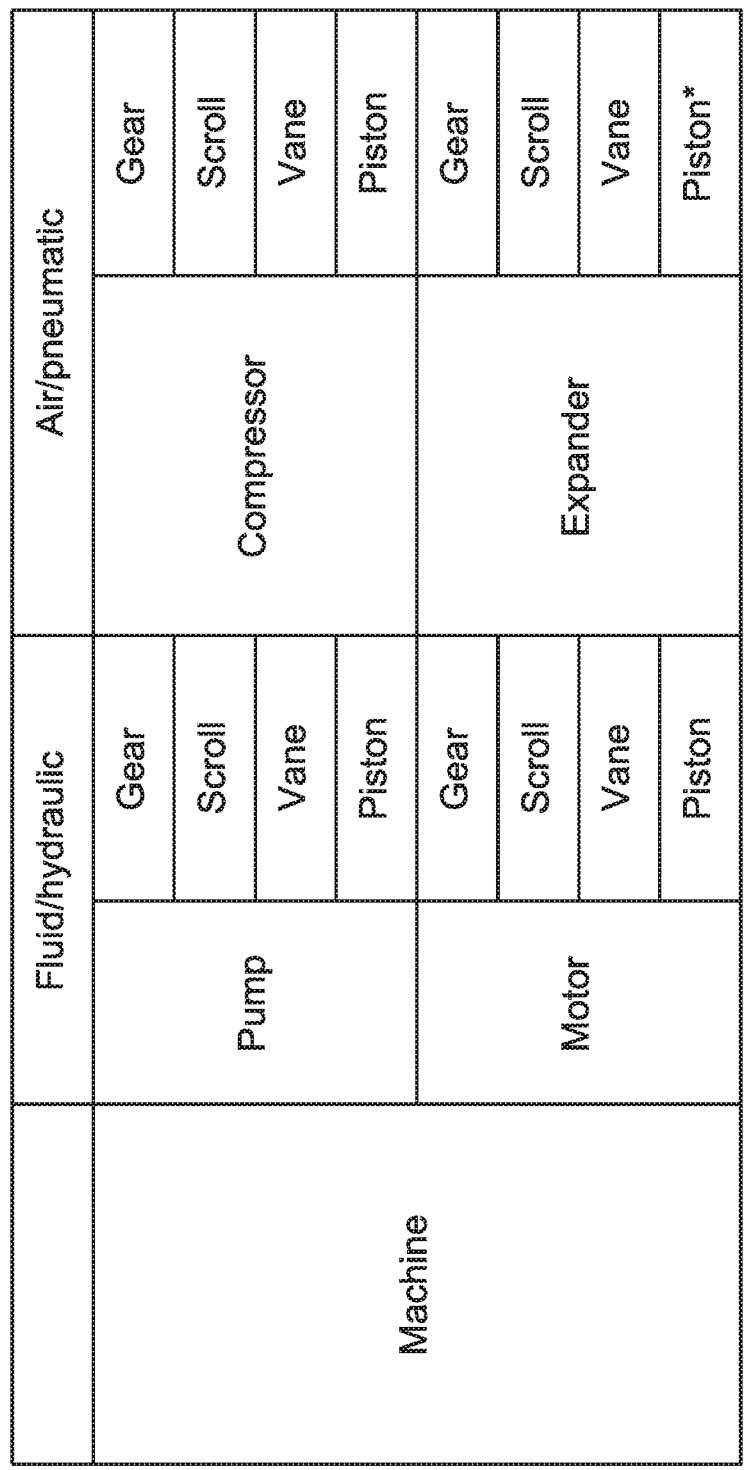
FIG. 53 is a table illustrating various equipment for use as a variable displacement machine (e.g., a reversible pneumatic machine that can be used as an air compressor and/or expander), where the variable displacement machine can be used with a wind energy conversion system in accordance with example embodiments of the present disclosure.

Referring now to FIG. 49, a wind energy conversion system can include a single wind turbine and an underground air tank. With reference to FIG. 50, a wind energy conversion system can include a single wind turbine and an in-tower air tank. Referring now to FIG. 51, a wind energy conversion system can include multiple wind turbines sharing an underground air tank, where all turbines may participate in air compression but not necessarily all turbines (e.g., one, a few, all) may use the compressed air to supplement power generation. With reference to FIG. 52, a wind energy conversion system can include other renewable energy systems. Referring now to FIG. 53, various equipment can be used for a variable displacement machine (e.g., a reversible pneumatic machine that can be used as an air compressor and/or expander), and the variable displacement machine can be used for a wind energy conversion system.

Figure 56:
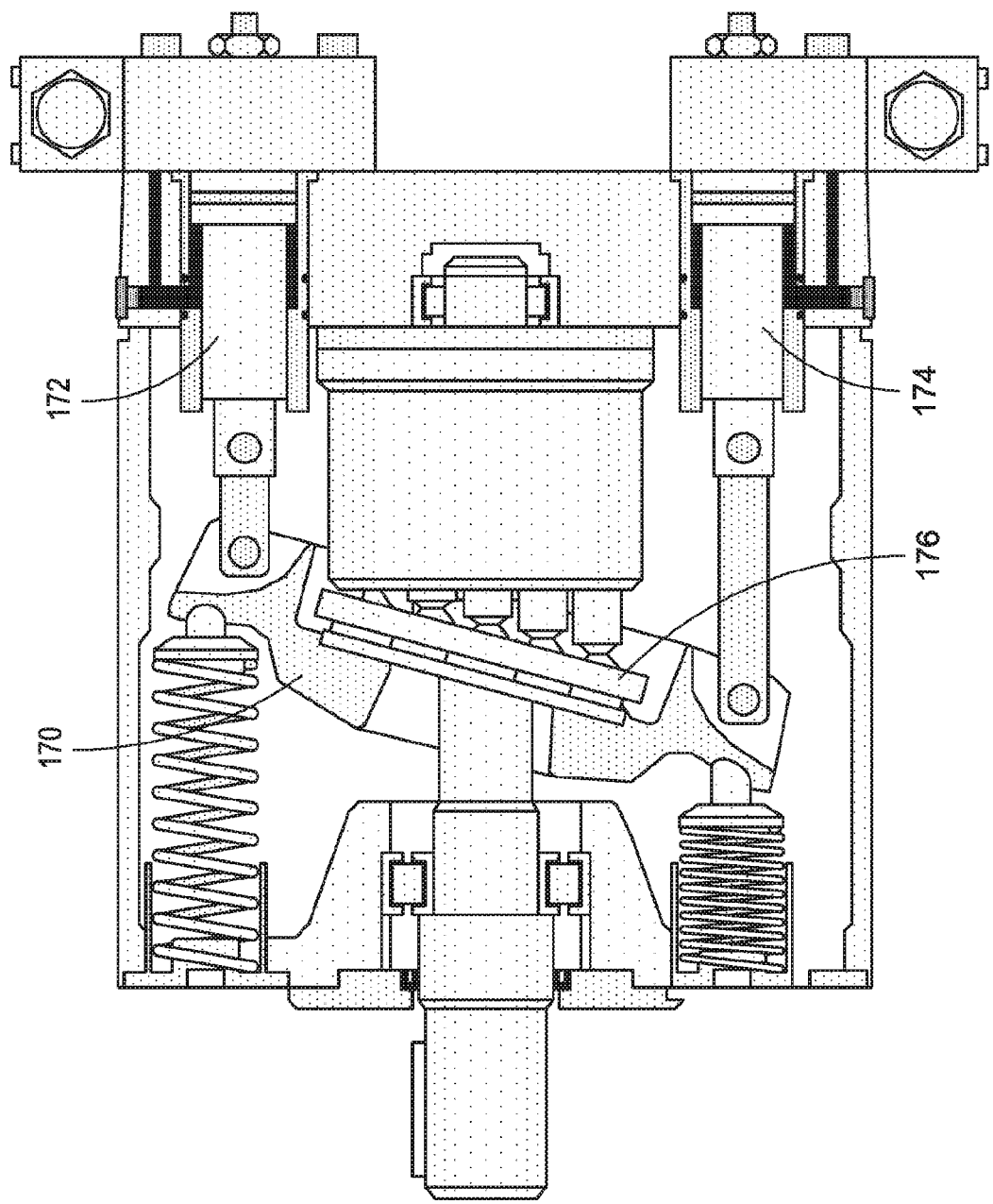
FIG. 56 is a cross-sectional side elevation view of a variable displacement machine, where the structure of actuators for wobble angle and piston displacement adjustment is detailed in accordance with example embodiments of the present disclosure.

With reference to FIG. 56, one way to manage wobble plate adjustment is to use a pair of actuators on a swash cradle 170. Two actuators 172 and 174 are attached to the upper and lower yokes of the swash cradle. A double acting hydraulic or pneumatic cylinder, or an electric motor driven screw shaft, can be used as the actuator. When a positive wobble angle adjustment is desired, the upper actuator 172 retracts and the lower actuator 174 extends. When a negative wobble angle adjustment is desired, the upper actuator extends and the lower actuator retracts. If only a wobble angle is desired without effecting piston displacement, the distance of extension and retraction on the upper and lower actuators can have identical absolute values with opposite signs. In some embodiments, a VDM 108 also includes a retaining plate 176.

It should be noted that this structure also allows the adjustment of piston position displacement. When positive piston displacement is desired, both upper and lower actuators 172 and 174 can extend the same distance. When negative piston displacement is desired, both upper and lower actuators 172 and 174 can retract the same distance. This manipulation may eliminate influence on wobble angle deviation while operating the piston displacement.

In some embodiments, this structure also can allow the joint adjustment of both wobble angle and piston displacement by recalculating the reference of extension and/or retraction for both upper and lower actuators by jointly solving the equations discussed above for $T_2$ and $\gamma^{Vc}$. It should be noted that other mechanical configurations, such as a screw shaft plus a spline-style keyway may also achieve the same function of piston displacement adjustment.

In some embodiments, an operational air pressure range can range from at least approximately 5 Bar (72.5 psi) to at least approximately 150 Bar (2176 psi), e.g., depending on the design and configuration of the system. Multiple stage compression and/or expansion can also be applied to increase efficiency. In some embodiments, mist spray technology can be used to recycle heat generated by, for example, compression.

Figure 57:
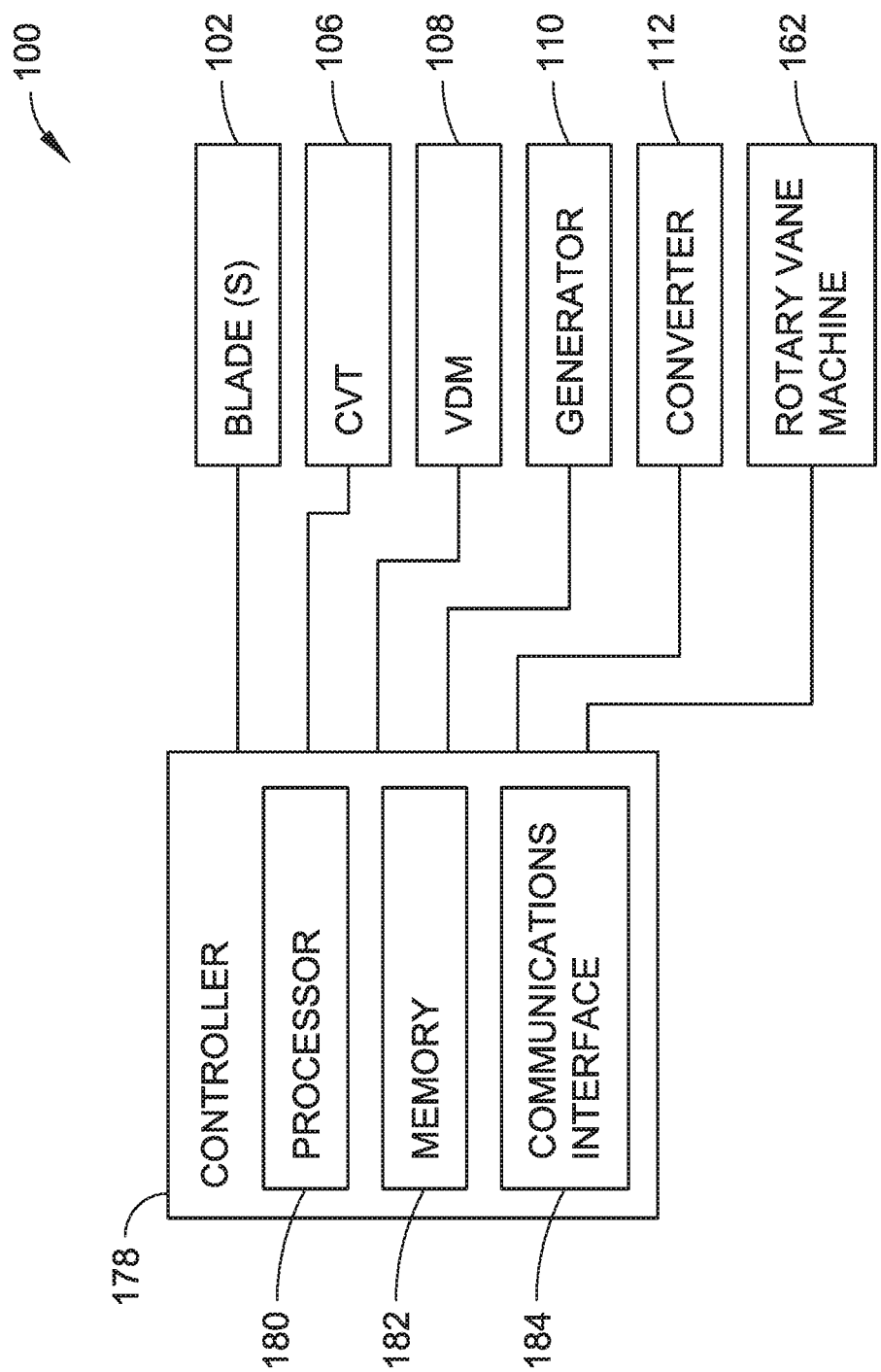
FIG. 57 is a block diagram illustrating a wind energy conversion system in accordance with example embodiments of the present disclosure, where the wind energy conversion system can include a controller for controlling the conversion of mechanical spillage to compressed air for storage in one or more air tanks.

Referring now to FIG. 57, a system 100, including some or all of its components, can operate under computer control. For example, a processor can be included with or in a system 100 to control the components and functions of systems 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the systems 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

A wind energy conversion system 100 can be coupled with a controller 178 for controlling the conversion of mechanical spillage to compressed air for storage in one or more air tanks, using compressed air in an air tank to supplement wind energy, controlling electrical energy distribution in a grid system, and so on. The controller 178 can include a processor 180, a memory 182, and a communications interface 184. The processor 180 provides processing functionality for the controller 178 and can include any number of processors, micro-controllers, or other processing systems, and resident or external memory for storing data and other information accessed or generated by the controller 178. The processor 180 can execute one or more software programs that implement techniques described herein. The processor 180 is not limited by the materials from which it is formed or the processing mechanisms employed therein and, as such, can be implemented via semiconductor(s) and/or transistors (e.g., using electronic integrated circuit (IC) components), and so forth.

The memory 182 is an example of tangible, computer-readable storage medium that provides storage functionality to store various data associated with operation of the controller 178, such as software programs and/or code segments, or other data to instruct the processor 180, and possibly other components of the controller 178, to perform the functionality described herein. Thus, the memory 182 can store data, such as a program of instructions for operating the system 100 (including its components), and so forth. It should be noted that while a single memory 182 is described, a wide variety of types and combinations of memory (e.g., tangible, non-transitory memory) can be employed. The memory 182 can be integral with the processor 180, can comprise stand-alone memory, or can be a combination of both.

The memory 182 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the controller and/or the memory 182 can include removable integrated circuit card (ICC) memory, such as memory provided by a subscriber identity module (SIM) card, a universal subscriber identity module (USIM) card, a universal integrated circuit card (UICC), and so on.

The communications interface 184 is operatively configured to communicate with components of the system 100. For example, the communications interface 184 can be configured to transmit data for storage in the system 100, retrieve data from storage in the system 100, and so forth. The communications interface 184 is also communicatively coupled with the processor 180 to facilitate data transfer between components of the system 100 and the processor 180 (e.g., for communicating inputs to the processor 180 received from a device communicatively coupled with the controller 178). It should be noted that while the communications interface 184 is described as a component of a controller 178, one or more components of the communications interface 184 can be implemented as external components communicatively coupled to the system 100 via a wired and/or wireless connection. The system 100 can also comprise and/or connect to one or more input/output (I/O) devices (e.g., via the communications interface 184), including, but not necessarily limited to: a display, a mouse, a touchpad, a keyboard, and so on.

The communications interface 184 and/or the processor 180 can be configured to communicate with a variety of different networks, including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 184 can be configured to communicate with a single network or multiple networks across different access points.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system comprising:
    a wind turbine having blades and being configured to convert wind energy;
    a gearbox with a continuously variable transmission;
    a generator coupled with the wind turbine through the continuously variable transmission for converting at least a portion of the wind energy to electrical energy;
    a variable displacement machine compressor coupled with the wind turbine through the continuously variable transmission for converting a mechanical spillage portion of the wind energy to compress a fluid, wherein the compressor is configured to compress the fluid when the wind energy exceeds a capacity limit of the generator, wherein mechanical spillage is the difference between potential power that blades can extract from the wind and an electrical-rated power of the generator;
    a storage tank for storing fluid compressed by the compressor; and
    a controller for controlling the conversion of mechanical spillage to compressed air for storage in one or more air tanks such that when wind speed is between an electrical-rated speed and a structural-rated speed of the wind turbine, the blades are maintained at a tip-speed-ratio to extract maximum power from the wind and blade pitching is deactivated.

2. The system as recited in claim 1, further comprising an expander coupled between the generator and the storage tank to use compressed fluid from the storage tank to furnish power to the generator.

3. The system as recited in claim 2, wherein the generator is configured to receive power from the expander when the generator experiences a capacity vacancy.

4. The system as recited in claim 1, wherein the variable displacement machine compressor is configured to provide compression and expansion under different torque, power, and tank pressure conditions.

5. The system as recited in claim 1, wherein
    the variable displacement machine compressor is configured to use the compressed fluid to furnish power to the generator when the generator experiences a capacity vacancy.

6. The system as recited in claim 5, wherein the storage tank is housed in a tower of the wind turbine.

7. The system as recited in claim 5, wherein the storage tank is housed underground.

8. The system as recited in claim 7, wherein the storage tank is constructed from at least one of a plastic material or a metal material.

9. The system as recited in claim 1, wherein
    the variable displacement machine compressor comprises a plurality of pistons.

10. The system as recited in claim 9, wherein the plurality of pistons can be shifted.

11. The system as recited in claim 9, wherein the variable displacement machine compressor further comprises at least one of a wobble plate or a retaining plate, wherein the plurality of pistons is shifted by adjusting a linear and angular displacement of the at least one of the wobble plate or the retaining plate to regulate strokes and lengths of cylinders of the plurality of pistons and a compression ratio of fluids in cylinders of the plurality of pistons.

12. The system as recited in claim 9, wherein the variable displacement machine compressor further is configured to act as an expander.

13. The system as recited in claim 9, further comprising a plate, wherein a wobble angle of the plate can be adjusted to be positive, neutral, or negative.

* * * * *